United States Patent
Hirata et al.

(10) Patent No.: US 9,725,651 B2
(45) Date of Patent: Aug. 8, 2017

(54) POLYMERIZABLE COMPOUND-CONTAINING LIQUID CRYSTAL COMPOSITION AND LIQUID CRYSTAL DISPLAY ELEMENT USING SAME

(71) Applicant: DIC CORPORATION, Tokyo (JP)

(72) Inventors: Shinichi Hirata, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/778,775

(22) PCT Filed: Mar. 18, 2014

(86) PCT No.: PCT/JP2014/057279
§ 371 (c)(1),
(2) Date: Jan. 12, 2016

(87) PCT Pub. No.: WO2014/148472
PCT Pub. Date: Sep. 25, 2014

(65) Prior Publication Data
US 2016/0122650 A1    May 5, 2016

(30) Foreign Application Priority Data
Mar. 21, 2013  (JP) .................................. 2013-058218

(51) Int. Cl.
| | | |
|---|---|---|
| *G02F 1/1333* | (2006.01) |
| *C09K 19/56* | (2006.01) |
| *C09K 19/20* | (2006.01) |
| *C09K 19/32* | (2006.01) |
| *G02F 1/1337* | (2006.01) |
| *C09K 19/04* | (2006.01) |
| *C09K 19/12* | (2006.01) |
| *C09K 19/30* | (2006.01) |

(52) U.S. Cl.
CPC .......... *C09K 19/56* (2013.01); *C09K 19/2014* (2013.01); *C09K 19/322* (2013.01); *G02F 1/133711* (2013.01); *C09K 2019/0448* (2013.01); *C09K 2019/0466* (2013.01); *C09K 2019/123* (2013.01); *C09K 2019/2042* (2013.01); *C09K 2019/2078* (2013.01); *C09K 2019/3027* (2013.01); *G02F 2001/133726* (2013.01)

(58) Field of Classification Search
CPC .. C09K 19/56; C09K 19/2014; C09K 19/322; C09K 2019/0488; C09K 2019/0466; C09K 2019/123; C09K 2019/2042; C09K 2019/2078; C09K 2019/3027; G02F 1/1333; G02F 1/133711; G02F 2001/133726
USPC .......................... 252/299.01, 299.6; 349/183
See application file for complete search history.

(56) References Cited

FOREIGN PATENT DOCUMENTS

| | | |
|---|---|---|
| JP | 2002-145830 A | 5/2002 |
| JP | 2012-018215 A | 1/2012 |
| JP | 2012-087165 A | 5/2012 |
| JP | 2012-240945 A | 12/2012 |
| JP | 2013-503952 A | 2/2013 |
| JP | 2013-180974 A | 9/2013 |
| WO | 2012-086504 A1 | 6/2012 |
| WO | 2013-161576 A1 | 10/2013 |

*Primary Examiner* — Geraldina Visconti
(74) *Attorney, Agent, or Firm* — Westerman, Hattori, Daniels & Adrian, LLP

(57) ABSTRACT

There is provided a polymerizable compound-containing liquid crystal composition having strong alignment regulating force of a liquid crystal compound. The polymerizable compound-containing liquid crystal composition includes: a polymerizable compound; and a liquid crystal compound, in which the polymerizable compound includes at least one polymerizable compound represented by General Formula (I), and in which the liquid crystal compound includes at least one component selected from the group consisting of at least one compound represented by General Formula (II) as a second component, at least one compound represented by General Formulae (IIIa), (IIIb), and (IIIc) as a third component, and at least one compound represented by General Formulae (IVa), (IVb), and (IVc) as a fourth component.

10 Claims, No Drawings

POLYMERIZABLE COMPOUND-CONTAINING LIQUID CRYSTAL COMPOSITION AND LIQUID CRYSTAL DISPLAY ELEMENT USING SAME

TECHNICAL FIELD

The present invention relates to a polymerizable compound-containing liquid crystal composition and a liquid crystal display element using the same.

BACKGROUND ART

A polymer sustained alignment (PSA) type liquid crystal display device has a polymer structure formed in a cell in order to control a pretilt angle of liquid crystal molecules, and has been developed as a liquid crystal display element due to high-speed responsiveness and high contrast.

Manufacturing of a PSA type liquid crystal display element is performed by injecting a polymerizable composition containing a liquid crystal compound and a polymerizable compound between substrates, and polymerizing the polymerizable compound in a state where the liquid crystal molecules is aligned by applying a voltage to the polymerizable composition to fix the alignment of the liquid crystal molecules. As the cause of image persistence which is a display defect of the PSA type image liquid crystal display element, impurities and change in alignment of the liquid crystal molecules (change in pretilt angle) are known.

The image persistence due to impurities is caused by a polymerizable compound that remains due to incomplete polymerization and by a polymerization initiator that is added to promote the progress of polymerization. Therefore, it is required to minimize the residual amount of the polymerizable compound after polymerization and to suppress the amount of the polymerization initiator to be added. For example, when a large amount of a polymerization initiator is added in order to fully perform the polymerization, the voltage retention rate of a display element is reduced by the residual polymerization initiator, so as to have negative effects on display quality. Further, when the amount of a polymerization initiator used in the polymerization is reduced in order to suppress the reduction of a voltage retention rate, a polymerizable compound remains due to incomplete polymerization, and the occurrence of image persistence by the remaining polymerizable compound cannot be avoided. Further, in order to completely cure the polymerizable compound with a small amount of the polymerization initiator so as to suppress the remaining of the polymerizable compound, there is a method of applying a large amount of energy by applying strong ultraviolet rays for a long time in the polymerization. However, in this case, an increase in size of a manufacturing apparatus and a decrease in manufacturing efficiency are incurred, and simultaneously a deterioration of a liquid crystal material due to ultraviolet rays occurs. Accordingly, in a conventional liquid crystal composition containing a polymerizable compound, it has been difficult to reduce both the residual amount of an uncured polymerizable compound and the residual amount of a polymerization initiator.

Meanwhile, as another cause of occurrence of image persistence, a change in pretilt angle of liquid crystal molecules in the liquid crystal composition containing a polymerizable compound is known. That is, when a polymer, which is a cured product of the polymerizable compound, is flexible and a display element is constituted thereof, if the same pattern continues to be displayed for a long time, the structure of the polymer is changed, and, as a result, the pretilt angle is changed. Since the change in the pretilt angle is a cause of image persistence, a polymerizable compound for forming a polymer having a rigid structure in which the polymer structure is not changed is required.

In the related art, in order to prevent the image persistence by improving the rigidity of a polymer, configuring a display element using a polymerizable compound which includes a structure such as a 1,4-phenylene group consisting of a ring structure and a polymerizable functional group (referring to PTL 1) and configuring a display element using a polymerizable compound having a biaryl structure (referring to PTL 2) have been considered.

Further, in order to prevent the image persistence by improving the rigidity of a polymer, configuring a display element using a mixed liquid crystal composition of a bifunctional polymerizable compound and a tri or higher functional polymerizable compound such as dipentaerythritol pentaacryalte or dipentaerythritol hexaacryalte (referring to PTL 3) has been proposed.

In PTL 4 as other technologies, there has been disclosed a polymerizable compound-containing liquid crystal composition, in which the crosslink density of the resulting polymer is increased by allowing a polymerizable compound to have three or more polymerizable functional groups in the molecule of the polymerizable compound, liquid crystal alignment regulating force is increased after polymerization, and thus a defect such as image persistence does not occur.

CITATION LIST

Patent Literature

[PTL 1] JP-A-2003-307720
[PTL 2] JP-A-2008-116931
[PTL 3] JP-A-2004-302096
[PTL 4] JP-A-2012-87165

SUMMARY OF INVENTION

Technical Problem

However, since the polymerizable compound of PTL 1 or 2 has low compatibility with respect to a liquid crystal compound, at the time of preparing a liquid crystal composition, the deposition of the polymerizable compound occurs, and thus practical applications of the liquid crystal composition are difficult.

Further, regarding the polymerizable compound described in PTL 3, since dipentaerythritol pentaacryalte and dipentaerythritol hexaacryalte do not have a ring structure in the molecule thereof, affinity with a liquid crystal compound is weak, and alignment regulating force is weak, and thus there is a problem in that sufficient alignment stability cannot be obtained. Further, these polymerizable compounds essentially require the addition of a polymerization initiator in the polymerization, and, if the polymerization initiator is not added, the polymerizable compound remains after the polymerization. For this reason, it is difficult to satisfy the characteristics required in the polymerizable compound-containing liquid crystal composition, such as image persistence of a display element, alignment stability, stability as a composition not causing deposition, manufacturing efficiency of a PSA type liquid crystal display element, and the like, and thus there is a need for further improvement.

Moreover, it is confirmed that, when the polymerizable compound described in PTL 4 is used, although liquid crystal alignment regulating force is high and a defect, such as image persistence, does not occur immediately after polymerization, a flexible spacer site (alkylene group) exists between a ring structure and a polymerizable functional group with the passage of time after polymerization, or the balance of polymerizable functional groups existing in the molecule of the polymerizable compound is deviated, so that a tilt angle is changed over time, and thus it is difficult to maintain a high-quality display for a long time.

Therefore, an object of the present invention is to provide a polymerizable compound-containing liquid crystal composition capable of solving the above problems.

Solution to Problem

As the results of active examinations by the present inventors, they found that a polymerizable compound-containing liquid crystal composition containing a polymerizable compound and a non-polymerizable liquid crystal material with a specific structure can solve the above-described problems, thereby completing the present invention.

Advantageous Effects of Invention

Since the polymerizable compound, which is an essential component of the present invention, has excellent compatibility with other non-polymerizable liquid crystal compounds, it is possible to obtain a stable liquid crystal composition.

The polymerizable compound according to the present invention has a skeleton similar to that of a liquid crystal compound, and has strong alignment regulating force to the liquid crystal compound.

The liquid crystal composition containing the polymerizable compound according to the present invention, which is added in a very small amount, makes it possible to polymerize the polymerizable compound, and to eliminate or extremely reduce the non-polymerized polymerizable compound remaining after polymerization.

In the liquid crystal composition containing the polymerizable compound according to the present invention, energy necessary for polymerization of the polymerizable compound can be greatly reduced.

With the liquid crystal composition containing the polymerizable compound according to the present invention, the display defect of a liquid crystal display element, which provides alignment by polymerizing a polymerizable compound in a liquid crystal material, can be greatly reduced, and an energy cost for manufacturing can be reduced, thereby improving manufacturing efficiency. Therefore, this liquid crystal composition is useful as a liquid crystal material for the liquid crystal display element.

DESCRIPTION OF EMBODIMENTS

Hereinafter, embodiments of the present invention will be described in detail. This application is based on Japanese Patent Application No. 2013-058218, filed on Mar. 21, 2013, the disclosure of which is cited as a whole by reference.

A first embodiment of the present invention provides a polymerizable compound-containing liquid crystal composition, including a polymerizable compound and a liquid crystal compound, in which the polymerizable compound-containing liquid crystal composition includes, as the polymerizable compound, at least one kind of polymerizable compounds represented by General Formula (I):

[Chem. 1]

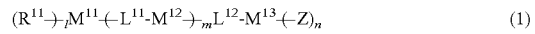

(in the general formula (I), Z represents a hydrogen atom, an alkyl group, an alkoxy group, or $-S^1-R^{12}$, $S^1$ is at least one kind of linking group selected from the group consisting of an alkylene group having 1 to 12 carbon atoms and a single bond, and one $-CH_2-$ or non-adjacent two or more $-CH_2-$ in the alkylene group may be substituted with $-O-$, $-COO-$, $-OCO-$, or $-OCOO-$, $R^{11}$ and $R^{12}$ each independently represent a hydrogen atom or any one of the following formulae (R-I) to (R-IX):

[Chem. 2]

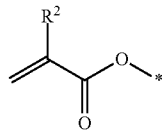
(R-I)

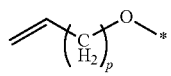
(R-II)

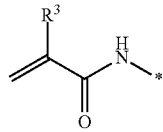
(R-III)

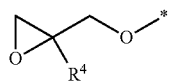
(R-IV)

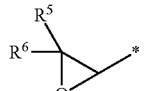
(R-V)

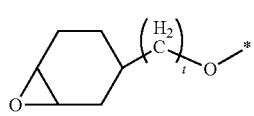
(R-VI)

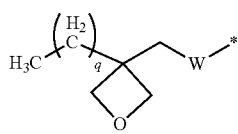
(R-VII)

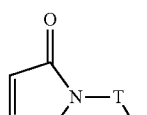
(R-VIII)

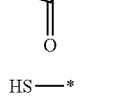
(R-IX)

in the formulae (R-I) to (R-IX), $R^2$ to $R^6$ are each independently a hydrogen atom, an alkyl group having 1 to 5 carbon atoms, or a halogenated alkyl group having 1 to 5 carbon atoms, W is a single bond, $-O-$ or a methylene group, T is a single bond or —COO—, and p, t, and q are each independently 0, 1, or 2, $L^{11}$ and $L^{12}$ are each independently a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formulae, R$^a$s each independently represent a hydrogen atom or an alkyl group having 1 to 4 carbon atoms, and z represents an integer of 1 to 4), $M^{12}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, but $M^{12}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, $M^{13}$ is each independently any one of the following formulae (i) to (ix):

[Chem. 3]

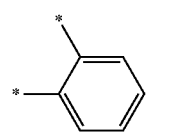
(i)

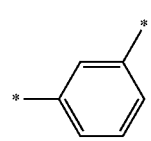
(ii)

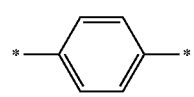
(iii)

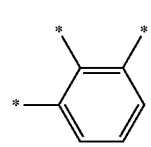
(iv)

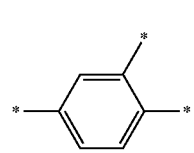
(v)

-continued

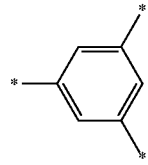
(vi)

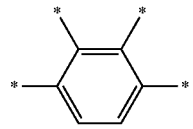
(vii)

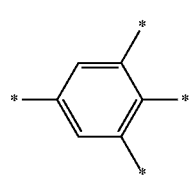
(viii)

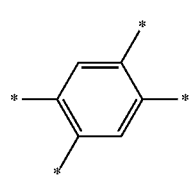
(ix)

l is 1 or 2, m and n each independently represent an integer of 0 to 3, when n is 0, Z is a hydrogen atom, when m represents 2 and 3, two or three $L^{11}$ and $M^{12}$ may be the same as or different from each other, provided that, at least one $L^{11}$ represents a single bond, further, in the case of l=1, $M^{11}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or 1,3-dioxane-2,5-diyl group, but $M^{11}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, and in the case of l=2, $M^{11}$ is any one of the above formulae (iv) to (vi)), and in which the polymerizable compound-containing liquid crystal composition includes, as the liquid crystal compound, at least one kind of liquid crystal compound selected from the group consisting of at least one kind of compounds represented by General Formula (II):

[Chem. 4]

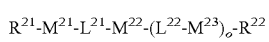

$R^{21}$-$M^{21}$-$L^{21}$-$M^{22}$-($L^{22}$-$M^{23}$)$_o$-$R^{22}$  (II)

(in the general formula (II), $R^{21}$ and $R^{22}$ each independently represent an alkyl group having 1 to 10 carbon atoms or an alkenyl group having 2 to 10 carbon atoms, one —CH$_2$— or two or more non-adjacent —CH$_2$— present in these groups may be substituted with —O— or —S—, at least one kind of hydrogen atom present in these groups may be substituted with a fluorine atom or a chlorine atom, $M^{21}$, $M^{22}$, and $M^{23}$ each independently represent a group selected from the group consisting of (a) a trans-1,4-cyclohexylene group (one —$CH_2$— or two or more non-adjacent —$CH_2$— present in this group may be substituted with —O— or —S—), (b) a 1,4-phenylene group (one —CH= or two or more non-adjacent —CH= present in this group may be substituted with —N=), a 2-fluoro-1,4-phenylene group, a 3-fluoro-1,4-phenylene group, and a 3,5-difluoro-1,4-phenylene group, and (c) a 1,4-cyclohexenylene group, a 1,4-bicyclo[2.2.2]octylene group, a piperidine-2,5-diyl group, a naphthalene-2,6-diyl group, a decahydronaphthalene-2,6-diyl group, and 1,2,3,4-tetrahydronaphthalene-2,6-diyl group, o represents 0, 1, or 2, $L^{21}$ and $L^{22}$ each independently represent a single bond, —$CH_2CH_2$—, —$(CH_2)_4$—, —$OCH_2$—, —$CH_2O$—, —$OCF_2$—, —$CF_2O$—, —CH=CH—, —CH=N—N=CH—, or —C≡C—, when a plurality of $L^{22}$ exist, they may be the same as or different from each other, and when a plurality of $M^{23}$ exist, they may be the same as or different from each other);

at least one kind of compounds represented by General Formulae (IIIa), (IIIb), and (IIIc):

[Chem. 5]

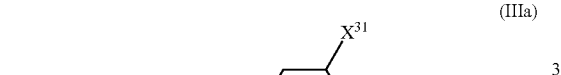
(IIIa)

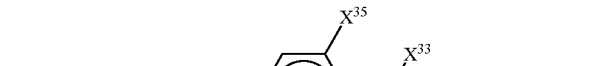
(IIIb)

(IIIc)

(in the general formulae (IIIa), (IIIb), and (IIIc), $R^{31}$, $R^{32}$, and $R^{33}$ each independently represent an alkyl group having 1 to 10 carbon atoms or an alkenyl group having 2 to 10 carbon atoms, one —$CH_2$— or two or more non-adjacent —$CH_2$— present in these groups may be substituted with —O— or —S—, at least one kind of hydrogen atom present in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the group consisting of (d) a trans-1,4-cyclohexylene group (one —$CH_2$— or two or more non-adjacent —$CH_2$— present in this group may be substituted with —O— or —S—), (e) a 1,4-phenylene group (one —CH= or two or more non-adjacent —CH= present in this group may be substituted with —N=), a 3-fluoro-1,4-phenylene group, and a 3,5-difluoro-1,4-phenylene group, and (f) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom included in the group (d), the group (e), or the group (f) may be substituted with a cyano group, a fluorine atom, a trifluoromethyl group, a trifluoromethoxy group or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{32}$, $M^{34}$, $M^{35}$, $M^{37}$, $M^{38}$, $L^{31}$, $L^{33}$, $L^{35}$, $L^{36}$, and/or $L^{38}$ are present, they may be the same as or different from each other, $X^{31}$, $X^{32}$, $X^{33}$, $X^{34}$, $X^3$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group, and p, q, r, s, and t each independently represent 0, 1, or 2, provided that each of q+r and s+t is 2 or less); and at least one kind of compounds represented by General Formulae (IVa), (IVb), and (IVc):

[Chem. 6]

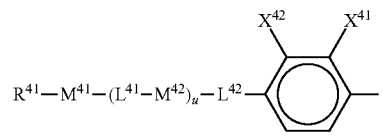
(IVa)

(IVb)

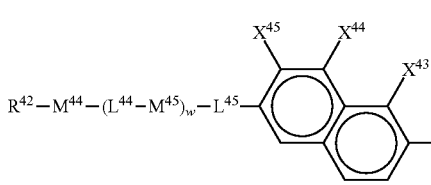
(IVc)

(in the general formulae (IVa), (IVb), and (IVc), $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, and one —$CH_2$— or two or more non-adjacent —$CH_2$— present in these groups may be substituted with —O— or —S—, and at least one kind of hydrogen atom present in these groups may be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from the group consisting of (g) a trans-1,4-cyclohexylene group (one —CH$_2$— or two or more non-adjacent —CH$_2$— present in this group may be substituted with —O— or —S—), (h) a 1,4-phenylene group (one —CH═ or two or more non-adjacent —CH═ present in this group may be substituted with —N═), and (i) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom contained in the group (g), (h), or (i) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, and when a plurality of $M^{42}$, $M^{43}$, $M^{45}$, $M^{46}$, $M^{48}$, $M^{49}$, $L^{41}$, $L^{43}$, $L^{44}$, $L^{46}$, $L^{47}$, and/or $L^{49}$ are present, they may be the same as or different from each other, $X^{41}$, $X^{42}$, $X^{43}$, $X^{44}$, $X^{45}$, $X^{46}$, $X^{47}$, and $X^{48}$ each independently represent a hydrogen atom, a trifluoromethyl group, a trifluoromethoxy group, a chlorine atom, or a fluorine atom, any one of $X^{41}$ and $X^{42}$ represent a fluorine atom, any one of $X^{43}$, $X^{44}$, and $X^{45}$ represent a fluorine atom, any one of $X^{46}$, $X^{47}$, and $X^{48}$ represent a fluorine atom, provided that $X^{46}$ and $X^{47}$ do not represent a fluorine atom at the same time and $X^{46}$ and $X^{48}$ do not represent a fluorine atom at the same time, G represents —CH$_2$— or —O—, and u, v, w, x, y, and z each independently represent 0, 1, or 2, provided that u+v, w+x, and y+z are each 2 or less).

That is, the polymerizable compound-containing liquid crystal composition according to the present invention includes: a polymerizable compound represented by the general formula (I); and at least one kind of liquid crystal compound selected from the group consisting of compounds represented by the general formulae (II), (IIIa), (IIIb), (IIIc), (IVa), (IVb), and (IVc).

When this polymerizable compound-containing liquid crystal composition is used, the improvement in alignment regulating force of the liquid crystal compound is expected.

The polymerizable compound-containing composition according to the present invention is preferably a polymerizable compound-containing liquid crystal composition, including a polymerizable compound and a liquid crystal compound, in which the polymerizable compound includes at least one kind of compound represented by General Formula (I), as a first component:

[Chem. 7]

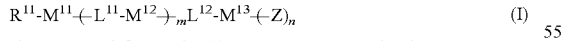  (I)

(in the general formula (I), Z represents a hydrogen atom, an alkyl group, an alkoxy group, or —R$^{12}$, and R$^{11}$ and R$^{12}$ each independently represent any one of the following formulae (R-1) to (R-15):

[Chem. 8]

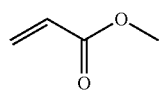 (R-1)

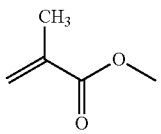 (R-2)

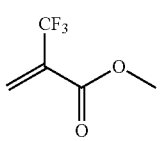 (R-3)

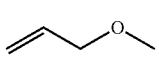 (R-4)

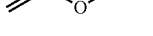 (R-5)

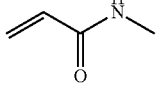 (R-6)

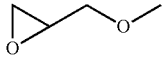 (R-7)

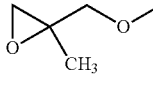 (R-8)

 (R-9)

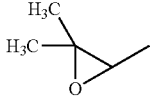 (R-10)

 (R-11)

 (R-12)

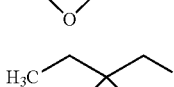 (R-13)

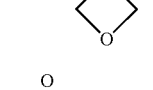 (R-14)

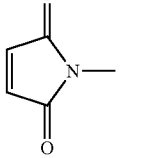 (R-15)

$L^{11}$ and $L^{12}$ each independently are a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH═CR$^a$—COO—, —CH═CR$^a$—OCO—, —COO—CR$^a$═CH—, —OCO—CR$^a$═CH—, —COO—CR$^a$═CH—COO—, —COO—CR$^a$═CH—OCO—, —OCO—CR$^a$═CH—

—COO—, —OCO—CR$^a$=CH—OCO—, —COOC$_2$H$_4$—, —OCOC$_2$H$_4$—, —C$_2$H$_4$OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH$_2$OCO—, —COOCH$_2$—, —OCOCH$_2$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formulae, R$^a$s each independently represent a hydrogen atom or an alkyl group having 1 to 4 carbon atoms, and z represents an integer of 1 to 4), M$^{11}$ and M$^{12}$ each independently represent a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, but M$^{11}$ and M$^{12}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, M$^{13}$ is any one of the following formulae (i) to (ix):

[Chem. 9]

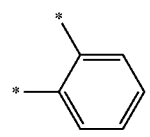
(i)

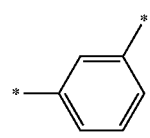
(ii)

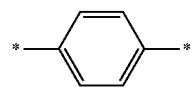
(iii)

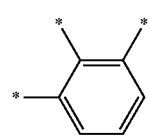
(iv)

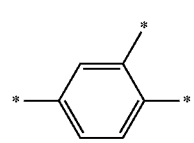
(v)

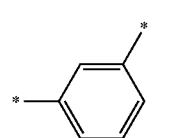
(vi)

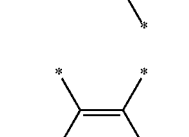
(vii)

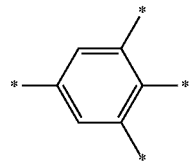
(viii)

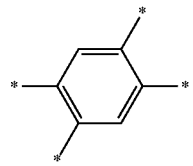
(ix)

(in the formulae (i) to (ix), * represents a binding site), and m and n each independently represent an integer of 0 to 3, when n is 0, Z is a hydrogen atom, when m represents 2 and 3, two or three L$^{11}$ and M$^{12}$ may be the same as or different from each other, provided that, at least one L$^{11}$ represents a single bond), in which the liquid crystal compound is preferably a compound which includes at least one kind of component selected from the group consisting of:

as a second component, at least one kind of compound represented by General Formula (II):

[Chem. 10]

$$R^{21}\text{-}M^{21}\text{-}L^{21}\text{-}M^{22}\text{-}(L^{22}\text{-}M^{23})_o\text{-}R^{22} \qquad (II)$$

(in the general formula (II), R$^{21}$ and R$^{22}$ each independently represent an alkyl group having 1 to 10 carbon atoms or an alkenyl group having 2 to 10 carbon atoms, one —CH$_2$— or two or more non-adjacent —CH$_2$— present in these groups may be substituted with —O— or —S—, at least one kind of hydrogen atom present in these groups may be substituted with a fluorine atom or a chlorine atom, M$^{21}$, M$^{22}$, and M$^{23}$ each independently represent a group selected from the group consisting of the following (a), (b), and (c):

(a) a trans-1,4-cyclohexylene group (one —CH$_2$— or two or more non-adjacent —CH$_2$— present in this group may be substituted with —O— or —S—), (b) a 1,4-phenylene group (one —CH= or two or more non-adjacent —CH= present in this group may be substituted with —N=), a 2-fluoro-1,4-phenylene group, a 3-fluoro-1,4-phenylene group, and a 3,5-difluoro-1,4-phenylene group, and (c) a 1,4-cyclohexenylene group, a 1,4-bicyclo[2.2.2]octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, and L$^{21}$ and L$^{22}$ each independently represent a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—, when a plurality of L$^{22}$ exist, they may be the same as or different from each other, and when a plurality of M$^{23}$ exist, they may be the same as or different from each other);

as a third component, at least one kind of compounds represented by General Formulae (IIIa), (IIIb), and (IIIc):

[Chem. 11]

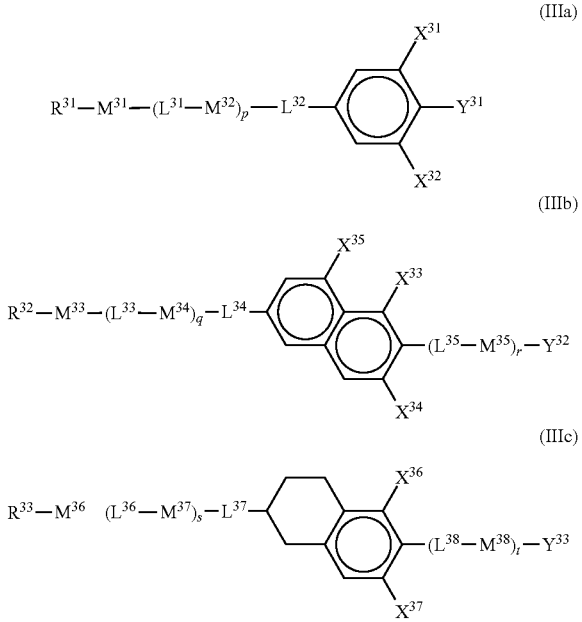

(in the general formulae (IIIa), (IIIb), and (IIIc), $R^{31}$, $R^{32}$, and $R^{33}$ each independently represent an alkyl group having 1 to 10 carbon atoms or an alkenyl group having 2 to 10 carbon atoms, one —$CH_2$— or two or more non-adjacent —$CH_2$— present in these groups may be substituted with —O— or —S—, at least one kind of hydrogen atom present in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the group consisting of the following (d), (e), and (f):

(d) a trans-1,4-cyclohexylene group (one —$CH_2$— or two or more non-adjacent —$CH_2$— present in this group may be substituted with —O— or —S—), (e) a 1,4-phenylene group (one —CH= or two or more non-adjacent —CH= present in this group may be substituted with —N=), a 3-fluoro-1,4-phenylene group, and a 3,5-difluoro-1,4-phenylene group, and (f) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom included in the group (d), the group (e), or the group (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{32}$, $M^{34}$, $M^{35}$, $M^{37}$, $M^{38}$, $L^{31}$, $L^{33}$, $L^{35}$, $L^{36}$, and/or $L^{38}$ are present, they may be the same as or different from each other, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent, a fluorine atom, a chlorine atom, a cyano group, a thiocyanate group, a trifluoromethoxy group, a trifluoromethyl group, a 2,2,2-trifluoroethyl group, or a difluoromethoxy group, and p, q, r, s, and t each independently represent 0, 1, or 2, provided that each of q+r and s+t is 2 or less); and as a fourth component, at least one kind of compounds represented by General Formulae (IVa), (IVb), and (IVc):

[Chem. 12]

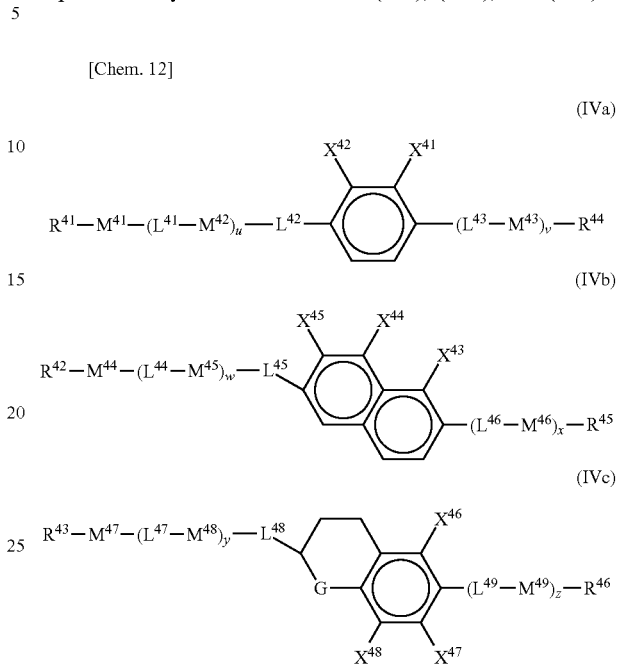

(in the general formulae (IVa), (IVb), and (IVc), $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, and one —$CH_2$— or two or more non-adjacent —$CH_2$— present in these groups may be substituted with —O— or —S—, and at least one kind of hydrogen atom present in these groups may be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from the group consisting of the following (g), (h), and (i):

(g) a trans-1,4-cyclohexylene group (one —$CH_2$— or two or more non-adjacent —$CH_2$— present in this group may be substituted with —O— or —S—), (h) a 1,4-phenylene group (one —CH= or two or more non-adjacent —CH= present in this group may be substituted with —N=), and (i) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom contained in the groups (g), (h), and (i) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{42}$, $M^{43}$, $M^{45}$, $M^{46}$, $M^{48}$, $M^{49}$, $L^{41}$, $L^{43}$, $L^{44}$, $L^{46}$, $L^{47}$, and/or $L^{49}$ are present, they may be the same as or different from each other, $X^{41}$, $X^{42}$, $X^{43}$, $X^{44}$, $X^{45}$, $X^{46}$, $X^{47}$, and $X^{48}$ each independently represent a hydrogen atom, a trifluoromethyl group, a trifluoromethoxy group, a chlorine atom, or a fluorine atom, any one of $X^{41}$ and $X^{42}$ represents a fluorine atom, any one of $X^{43}$, $X^{44}$, and $X^{45}$ represents a fluorine atom, any one of $X^{46}$, $X^{47}$, and $X^{48}$ represents a fluorine atom, provided that $X^{46}$ and $X^{47}$ do not represent a fluorine atom at the same time and $X^{46}$ and $X^{48}$ do not represent a fluorine atom at the same time, G represents —$CH_2$— or —O—, and u, v, w, x, y, and z each independently represent 0, 1, or 2, and u+v, w+x, and y+z are each 2 or less). Therefore, in the general formula (I), a condition of l=1 is preferable.

That is, it is preferable that the polymerizable compound-containing liquid crystal composition according to the present invention essentially includes at least one kind of compound represented by the general formula (I) as the first component, and includes at least one kind of compound selected from the group consisting of at least one kind of compound represented by the general formula (II) as the second component, at least one kind of compounds represented by the general formulae (IIIa) to (IIIc) as the third component, and at least one kind of compounds represented by the general formulae (IVa) to (IV-) as the fourth component. Therefore, the polymerizable compound-containing liquid crystal composition according to the present invention includes at least one kind of polymerizable compound represented by the general formula (I) as an essential component, and, if necessary, may include at least one kind of liquid crystal compound selected from the group consisting of compounds represented by the general formula (II) to general formulae (IVa) to (IVc).

Since the polymerizable compound in the polymerizable compound-containing liquid crystal composition according to the present invention has a skeleton similar to that of the liquid crystal compound (for example, the second to fourth components), and the molecular structure of this polymerizable compound has a polymerizable functional group directly connected to a ring structure, a rigid polymer having high crosslinking density can be produced by a polymerization reaction, and thus the alignment regulating force of the liquid crystal compound is considered to be strong. That is, in the polymerizable compound-containing liquid crystal composition according to the present invention, a polymer, which is obtained by the polymerization of a polymerizable compound not having a spacer group (alkylene group, branched alkylene group, oxyalkylene group, or the like) between a ring structure and a polymerizable functional group and a liquid crystal compound, has a rigid crosslinked structure, and thus it is possible to express stable alignment regulating force of liquid crystal molecules over a long period of time.

In the content of the liquid crystal compound contained in the polymerizable compound-containing liquid crystal composition according to the present invention, that is, in the total content (liquid crystal composition) of compounds represented by the general formula (II), general formulae (IIIa) to (IIIc), and general formulae (IVa) to (IVc), the numerical values of the lower limit thereof are, in ascending order of preference, 60 mass %, 65 mass %, 70 mass %, 75 mass %, 80 mass %, 85 mass %, 90 mass %, 92 mass %, 95 mass %, 98 mass %, and 99 mass %, and the upper limit thereof is preferably 99.9 mass % and more preferably 99.5 mass %.

The polymerizable compound-containing liquid crystal composition according to the present invention may be mixed with a known additive such as an antioxidant, a UV absorber, or the like. In this case, the content of the additive is preferably 0.005 mass % to 1 mass %, further preferably 0.02 mass % to 0.5 mass %, and particularly preferably 0.03 mass % to 0.1 mass %, with respect to the polymerizable compound-containing liquid crystal composition (100 mass %).

As to the dielectric anisotropy $\Delta\in$ of the polymerizable compound-containing liquid crystal composition according to the present invention, liquid crystal compositions having positive dielectric anisotropy $\Delta\in$ or those having negative dielectric anisotropy $\Delta\in$ can be used depending on the display mode of a liquid crystal display element. In a liquid crystal display element of an MVA mode, a liquid crystal composition having a negative $\Delta\in$ is used. In this case, the value of $\Delta\in$ at 25° C. is preferably −0.5 to −20.0, more preferably −0.7 to −15.0, and particularly preferably −1.0 to −13.0. More specifically, in the case of emphasizing response speed, the value of dielectric anisotropy $\Delta\in$ is preferably −1.0 to −7.0 in terms of response speed, and, in the case of emphasizing a driving voltage, the value thereof is preferably −3.0 to −13.0.

The value of refractive index anisotropy $\Delta n$ of the polymerizable compound-containing liquid crystal composition according to the present invention at 25° C. is preferably 0.060 to 0.250, and more preferably 0.080 to 0.200. More specifically, in the case of corresponding to thin cell gap (cell gap: 3.4 μm or less), the value thereof is preferably 0.100 to 0.200, and, in the case of corresponding to thick cell gap (cell gap: 3.5 μm or more), the value thereof is preferably 0.080 to 0.150.

The upper limit value of rotational viscosity ($\gamma_1$) of the polymerizable compound-containing liquid crystal composition according to the present invention is preferably 200 (mPa·s) or less, more preferably 150 (mPa·s) or less, and particularly preferably 130 (mPa·s) or less. Meanwhile, the lower limit value of rotational viscosity ($\gamma_1$) thereof is preferably 20 (mPa·s) or more, more preferably 30 (mPa·s) or more, further preferably 40 (mPa·s) or more, still further preferably 50 (mPa·s) or more, even still further preferably 60 (mPa·s) or more, and particularly preferably 70 (mPa·s) or more.

In the polymerizable compound-containing liquid crystal composition according to the present invention, it is preferable that Z, which is a function between rotational viscosity and refractive index anisotropy, indicates a specific value.

$$Z=\gamma 1/(\Delta n)^2 \qquad \text{[Math. 1]}$$

(in the equation, $\gamma_1$ represents rotational viscosity, and $\Delta n$ represents refractive index anisotropy.)

Z is preferably 13000 or less, more preferably 12000 or less, and particularly preferably 11000 or less.

The polymerizable compound-containing liquid crystal composition according to the present invention has a specific resistance of preferably $10^{11}$ (Ω·m) or more, more preferably $10^{12}$ (Ω·m), further preferably $10^{13}$ (Ω·m) or more, and particularly preferably $10^{14}$ (Ω·m) or more, when it is used in an active matrix display element.

The polymerizable compound-containing liquid crystal composition according to the present invention can use nematic phase-isotropic liquid phase transition temperature ($T_{NI}$) in a wide range, but liquid crystal phase temperature range is preferably 100° C. or higher and more preferably 120° C. or higher. The phase transition temperature ($T_{NI}$) is preferably 60° C. to 200° C., more preferably 65° C. to 150° C., and particularly preferably 70° C. to 110° C.

Hereinafter, each component that can be contained in the polymerizable compound-containing liquid crystal composition according to the present invention will be described in detail.

The first component according to the present invention is preferably a polymerizable compound represented by General Formula (I):

[Chem. 13]

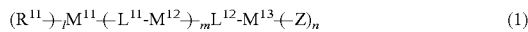

(in the general formula (I), Z represents a hydrogen atom, an alkyl group, an alkoxy group, or —S$^1$—R$^{12}$, S$^1$ is at least one kind of linking group selected from the group consisting of an alkylene group having 1 to 12 carbon atoms and a single bond, and one —CH$_2$— or non-adjacent two or more —CH$_2$— in the alkylene group may be substituted with —O—, —COO—, —OCO—, or —OCOO—, R$^{11}$ and R$^{12}$ each independently represent a hydrogen atom or any one of the following formulae (R-I) to (R-IX):

[Chem. 14]

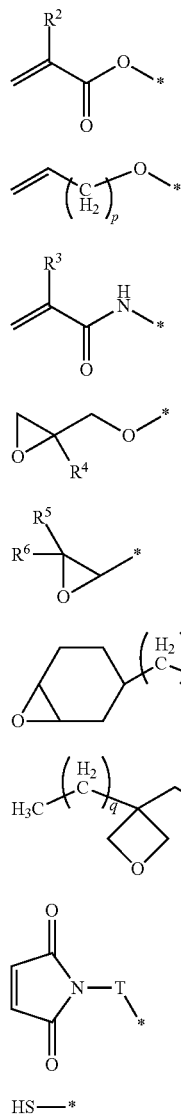

(R-I)
(R-II)
(R-III)
(R-IV)
(R-V)
(R-VI)
(R-VII)
(R-VIII)
(R-IX)

in the formulae (R-I) to (R-IX), R$^2$ to R$^6$ are each independently a hydrogen atom, an alkyl group having 1 to 5 carbon atoms or a halogenated alkyl group having 1 to 5 carbon atoms, W is a single bond, —O— or a methylene group, T is a single bond or —COO—, and p, t and q are each independently 0, 1, or 2, L$^{11}$ and L$^{12}$ are each independently a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —COOC$_2$H$_4$—, —OCOC$_2$H$_4$—, —C$_2$H$_4$OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH$_2$OCO—, —COOCH$_2$—, —OCOCH$_2$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formulae, R$^a$s each independently represent a hydrogen atom or an alkyl group having 1 to 4 carbon atoms, and z represents an integer of 1 to 4), M$^{12}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, but M$^{12}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, M$^{13}$ is each independently any one of the following formulae (i) to (ix):

[Chem. 15]

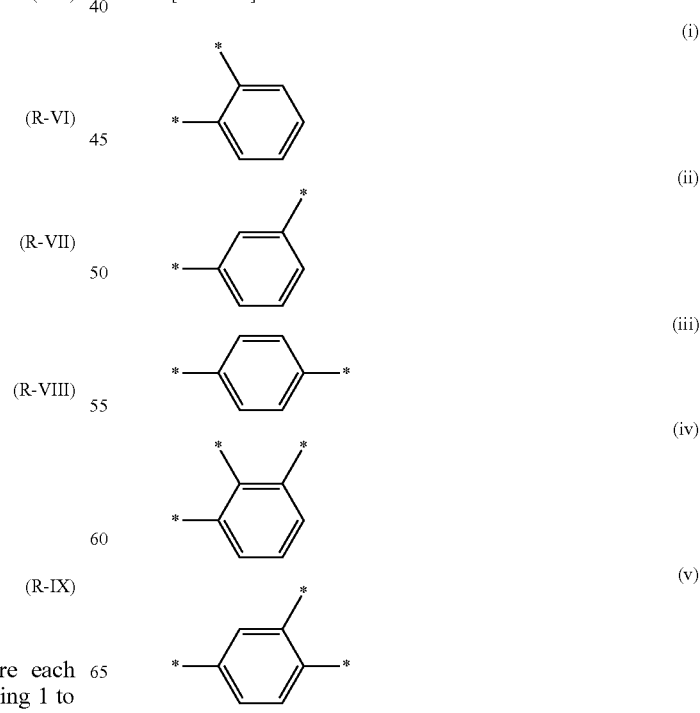

(i)
(ii)
(iii)
(iv)
(v)

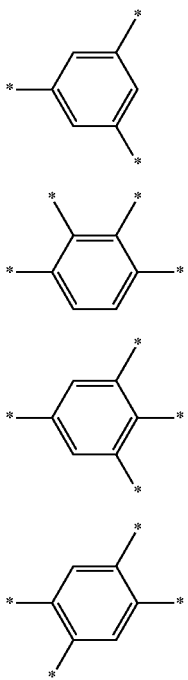

(vi)

(vii)

(viii)

(ix)

l is 1 or 2, m and n each independently represent an integer of 0 to 3, when n is 0, Z is a hydrogen atom, when m represents 2 and 3, two or three $L^{11}$ and $M^{12}$ may be the same as or different from each other, provided that, at least one $L^{11}$ represents a single bond, further, in the case of l=1, $M^1$ represents a 1,4-phenylene group, a 1,4-cyclohexylene group, a pyridine-2,5-diyl group, a pyrimidine-2,5-diyl group, a naphthalene-2,6-diyl group, a indan-2,5-diyl group, a 1,2,3,4-tetrahydronaphthalene-2,6-diyl group, or 1,3-dioxane-2,5-diyl group, but $M^{11}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, and in the case of l=2, $M^{11}$ is any one of the above formulae (iv) to (vi)).

When at least one kind of the polymerizable compound represented by the general formula (I) is contained in composition, molecular structure of this polymerizable compound has a polymerizable functional group directly connected to a ring structure, and consequently, a rigid polymer having high crosslinking density can be produced by a polymerization reaction, and thus the alignment regulating force of a liquid crystal compound is considered to be strong.

In the general formula (I) according to the present invention, m is an integer of 0 to 3 and preferably 1 to 3.

In the general formula (I) according to the present invention, when m is 1 or more, the polymerizable compound has 3 or more ring structures, and consequently, the polymerizable compound efficiently absorbs light energy, so that the polymerizable compound can be polymerized without using a photopolymerization initiator or by adding an extremely small amount of a photopolymerization initiator, and the non-polymerized polymerizable compound remained after polymerization can be eliminated or can be extremely reduced. In addition, it is considered that energy necessary for the polymerization of the polymerizable compound can be greatly reduced.

In the general formula (I) according to the present invention, n is an integer of 0 to 3 and preferably 1 to 3.

In the general formula (I) according to the present invention, when n is 1 or more, the number of polymerizable functional groups in the molecule of the polymerizable compound is 2 or more, and thus it is considered that the crosslinking density of the produced polymer increases, and the liquid crystal alignment regulating force after the polymerization increases.

In the general formula (I) according to the present invention, l is an integer of 1 or 2 and preferably 1.

In the general formula (I) according to the present invention, when l is 1 or more, the number of polymerizable functional groups in the molecule of the polymerizable compound is 2 or more, and thus it is considered that the crosslinking density of the produced polymer increases, and the liquid crystal alignment regulating force after the polymerization increases.

In the general formula (I) according to the present invention, Z is a hydrogen atom, an alkyl group, an alkoxy group, or $—S^1—R^{12}$, and preferably $—R^{12}$. In this case, $R^{11}$ and $R^{12}$ each independently are nine polymerizable functional groups represented by the formulae (R-I) to (R-IX), and these polymerizable functional groups are cured by radical polymerization, radical addition polymerization, cationic polymerization, and anionic polymerization.

Further, in the general formula (I) according to the present invention, preferably, $R^{11}$ and $R^{12}$ each independently represent any one of the following formulae (R-1) to (R-15)

[Chem. 16]

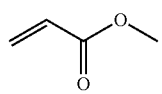
(R-1)

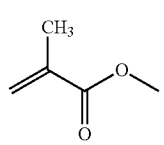
(R-2)

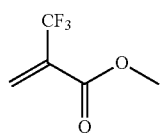
(R-3)

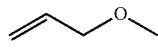
(R-4)

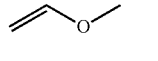
(R-5)

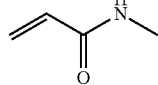
(R-6)

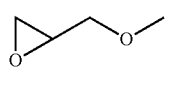
(R-7)

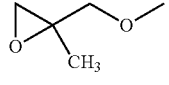
(R-8)

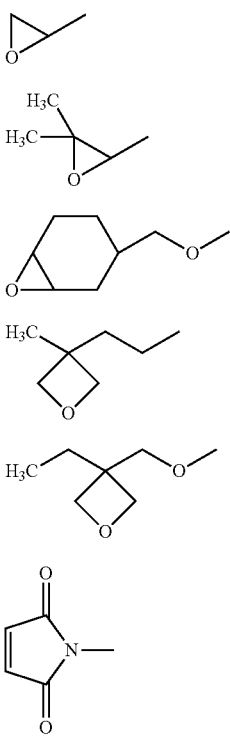

(R-9)
(R-10)
(R-11)
(R-12)
(R-13)
(R-14)
(R-15)

Particularly, when ultraviolet ray polymerization is performed as a polymerization method, the formulae (R-1), (R-2), (R-4), (R-5), (R-7), (R-11), (R-13), or (R-15) is preferable, (R-1), (R-2), (R-7), (R-11), or (R-13) is more preferable, and (R-1) or (R-2) is further preferable.

It is considered that when Z is fifteen polymerizable functional groups $R^{12}$ represented by the above formulae (R-1) to (R-15), a spacer group (alkylene group, branched alkylene group, oxyalkylene group, or the like) is not formed between so-called ring structure (here, $M^{13}$) and the polymerizable functional group ($R^{12}$), and consequently, a polymer obtained after polymerization has a rigid crosslinked structure, and thus it is possible to express stable alignment regulating force of liquid crystal molecules over a long period of time. Further, it is considered that since $R^{11}$ is also directly connected to a ring structure (here, $M^{11}$), a synergistic effect due to rigid crosslinked structures at both ends of the polymer obtained after polymerization is also exerted.

In the general formula (I) according to the present invention, each of $L^{11}$ and $L^{12}$ is independently a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —COOC$_2$H$_4$—, —OCOC$_2$H$_4$—, —C$_2$H$_4$OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH$_2$OCO—, —COOCH$_2$—, —OCOCH$_2$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (in the formulae, R$^a$s each independently represent a hydrogen atom or an alkyl group having 1 to 4 carbon atoms, and z represents an integer of 1 to 4). Preferably, at least one of $L^{11}$ and $L^{12}$ existing in the molecule is —COO—, —CH=CH—COO—, —CH=CH—OCO—, —CH=CCH$_3$—COO—, —CH=CCH$_3$—OCO—, —(CH$_2$)$_z$—C(=O)—O—, —(CH$_2$)$_z$—O—(C=O)—, —O—(C=O)—(CH$_2$)$_z$—, or —(C=O)—O—(CH$_2$)$_z$—. More preferably, any one of $L^{11}$ and $L^{12}$ is —(CH$_2$)$_z$—C(=O)—O—, —(CH$_2$)$_z$—O—(C=O)—, —O—(C=O)—(CH$_2$)$_z$—, or —(C=O)—O—(CH$_2$)$_z$—.

In the general formula (I) according to the present invention, although m $L^{11}$ and one $L^{12}$ exist, particularly preferably, at least one of m+1 $L^{11}$ and $L^{12}$ is selected from the group consisting of —(CH$_2$)$_z$—C(=O)—O—, —(CH$_2$)$_z$—O—(C=O)—, —O—(C=O)—(CH$_2$)$_z$—, and —(C=O)—O—(CH$_2$)$_z$—.

In the general formula (I) according to the present invention, $M^{11}$ and $M^{12}$ each independently represent a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or 1,3-dioxane-2,5-diyl group, but $M^1$ and $M^{12}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, $M^{13}$ is any one of the following formulae (i) to (ix):

[Chem. 17]

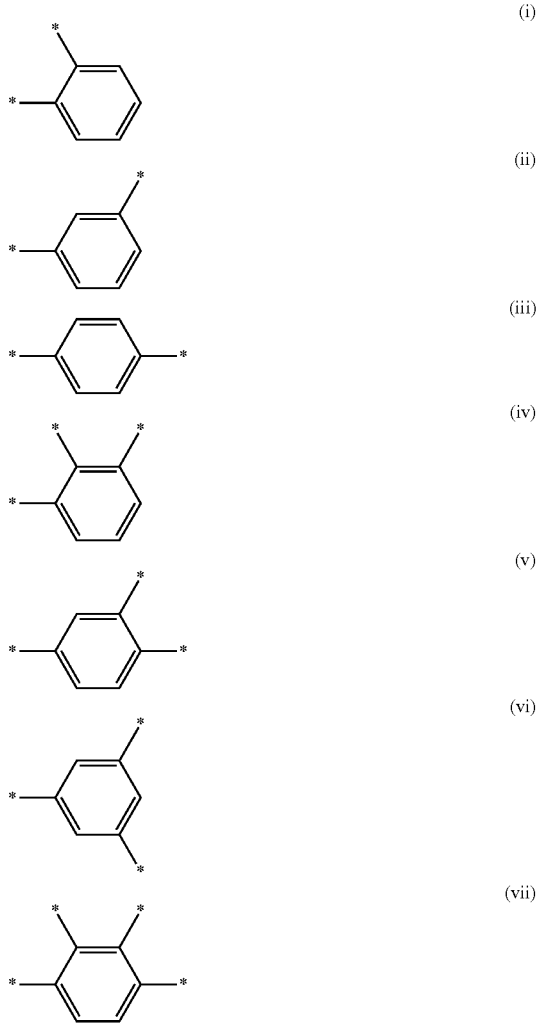

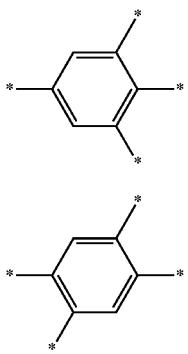

(in the formulae (i) to (ix), * represents a binding site), preferably, each of $M^{11}$ and $M^{12}$ is independently a 1,4-phenylene group, a 1,4-cyclohexylene group, or a naphthalene-2,6-diyl group, and $M^{13}$ is preferably the formulae (iii), (v), (vi), and (viii).

In the general formula (I) according to the present invention, a condition in which Z is —$R^{12}$, $M^{13}$ is any one of formulae (iv) to (ix) and n is 1 or more is preferable.

Under this condition, the balance of polymerizable functional groups existing in the molecule of the polymerizable compound is less likely to be deviated due to the chemical structure having one or more polymerizable functional groups at both ends of the general formula (I). Therefore, when the liquid crystal composition containing the polymerizable compound is polymerized, the separation of a region having high crosslinking density and a region having low crosslinking density is suppressed, thereby suppressing and preventing the change in tilt angle of liquid crystal molecules existing in the system over time.

The "alkyl group" in the present specification is preferably a linear or branched alkyl group, and more preferably a linear alkyl group. Examples of the "alkyl group" include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, and a pentadecyl group. In the present specification, examples of alkyl groups are common, and the alkyl group is appropriately selected from these examples according to the number of carbon atoms in each alkyl group.

Regarding examples of the "alkoxy group", it is preferable that at least one oxygen atom in the substituent group is present at a position where it is directly connected to a ring structure. More preferably, examples of the "alkoxy group" include a methoxy group, an ethoxy group, a propoxy group (n-propoxy group and i-propoxy group), a butoxy group, a pentyloxy group, an octyloxy group, and a decyloxy group. In the present specification, examples of alkoxy groups are common, and the alkoxy group is appropriately selected from these examples according to the number of carbon atoms in each alkoxy group.

The polymerizable compound-containing liquid crystal composition according to the present invention contains at least one kind of polymerizable compound represented by the general formula (I), but contains preferably one to five kinds of polymerizable compounds, and particularly preferably one to three kinds of polymerizable compounds. When the content ratio (mass %) of the compound represented by the general formula (I) in the polymerizable compound-containing liquid crystal composition according to the present invention is low, alignment regulating force to a non-polymerizable liquid crystal compound is weakened, and, when the content ratio thereof is excessively high, energy necessary for polymerization increases, and thus the amount of the polymerizable compound remained without being polymerized increases. Therefore, the lower limit of the content ratio is preferably 0.01 mass % and more preferably 0.03 mass %, and the upper limit thereof is preferably 2.0 mass % and more preferably 1.0 mass %.

Specific examples of the polymerizable compound represented by the general formula (I) according to the present invention are preferably compounds represented by the formulae (I-1) to (I-40), more preferably compounds represented by the formulae (I-1) to (I-10), (I-14) to (I-17), and (I-28) to (I-40), and particularly preferably compounds represented by the formulae (I-2), (I-7), (I-8), (I-16), and (I-28) to (I-37).

When the polymerizable compound is any one of compounds represented by the formulae (I-28) to (I-40), it is particularly preferred because a sensitizing effect is exhibited at the time of photopolymerization.

[Chem. 18]

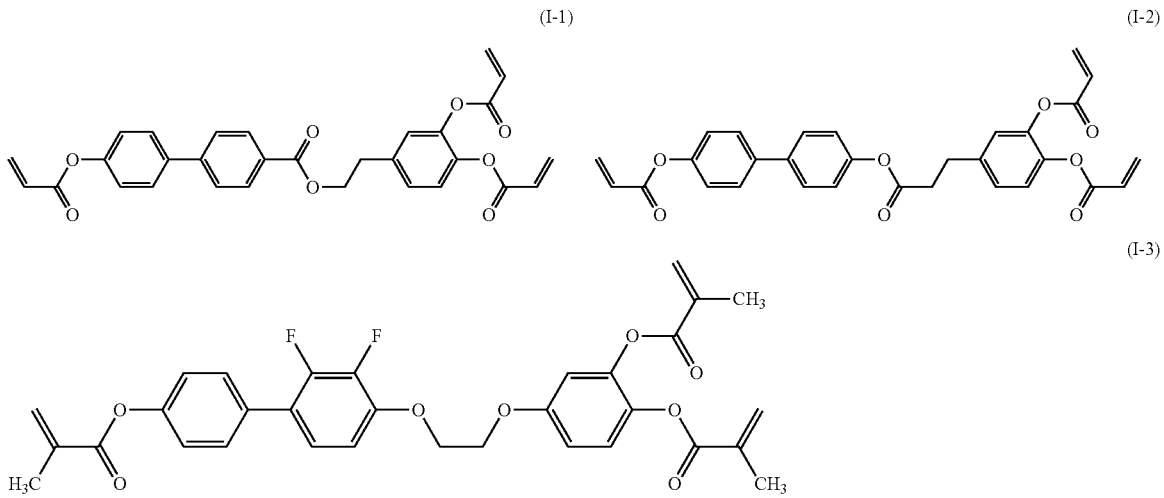

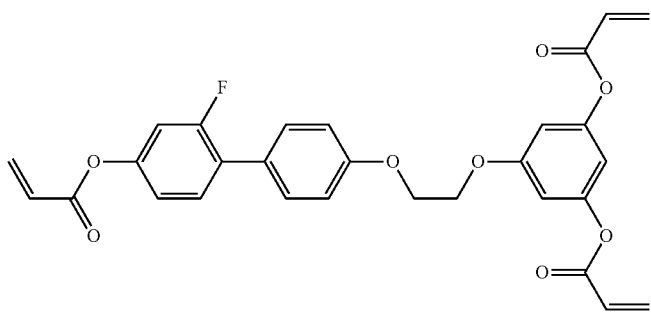
(I-4)
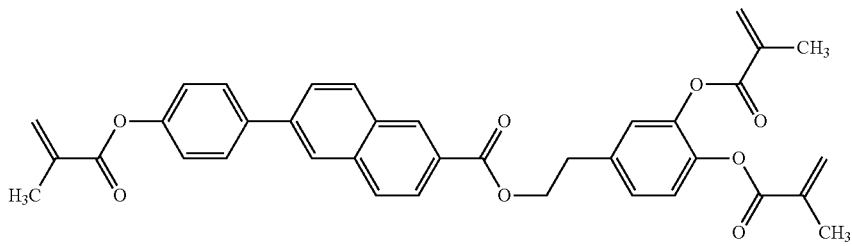
(I-5)
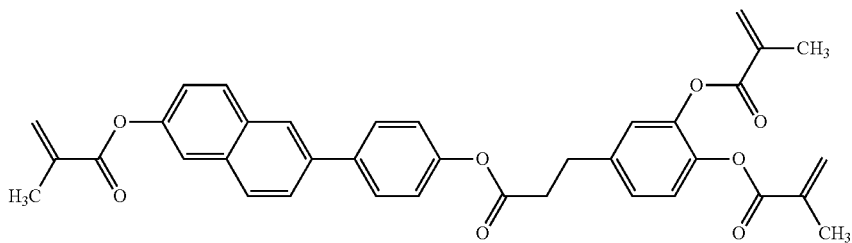
(I-6)
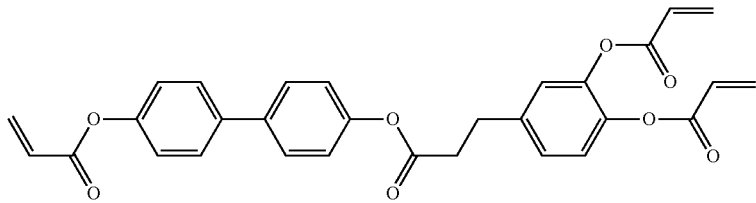
(I-7)
[Chem. 19]
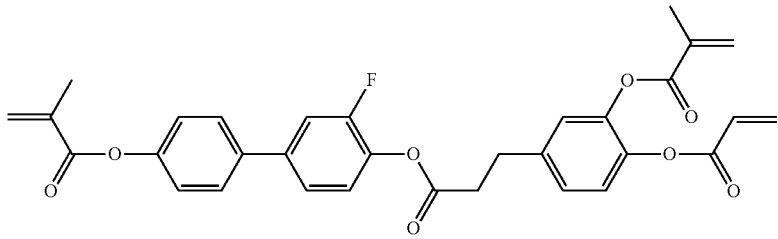
(I-8)
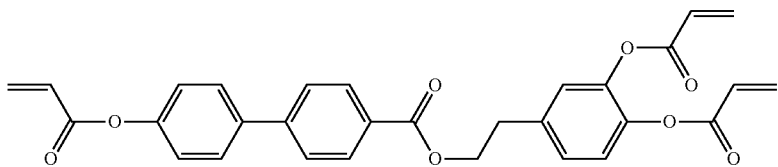
(I-9)

-continued
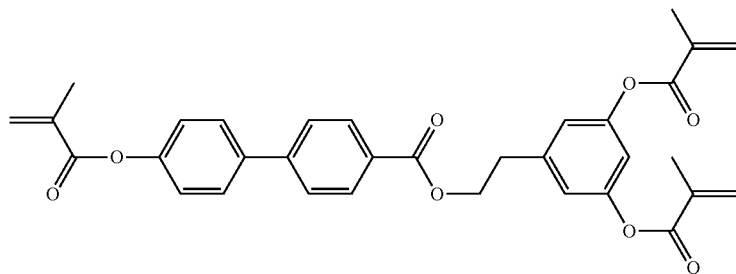
(I-10)
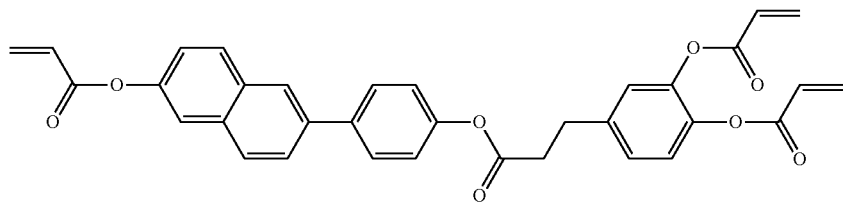
(I-11)
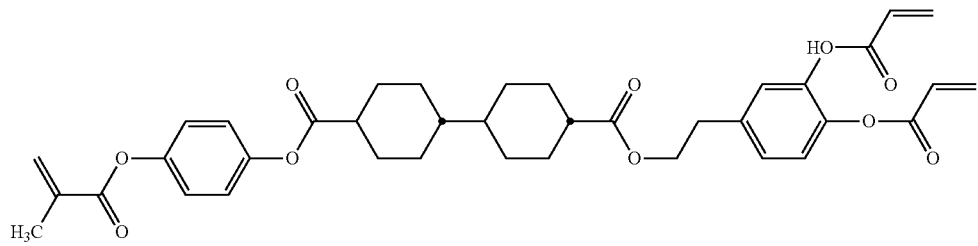
(I-12)
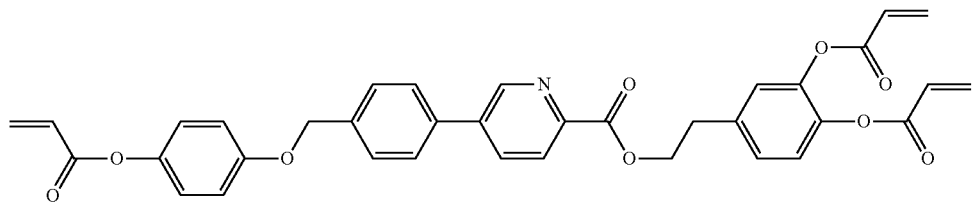
(I-13)
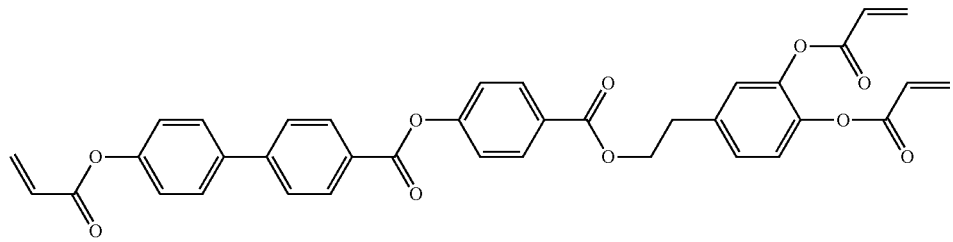
(I-14)
[Chem. 20]
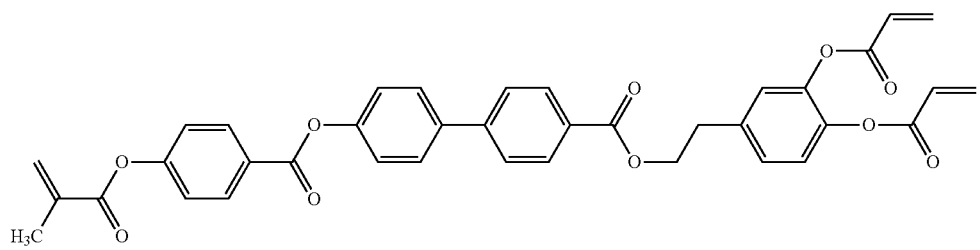
(I-15)

-continued
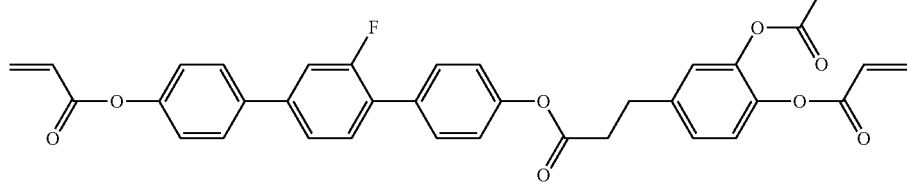
(I-16)
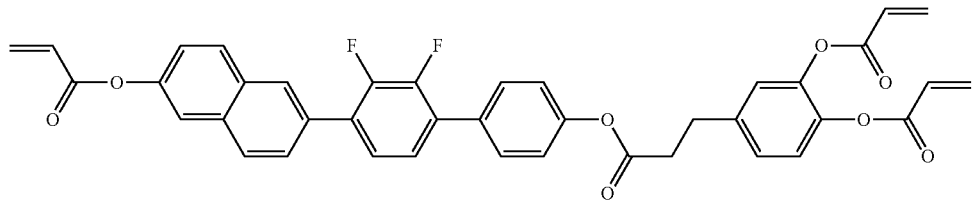
(I-17)
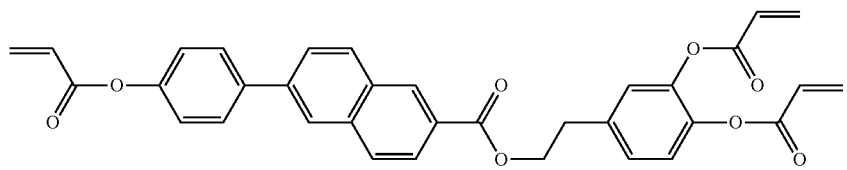
(I-18)
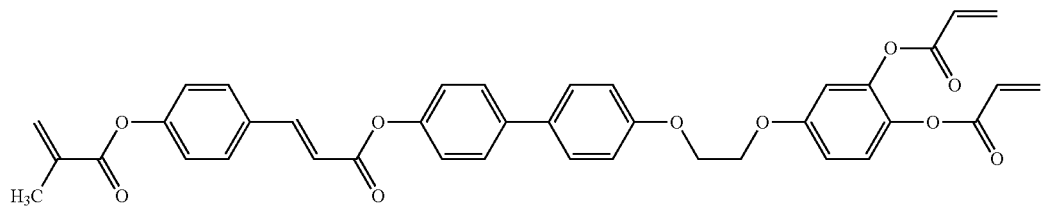
(I-19)
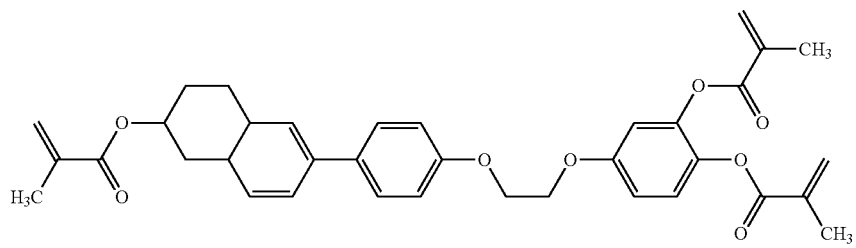
(I-20)
[Chem. 20]
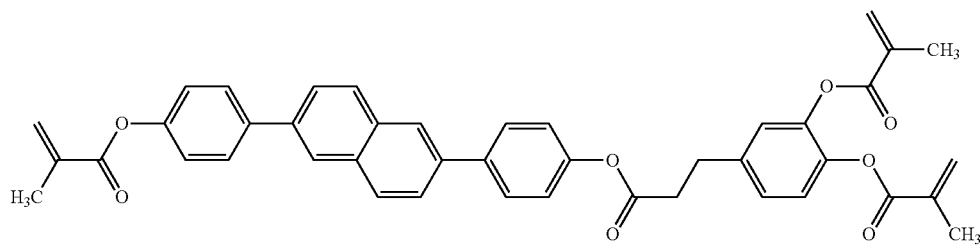
(I-21)
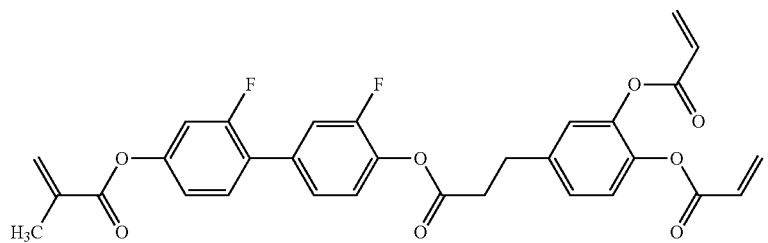
(I-22)

-continued
(I-23)
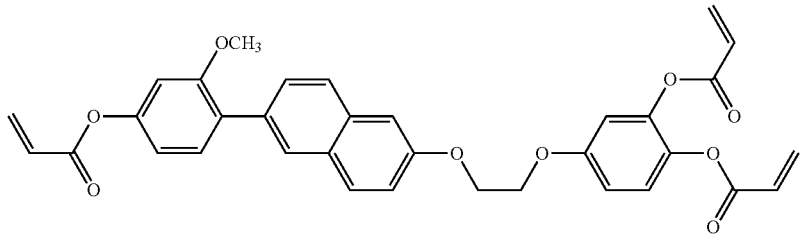
(I-24)
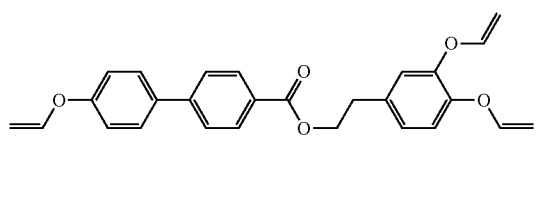
(I-25)
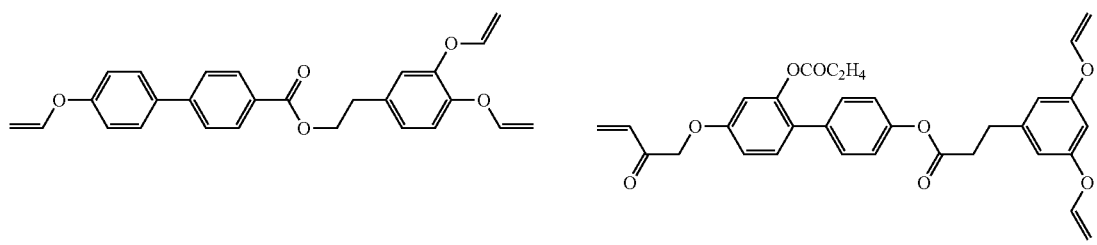
(I-26)
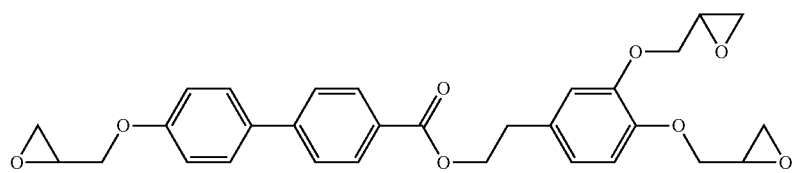
(I-27)
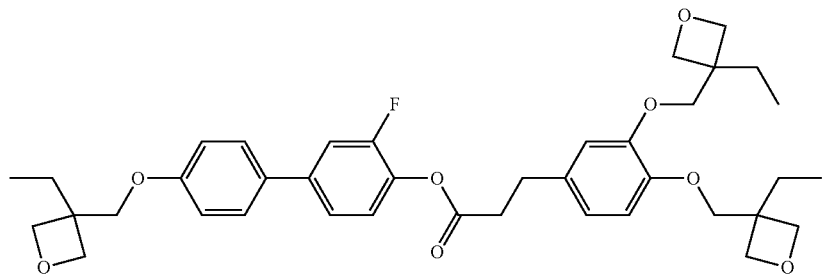
[Chem. 21]
(I-28)
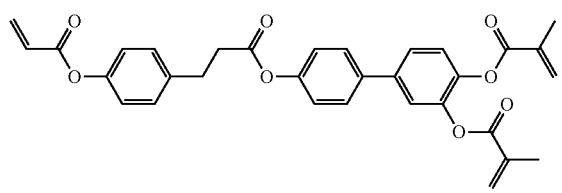
(I-29)
(I-30)
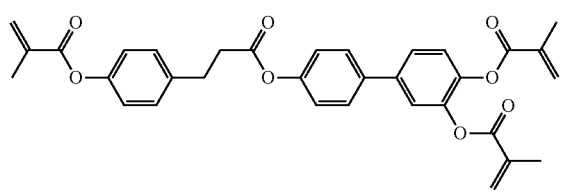
(I-31)
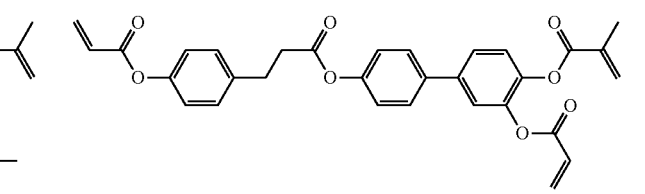

-continued
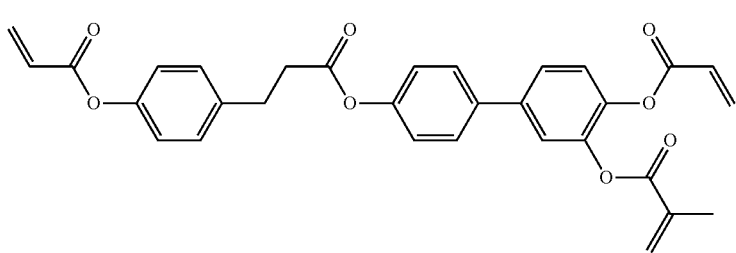
(I-32)
[Chdem. 22]
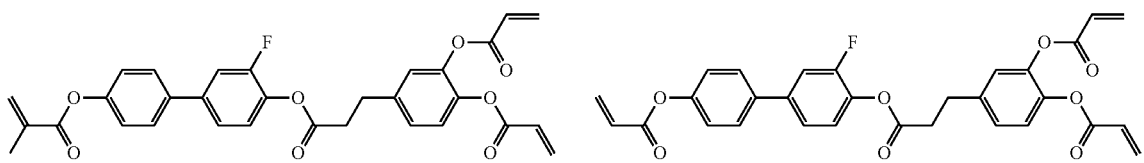
(I-33) (I-34)
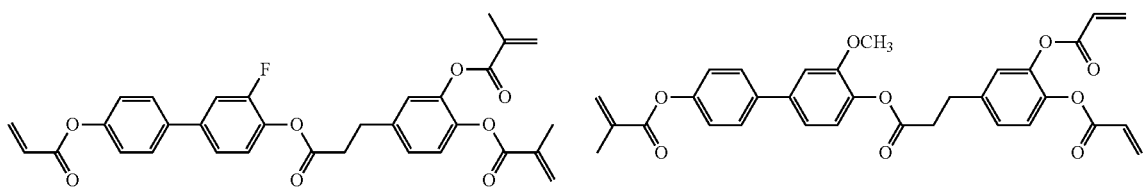
(I-35) (I-36)
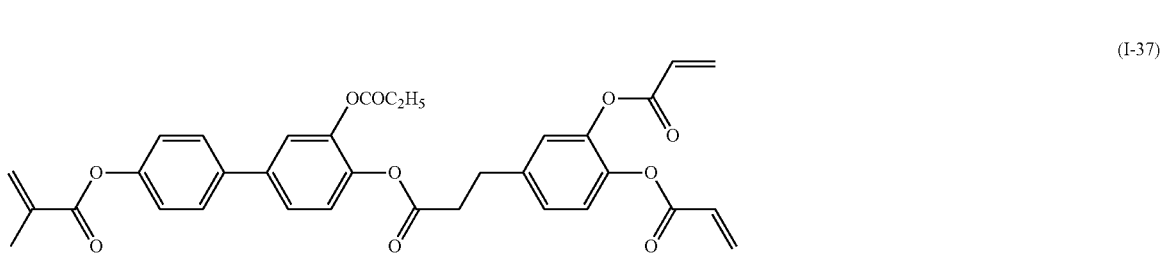
(I-37)
[Chem. 23]
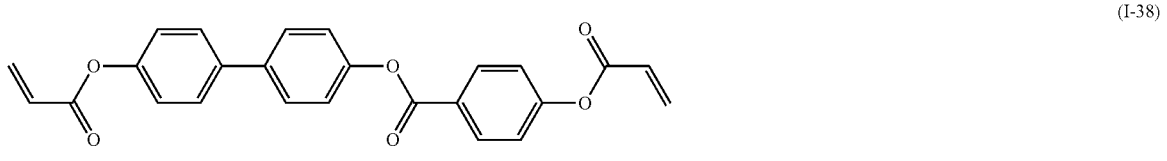
(I-38)
[Chem. 24]
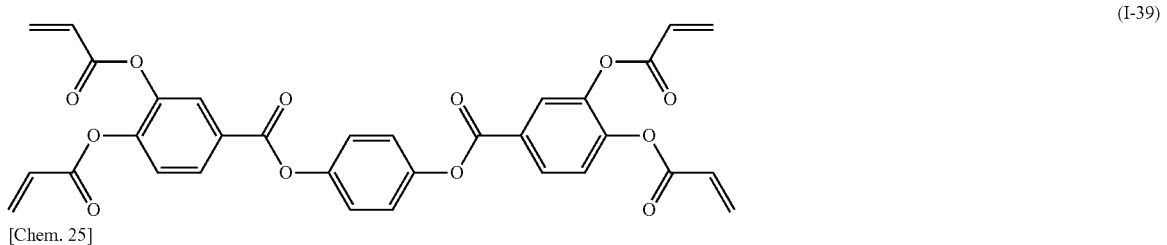
(I-39)
[Chem. 25]
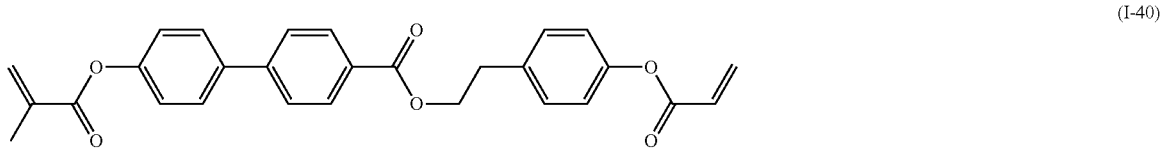
(I-40)

More preferable embodiment of the first component according to the present invention is General Formula (Ia):

[Chem. 26]

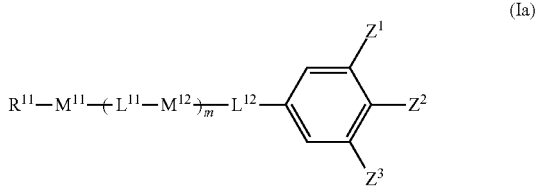
(Ia)

(in the general formula (Ia), $Z^1$, $Z^2$, and $Z^3$ each independently are at least one selected from the group consisting of a hydrogen atom and the formulae (R-1) to (R-15), and, in the general formula (Ia), since $R^{11}$, $M^{11}$, $L^{11}$, $M^{12}$, $L^{12}$, and m are common with those of the general formula (I), they will be omitted).

In particularly preferable embodiment of the first component according to the present invention, in the general formula (Ia), m is 1 or more, $R^1$ is at least one selected from the group consisting of the formulae (R-1) to (R-15), at least two groups of $Z^1$, $Z^2$, and $Z^3$ is at least one selected from the group consisting of the formulae (R-1) to (R-15), and $L^{11}$ and $L^{12}$ are common with those of the general formula (I), provided that any one of $L^{11}$ and $L^{12}$ is —(CH$_2$)$_z$—C(=O)—O—, —(CH$_2$)$_z$—O—(C=O)—, —O—(C=O)—(CH$_2$)$_z$—, or —(C=O)—O—(CH$_2$)$_z$—, $M^{12}$ represents a 1,4-phenylene group, a 1,4-cyclohexylene group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, which is unsubstituted or is substituted with at least one substituent selected from the group consisting of an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, and a nitro group, and $M^{11}$ is the following general formula (1-1) or (1-2):

[Chem. 27]

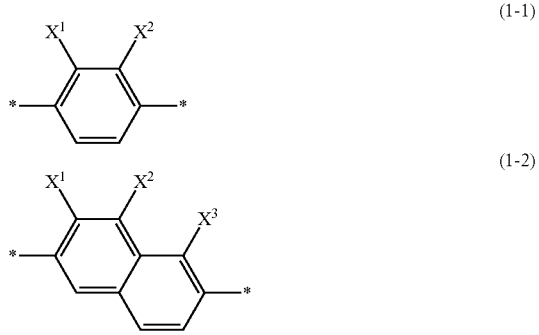
(1-1)

(1-2)

(in the general formulae (1-1) and (1-2), each of $X^1$, $X^2$, and $X^3$ is at least one selected from the group consisting of a hydrogen atom, a halogen atom, an alkoxy group having 1 to 15 carbon atoms, and —OCO(C$_j$H$_{2j+1}$). In the formula, q is an integer of 1 to 5).

When the polymerizable compound having such a chemical structure is added to the liquid crystal composition, a polymer which is excellent in compatibility with another non-polymerizable liquid crystal compound, and is rigid and having high crosslinking density can be produced, so that the alignment regulating force of the coexisting liquid crystal compound can be maintained to be strong. Further, since the liquid crystal composition containing the polymerizable compound has three or more ring structures, when the polymerizable compound according to the present invention has three or more ring structures, light energy is efficiently absorbed, thereby performing a rapid polymerization reaction.

The second component according to the present invention is General Formula (II).

[Chem. 28]

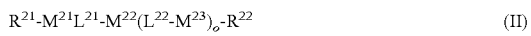
(II)

When a substantially dielectrically neutral compound represented by the general formula (II) is contained in the liquid crystal composition, it is possible to adjust other physical properties, such as nematic phase-isotropic liquid phase transition temperature (T$_{NI}$), liquid crystal phase temperature range, phase transition temperature viscosity ($\eta$), rotational viscosity ($\gamma_1$), and refractive index anisotropy ($\Delta$n), within a preferable range without influencing dielectric anisotropy ($\Delta\in$).

In the compound represented by the general formula (II) which is used as the second component, preferably each of $R^{21}$ and $R^{22}$ is independently an alkyl group having 1 to 10 carbon atoms or an alkenyl group having 2 to 10 carbon atoms (including those in which one —CH$_2$— or two or more non-adjacent —CH$_2$— present in these groups are substituted with —O— or —S—, and those in which one or two or more hydrogen atoms present in these groups are substituted with a fluorine atom or a chlorine atom), more preferably an alkyl group having 1 to 5 carbon atoms, an alkoxy group having 1 to 5 carbon atoms, an alkenyl group having 2 to 5 carbona atoms, or an alkenyloxy group having 3 to 6 carbon atoms, and particularly preferably an alkyl group having 1 to 5 carbon atoms or an alkoxy group having 1 to 5 carbon atoms. It is further preferable that each of $R^{21}$ and $R^{22}$ is linear.

Preferably, each of $M^{21}$, $M^{22}$, and $M^{23}$ is independently a trans-1,4-cyclohexylene group (including those in which one —CH$_2$— or two or more non-adjacent —CH$_2$— present in this group are substituted with —O—), a 1,4-phenylene group (including those in which one —CH= or two or more non-adjacent —CH= present in this group are substituted with —N=), a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably a trans-1,4-cyclohexylene group, a 1,4-phenylene group, or a 1,4-bicyclo[2.2.2]octylene group, and particularly preferably a trans-1,4-cyclohexylene group or a 1,4-phenylene group. o is preferably 0, 1, or 2, and more preferably 0 or 1. Preferably each of $L^{21}$ and $L^{22}$ is independently a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—, more preferably a single bond, —CH$_2$CH$_2$—, —(CH$_2$)$_4$—, —OCH$_2$—, or —CH$_2$O—, and further preferably a single bond or —CH$_2$CH$_2$—.

Among the structures formed by the combination of the above alternatives, —CH=CH—CH=CH—, —C≡C—C≡C—, and —CH=CH—C≡C— are not preferable in terms of chemical stability. Further, a structure obtained by substituting a hydrogen atom in the above-described structures with a fluorine atom is not also preferable. In addition, a structure in which oxygen atoms are bonded with each other, a structure in which sulfur atoms are bonded with each other, and a structure in which a sulfur atom is bonded with an oxygen atom are not also preferable. Moreover, a structure in which nitrogen atoms are bonded with each other, a structure in which a nitrogen atom is bonded with an oxygen atom, and a structure in which a nitrogen atom is bonded with a sulfur atom are not also preferable.

More specifically, it is preferable that the general formula (II) is compounds represented by the group consisting of the following general formulae (II-A) to (II-P) as specific structures thereof.

[Chem. 29]

(II-A)

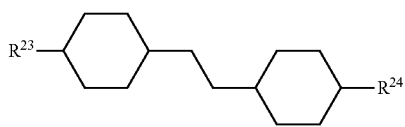
(II-B)

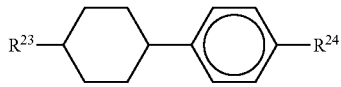
(II-C)

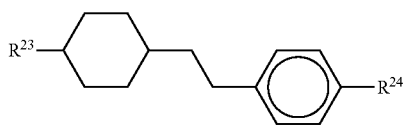
(II-D)

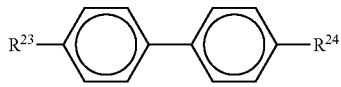
(II-E)

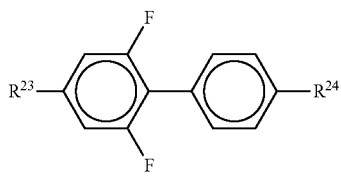
(II-F)

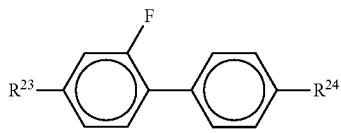
(II-G)

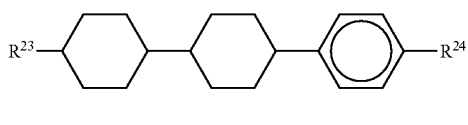
(II-H)

(II-I)

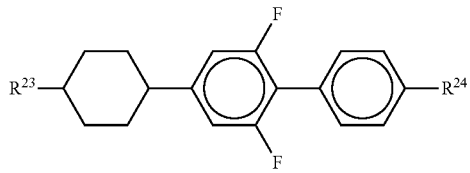
(II-J)

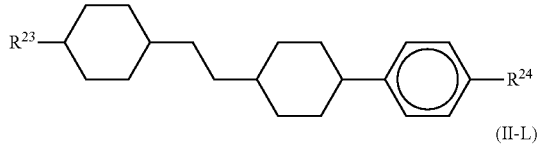
(II-K)

(II-L)

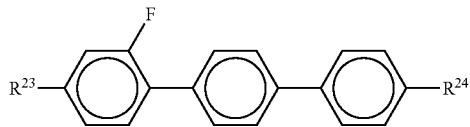
(II-M)

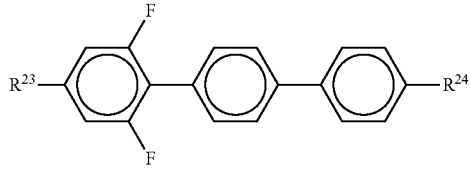
(II-N)

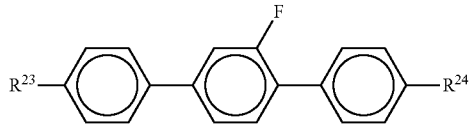
(II-O)

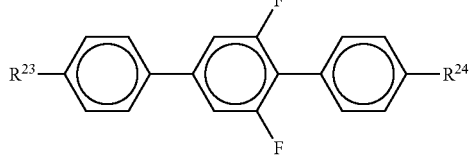
(II-P)

(In the general formulae (II-A) to (II-P), $R^{23}$ and $R^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.)

More preferably each of $R^{23}$ and $R^{24}$ is independently an alkyl group having 1 to 10 carbon atoms, an alkoxy group having 1 to 10 carbon atoms, or an alkenyl group having 2 to 10 carbon atoms, and further preferably an alkyl group having 1 to 5 carbon atoms or an alkoxy group having 1 to 10 carbon atoms. It is further preferable that each of $R^{23}$ and $R^{24}$ is linear.

Among the compounds represented by General Formulae (II-A) to (II-P), compounds represented by General Formulae (II-A), (II-B), (II-C), (II-E), (II-H), (II-I), (II-J), and (II-K) are preferable, and compounds represented by General Formulae (II-A), (II-C), (II-E), (II-H), and (II-I) are further preferable.

The polymerizable compound-containing liquid crystal composition according to the present invention contains at least one kind of compound represented by the general formula (II), but contains preferably one to ten kinds of compounds, and particularly preferably two to eight kinds of compounds. The lower limit of the content ratio of the compound represented by General Formula (II) is preferably 5 mass %, and more preferably 10 mass %, further preferably 20 mass %, and particularly preferably 30 mass %, and the upper limit thereof is preferably 80 mass %, more preferably 70 mass %, and further preferably 60 mass %.

The third component according to the present invention is at least one selected from the group consisting of General Formulae (IIIa), (IIIb), and (IIIc).

[Chem. 30]

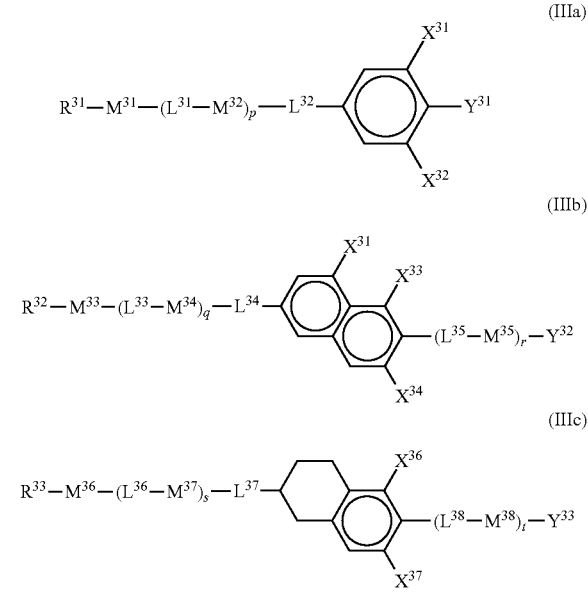

When the dielectrically positive liquid crystalline compounds represented by the above general formulae (IIIa), (IIIb), (IIIc), and (M) is contained in the liquid crystal composition, it is possible to increase the dielectric constant $\epsilon_{//}$ in the long axis direction of liquid crystal molecules. Since dielectric anisotropy $\Delta\epsilon$ is given by $\epsilon_{//}-\epsilon_\perp$, when the dielectric anisotropy ($\Delta\epsilon$) of the liquid crystal composition becomes positive, it is possible to drive the liquid crystal molecules by electric field application as a p-type liquid crystal. Examples of usable liquid crystal display elements include TN-type, STN-type, OCB-type, IPS-type, FFS-type, and GH-type liquid crystal display elements.

In the compounds represented by General Formulae (IIIa), (IIIb), and (IIIc), each of which is used as the third component, preferably each of $R^{31}$, $R^{32}$, and $R^{33}$ is independently an alkyl group having 1 to 10 carbon atoms, an alkenyl group having 2 to 10 carbon atoms, a linear alkyl group having 1 to 15 carbon atoms, or an alkenyl group having 2 to 15 carbon atoms (including those in which one —CH$_2$— or two or more non-adjacent —CH$_2$— present in these groups are substituted with —O— or —S—, and those in which one or two or more hydrogen atoms present in these groups are substituted with a fluorine atom or a chlorine atom), more preferably a linear alkyl group having 1 to 10 carbon atoms, a linear alkoxy group having 1 to 10 carbon atoms, or an alkenyl group having 2 to 10 carbon atoms, and particularly preferably a linear alkyl group having 1 to 8 carbon atoms or an alkoxy group having 1 to 8 carbon atoms.

Preferably each of $M^{31}$, $M^{32}$, $M^{33}$, $M^{34}$, $M^{35}$, $M^{36}$, $M^{37}$, and $M^{38}$ is independently a group represented by a trans-1,4-cyclohexylene group (including those in which one methylene group or two or more non-adjacent methylene groups present in this group are substituted with —O— or —S—), a 1,4-phenylene group (including those in which one —CH= or two or more non-adjacent —CH= present in this group are substituted with —N=), a 1,4 cyclohexenylene group, a 1,4-bicyclo[2.2.2]octylene group, a piperidine-1,4-diyl group, a naphthalene-2,6-diyl group, a 1,2,3,4 tetrahydronaphthalene-2,6-diyl group, and a decahydronaphthalene-2,6-diyl group (including, for each of the groups, those in which a hydrogen atom is substituted with a cyano group, a fluorine atom, a trifluoromethyl group, a trifluoromethoxy group, or a chlorine atom), more preferably a trans-1,4-cyclohexylene group, a 1,4-phenylene group, a 3-fluoro-1,4-phenylene group, or 3,5-difluoro-1,4-phenylene group, further preferably a trans-1,4-cyclohexylene group or a 1,4-phenylene group, and particularly preferably a trans-1,4-cyclohexylene group.

Preferably each of $L^{31}$, $L^{32}$, $L^{33}$, $L^{34}$, $L^{35}$, $L^{36}$, $L^{37}$, and $L^{38}$ is independently a single bond, —OCO—, —COO—, —CH$_2$CH$_2$—, —(CH$_2$)$_4$—, —OCH$_2$—, —CH$_2$O—, —OCF$_2$—, —CF$_2$O—, or —C≡C—, more preferably a single bond, —CH$_2$CH$_2$—, —(CH$_2$)$_4$—, or —C≡C—, and particularly preferably single bond or —CH$_2$CH$_2$—.

$X^{31}$, $X^{32}$, $X^{33}$, $X^{34}$, $X^{35}$, $X^{36}$, and $X^{37}$ each independently represent a hydrogen atom or a fluorine atom, but $X^{31}$ is preferably a fluorine atom, $X^{31}$ and $X^{32}$ are preferably fluorine atoms, $X^{33}$ is preferably a fluorine atom, $X^{33}$ and $X^{34}$ are preferably fluorine atoms, $X^{36}$ is preferably a fluorine atom, and $X^{36}$ and $X^{37}$ are preferably fluorine atoms.

$Y^{31}$, $Y^{32}$, and $Y^{33}$ each independently represent preferably a hydrogen atom, a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atom, more preferably a hydrogen atom, a fluorine atom, a chlorine atom, a cyano group, a trifluoromethoxy group, a trifluoromethyl group, a 2,2,2-trifluoroethyl group, or an alkyl group having 1 to 12 carbon atom, and particularly preferably a fluorine atom.

p, q, r, s, and t each independently represent 0, 1, or 2, provided that q+r and s+t represent 2 or less.

Among the structures formed by the combination of the above alternatives, —CH=CH—CH=CH—, —C≡C—C≡C—, and —CH=CH—C≡C— are not preferable in terms of chemical stability. Further, a structure obtained by substituting a hydrogen atom in the above-described structures with a fluorine atom is not also preferable. In addition, a structure in which oxygen atoms are bonded with each other, a structure in which sulfur atoms are bonded with each other, and a structure in which a sulfur atom is bonded with an oxygen atom are not also preferable. Moreover, a structure in which nitrogen atoms are bonded with each other, a structure in which a nitrogen atom is bonded with an oxygen atom, and a structure in which a nitrogen atom is bonded with a sulfur atom are not also preferable.

Specifically, a structure represented by the following general formula (IIIa-1) is preferable.

[Chem. 31]

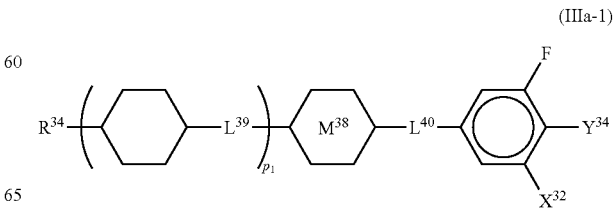

(In the formula, $R^{34}$ represents an alkyl group having 1 to 8 carbon atoms, an alkoxyl group having 1 to 8 carbon atoms, or an alkenyl group having 2 to 8 carbon atoms, $L^{39}$ and $L^{40}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{38}$ represents a 1,4-phenylene group or a trans-1,4-cyclohexylene group, $X^3$ represents a hydrogen atom or a fluorine atom, pi represents 0 or 1, and $Y^{34}$ represents a cyano group, a fluorine atom, a chlorine atom, a trifluoromethyl group, a fluoromethoxy group, a difluoromethoxy group, or a trifluoromethoxy group.)

More specifically, structures represented by the following general formulae (IIIa-2a) to (IIIa-4d) are preferable:

[Chem. 32]

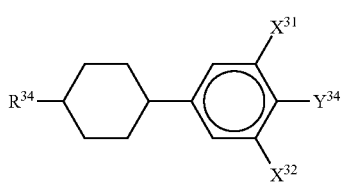
(IIIa-2a)

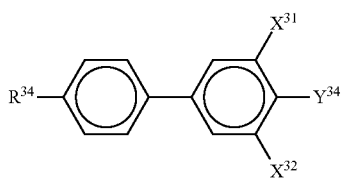
(IIIa-2b)

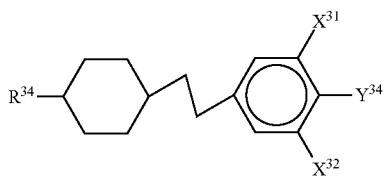
(IIIa-2c)

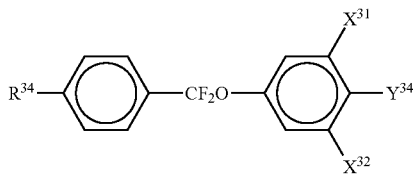
(IIIa-2d)

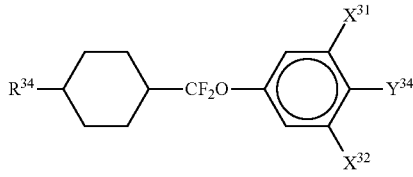
(IIIa-2e)

[Chem. 33]

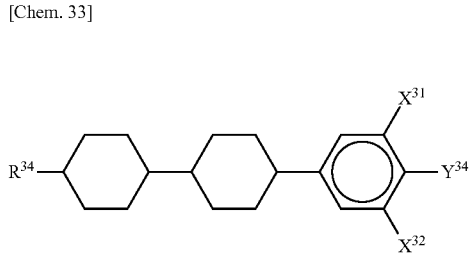
(IIIa-3a)

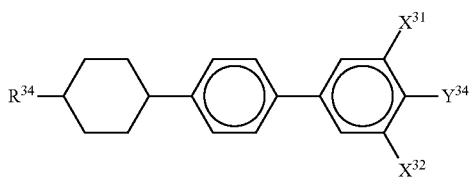
(IIIa-3b)

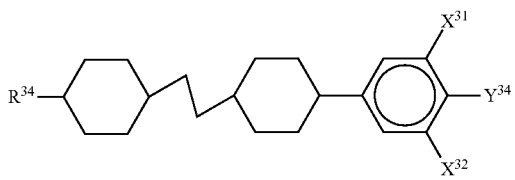
(IIIa-3c)

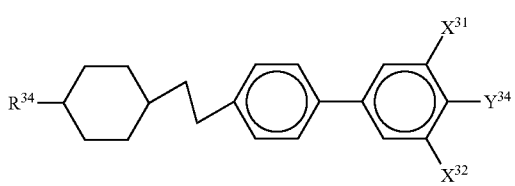
(IIIa-3d)

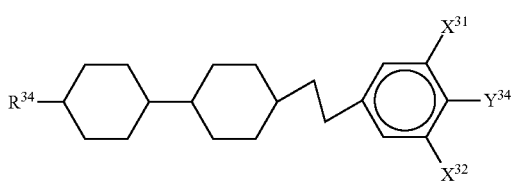
(IIIa-3e)

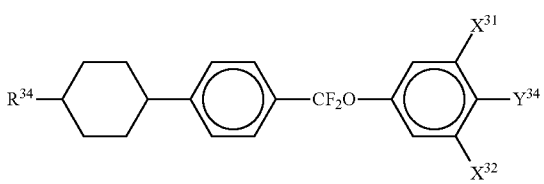
(IIIa-3f)

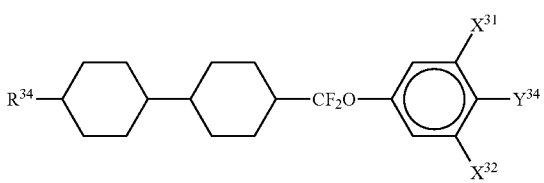
(IIIa-3g)

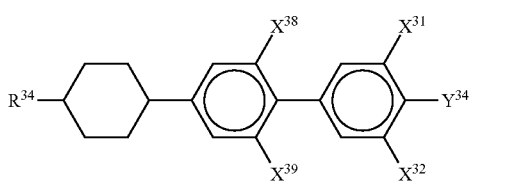
(IIIa-3h)

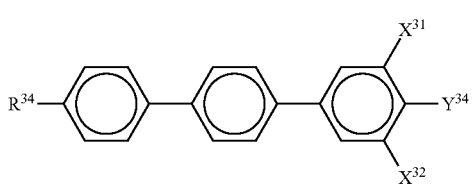
(IIIa-3i)

(IIIa-3j)

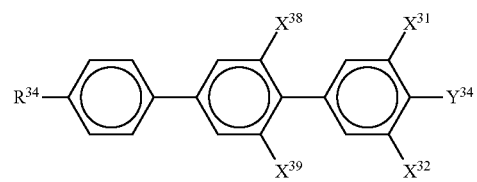

[Chem. 34]

(IIIa-4a)

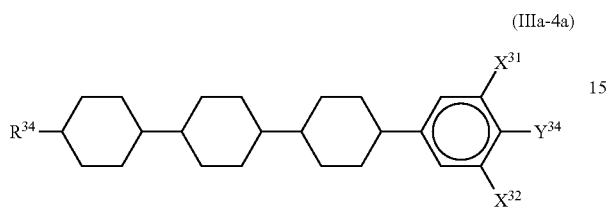

(IIIa-4b)

(IIIa-4c)

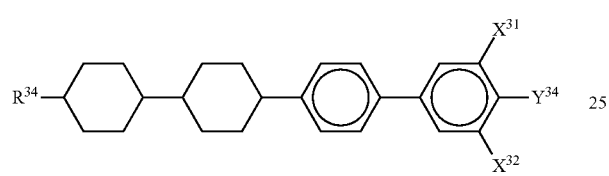

(IIIa-4d)

(in the formulae, R³⁴ represents an alkyl group having 1 to 8 carbon atoms, an alkoxyl group having 1 to 8 carbon atoms, or an alkenyl group having 2 to 8 carbon atoms, X³¹ and X³² each independently represent a hydrogen atom or a fluorine atom, and Y³¹ represents a cyano group, a fluorine atom, a chlorine atom, a trifluoromethyl group, a fluoromethoxy group, a difluoromethoxy group, or a trifluoromethoxy group.) Structures represented by the following general formulae are also preferable:

[Chem. 35]

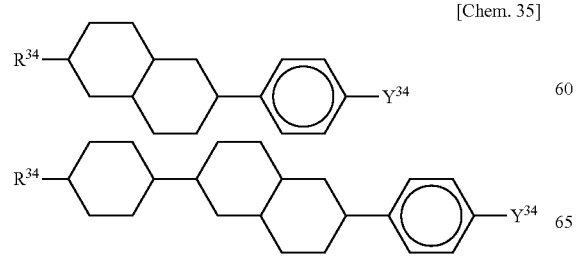

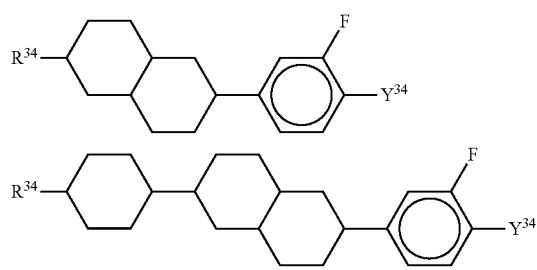

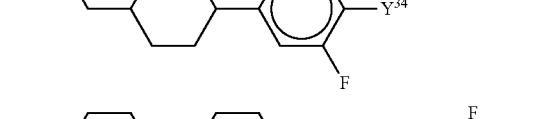

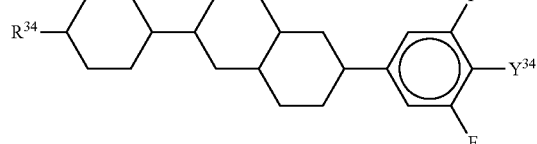

(in the general formulae, R³⁴ represents an alkyl group having 1 to 8 carbon atoms, an alkoxyl group having 1 to 8 carbon atoms, or an alkenyl group having 2 to 8 carbon atoms, and Y³¹ represents a cyano group, a fluorine atom, a chlorine atom, a trifluoromethyl group, a fluoromethoxy group, a difluoromethoxy group, or a trifluoromethoxy group.)

Structures represented by the following general formulae are preferable as specific structures of General Formula (IIIb):

[Chem. 36]

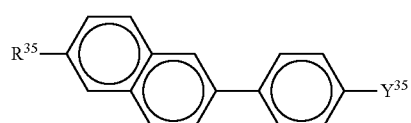
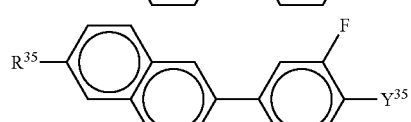
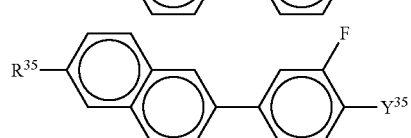
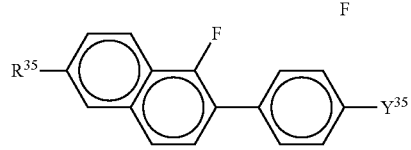

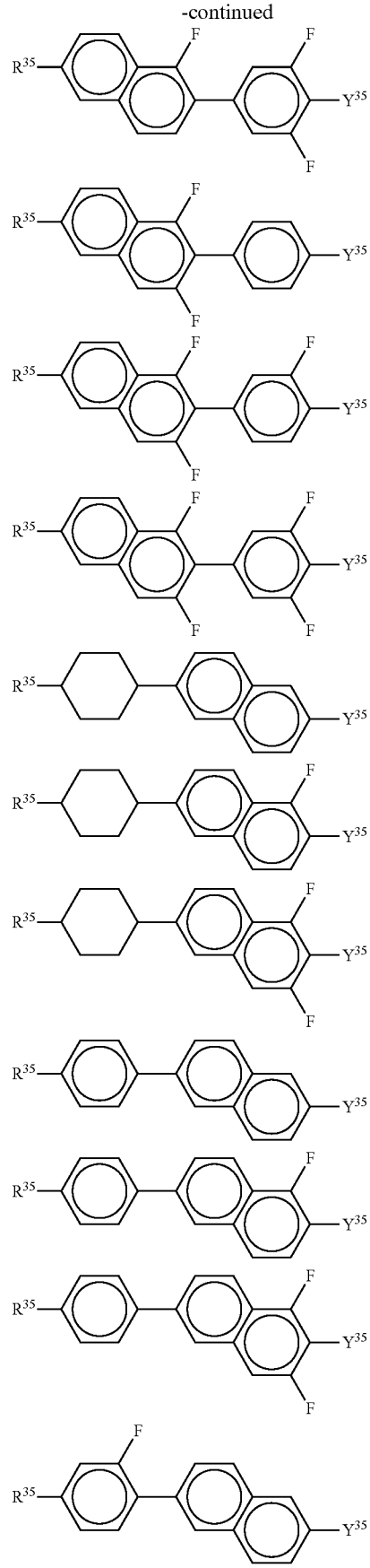
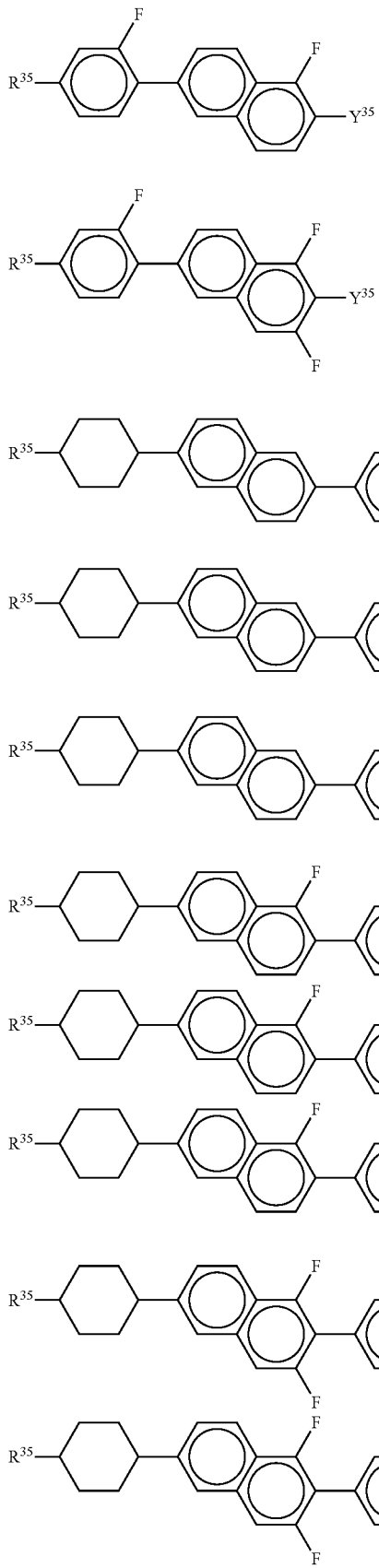
[Chem. 37]

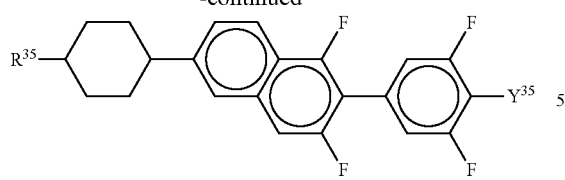
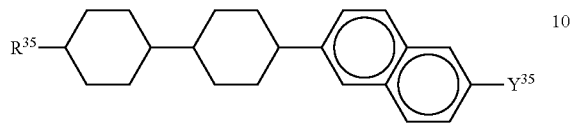
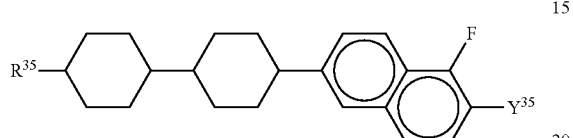
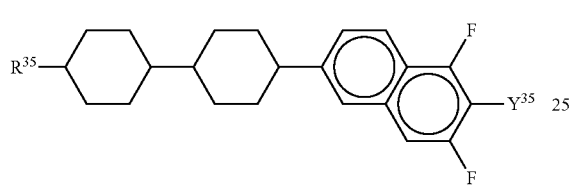
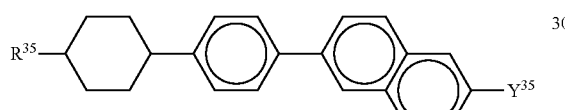
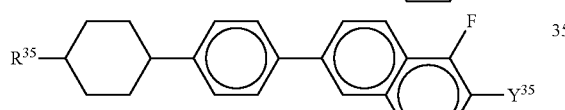
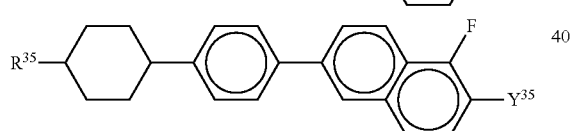
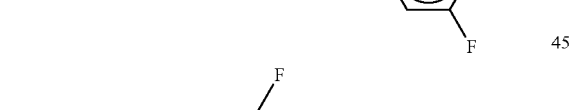
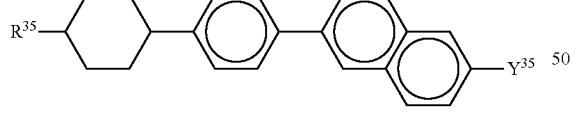
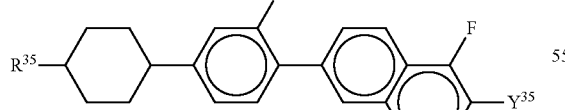
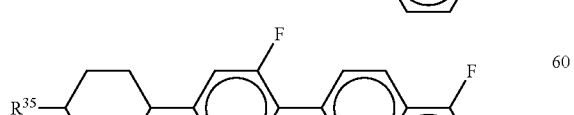

[Chem. 38]

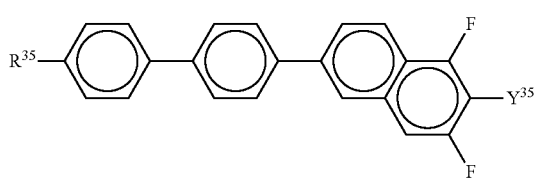
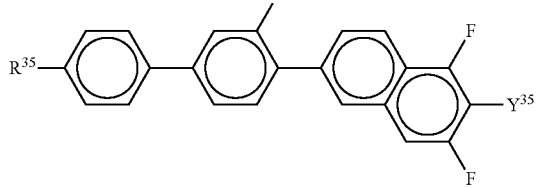
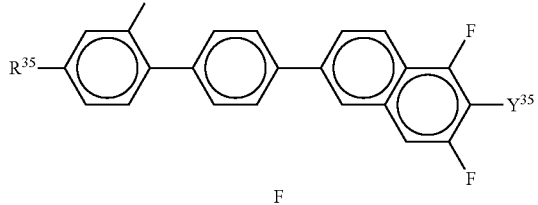
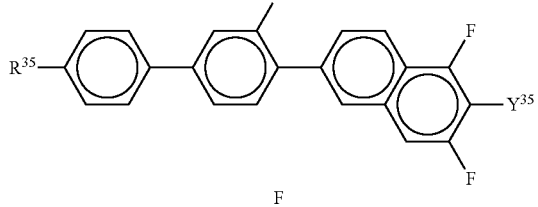
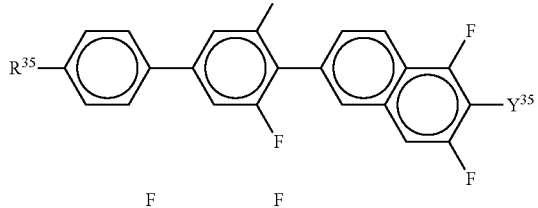
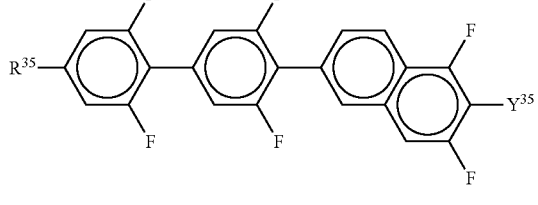
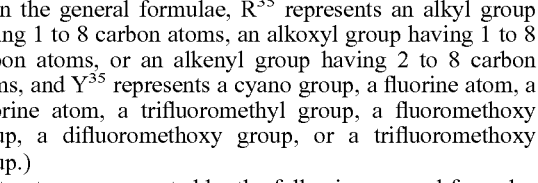
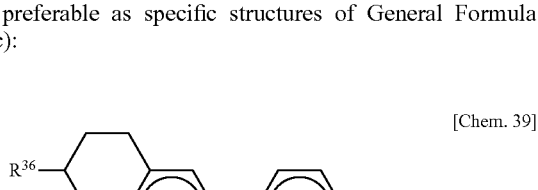

(in the general formulae, $R^{35}$ represents an alkyl group having 1 to 8 carbon atoms, an alkoxyl group having 1 to 8 carbon atoms, or an alkenyl group having 2 to 8 carbon atoms, and $Y^{35}$ represents a cyano group, a fluorine atom, a chlorine atom, a trifluoromethyl group, a fluoromethoxy group, a difluoromethoxy group, or a trifluoromethoxy group.)

Structures represented by the following general formulae are preferable as specific structures of General Formula (IIIc):

[Chem. 39]

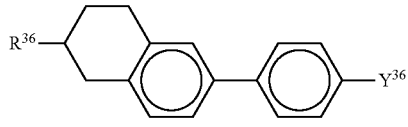

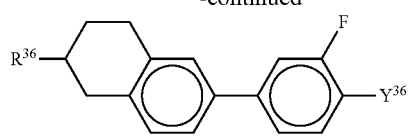
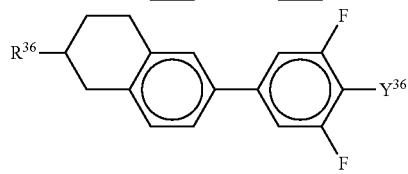
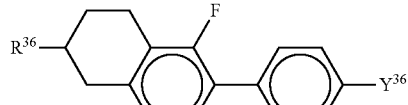
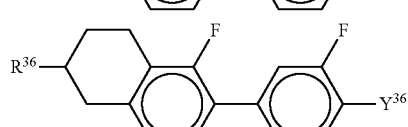
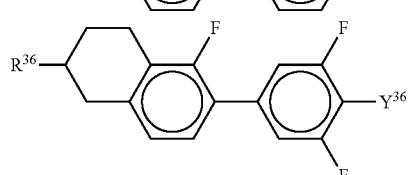
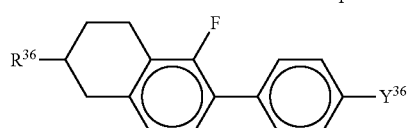
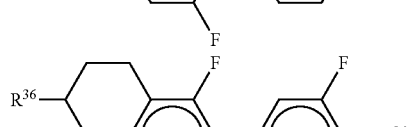
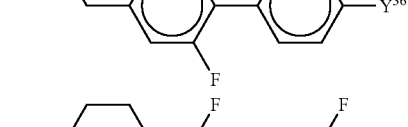
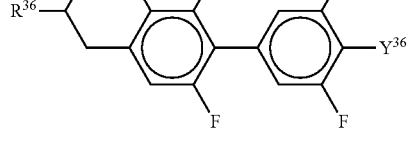
[Chem. 40]
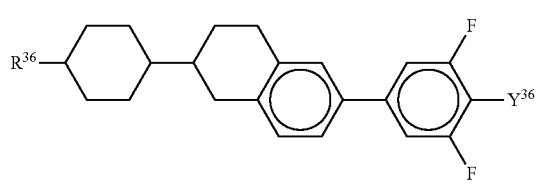
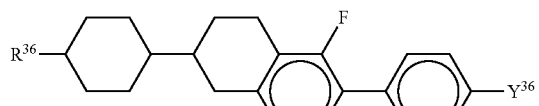
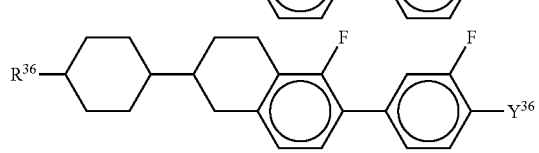
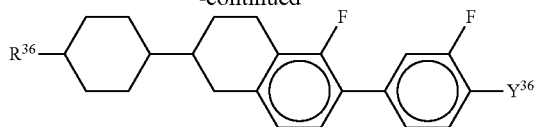
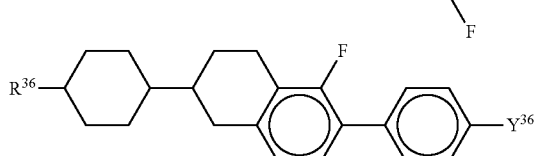
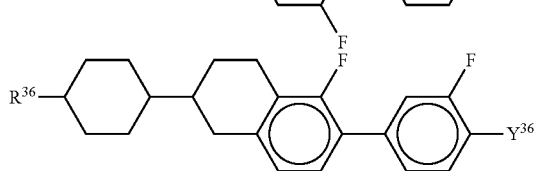
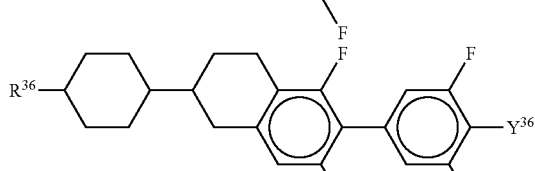
[Chem. 41]
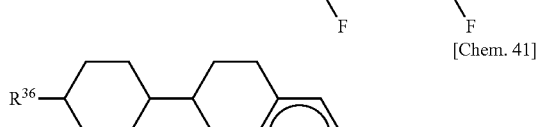
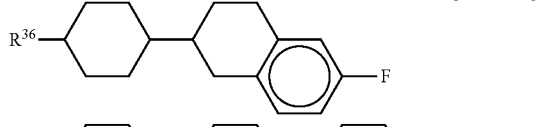
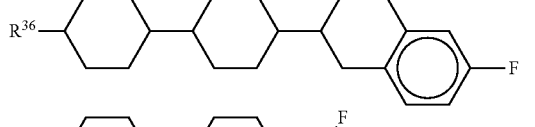
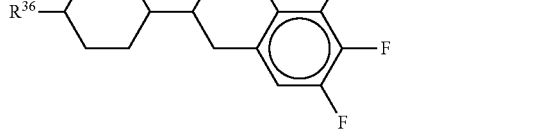
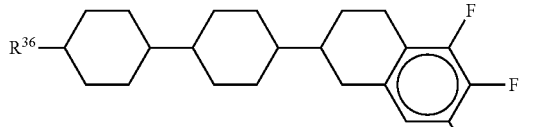
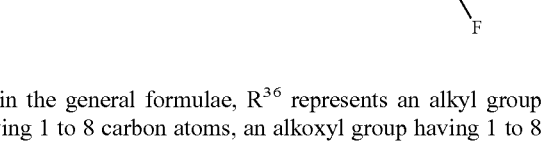
(in the general formulae, $R^{36}$ represents an alkyl group having 1 to 8 carbon atoms, an alkoxyl group having 1 to 8 carbon atoms, or an alkenyl group having 2 to 8 carbon atoms, and $Y^{36}$ represents a cyano group, a fluorine atom, a chlorine atom, a trifluoromethyl group, a fluoromethoxy group, a difluoromethoxy group, or a trifluoromethoxy group.)

The polymerizable compound-containing liquid crystal composition according to the present invention contains at least one kind of compound selected from the group consisting of compounds represented by General Formulae (IIIa), (IIIb), and (IIIc), but contains preferably one to ten kinds of compounds, and particularly preferably two to eight kinds of compounds. The lower limit of the content ratio of the group consisting of compounds represented by General Formulae (IIIa), (IIIb), and (IIIc) is preferably 5 mass %, more preferably 10 mass %, and preferably 20 mass %, and the upper limit thereof is preferably 80 mass %, preferably 70 mass %, preferably 60 mass %, and further preferably 50 mass %.

The fourth component according to the present invention is at least one selected from the group consisting of compounds represented by General Formulae (IVa), (IVb), and (IVc).

[Chem. 42]

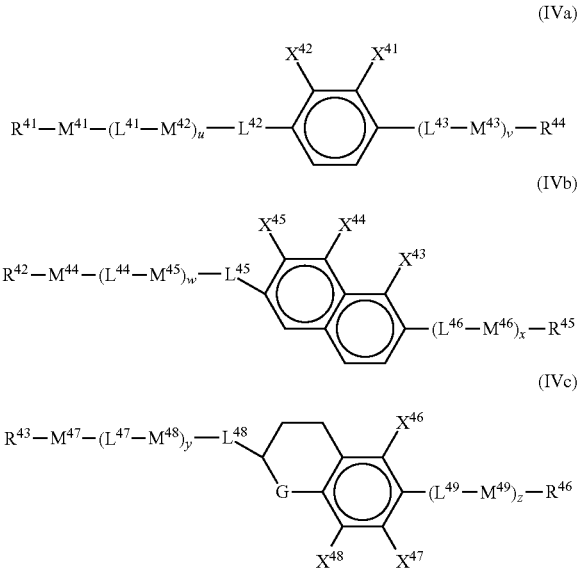

When the dielectrically negative liquid crystalline compounds represented by the above general formulae (IVa), (IVb), and (IVc) are contained in the liquid crystal composition, it is possible to increase the dielectric constant $\in_\perp$ in the short axis direction of liquid crystal molecules. Since dielectric anisotropy $\Delta\in$ is given by $\in_{//}-\in_\perp$, when the dielectric anisotropy ($\Delta\in$) of the liquid crystal composition becomes negative, it is possible to drive the liquid crystal molecules by electric field application as an n-type liquid crystal. Examples of usable liquid crystal display elements include VA-type, MVA-type, IPS-type, FFS-type, and GH-type liquid crystal display elements.

Further, in the compounds represented by General Formulae (IVa), (IVb), and (IVc), preferably each of $R^{41}$, $R^{42}$, $R^{43}$, $R^{44}$, $R^{45}$, and $R^{46}$ is independently an alkyl group having 1 to 10 carbon atoms, an alkenyl group having 2 to 10 carbon atoms, a linear alkyl group having 1 to 15 carbon atoms, or an alkenyl group having 2 to 15 carbon atoms (including those in which one —$CH_2$— or two or more non-adjacent —$CH_2$— present in these groups are substituted with —O— or —S—, and those in which one or two or more hydrogen atoms present in these groups are substituted with a fluorine atom or a chlorine atom), more preferably a linear alkyl group having 1 to 10 carbon atoms, a linear alkoxy group having 1 to 10 carbon atoms, or a linear alkenyl group having 2 to 10 carbon atoms, and particularly preferably a linear alkyl group having 1 to 8 carbon atoms or a linear alkoxy group having 1 to 8 carbon atoms.

Preferably each of $M^{41}$, $M^{42}$, $M^{43}$, $M^{44}$, $M^{45}$, $M^{46}$, $M^{47}$, $M^{48}$, and $M^{49}$ is independently a group represented by a trans-1,4-cyclohexylene group (including those in which one —$CH_2$— or two or more non-adjacent —$CH_2$— present in this group are substituted with —O— or —S—), a 1,4-phenylene group (including those in which one —CH= or two or more non-adjacent —CH= present in this group are substituted with —N=), a 1,4 cyclohexenylene group, a 1,4-bicyclo[2.2.2]octylene group, a piperidine-2,5-diyl group, a naphthalene-2,6-diyl group, a 1,2,3,4 tetrahydronaphthalene-2,6-diyl group, or a decahydronaphthalene-2,6-diyl group (including those in which a hydrogen atom contained in each of the groups is substituted with a cyano group, a fluorine atom, a trifluoromethyl group, a trifluoromethoxy group, or a chlorine atom), more preferably a trans-1,4-cyclohexylene group, a 1,4-phenylene group, a 3-fluoro-1,4-phenylene group, or 2,3-difluoro-1,4-phenylene group, further preferably a trans-1,4-cyclohexylene group or a 1,4-phenylene group, and particularly preferably a trans-1,4-cyclohexylene group.

Preferably each of $L^{41}$, $L^{42}$, $L^{43}$, $L^{44}$, $L^{45}$, $L^{46}$, $L^{47}$, $L^{48}$ and $L^{49}$ is independently a single bond, —$CH_2CH_2$—, —$(CH_2)_4$—, —OCO—, —COO—, —$OCH_2$—, —$CH_2O$—, —$OCF_2$—, —$CF_2O$—, or —C≡C—, and more preferably a single bond, —$CH_2CH_2$—, —$(CH_2)_4$—, —$OCH_2$—, —$CH_2O$—, —$OCF_2$—, —$CF_2O$—, or —C≡C—.

$X^{41}$, $X^{42}$, $X^{43}$, $X^{44}$, $X^{45}$, $X^{46}$, $X^{47}$, and $X^{48}$ each independently represent a hydrogen atom, a trifluoromethyl group, a trifluoromethoxy group, a chlorine atom, or a fluorine atom, but $X^{42}$ is preferably a fluorine atom, $X^{41}$ and $X^{42}$ are preferably fluorine atoms, $X^{41}$ is preferably a chlorine atom and $X^{42}$ is preferably a fluorine atom, $X^{43}$ is preferably a fluorine atom, $X^{43}$ and $X^{44}$ are preferably fluorine atoms, $X^{43}$ and $X^{45}$ are preferably fluorine atoms, $X^{43}$, $X^{44}$, and $X^{45}$ are preferably fluorine atoms, $X^{46}$ is preferably a fluorine atom, and $X^{47}$ and $X^{48}$ are preferably fluorine atoms.

G represents a methylene group or —O—, and is preferably —O—.

u, v, w, x, y, and z each independently represent 0, 1, or 2, but preferably u+v, w+x, and y+z represent 2 or less.

Among the structures formed by the combination of the above alternatives, —CH=CH—CH=CH—, —C≡C—C≡C—, and —CH=CH—C≡C— are not preferable in terms of chemical stability. Further, a structure obtained by substituting a hydrogen atom in the above-described structure with a fluorine atom is not also preferable. In addition, a structure in which oxygen atoms are bonded with each other, a structure in which sulfur atoms are bonded with each other, and a structure in which a sulfur atom is bonded with an oxygen atom are not also preferable. Moreover, a structure in which nitrogen atoms are bonded with each other, a structure in which a nitrogen atom is bonded with an oxygen atom, and a structure in which a nitrogen atom is bonded with a sulfur atom are not also preferable.

In the compound represented by General Formula (IVa), specifically, a structure represented by the following general formula (IVa-1) is preferably exhibited.

(IVa-1)

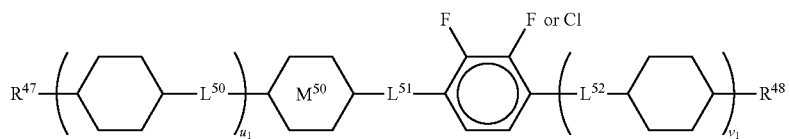

(In the formula, $R^{47}$ and $R^{48}$ each independently represent an alkyl group having 1 to 8 carbon atoms, an alkoxyl group having 1 to 8 carbon atoms, or an alkenyl group having 2 to 8 carbon atoms, $L^{50}$, $L^{51}$, and $L^{52}$ each represent a single bond, —CH$_2$CH$_2$—, —(CH$_2$)$_4$—, —OCH$_2$—, —CH$_2$O—, —OCF$_2$—, —CF$_2$O—, or —C≡C—, $M^{50}$ represents a 1,4-phenylene group or a trans-1,4-cyclohexylene group, and $u_1$ and $v_1$ each independently represent 0 or 1.)

More specifically, structures represented by the following general formulae (IVa-2a) to (IVa-3k) are preferable:

[Chem. 44]

(IVa-2a)
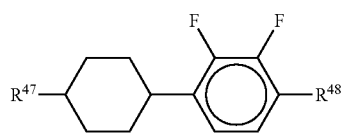

(IVa-2b)
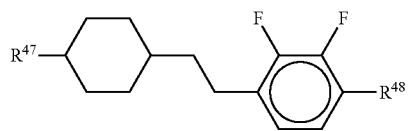

(IVa-2c)
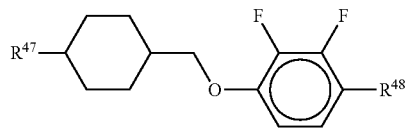

(IVa-2d)
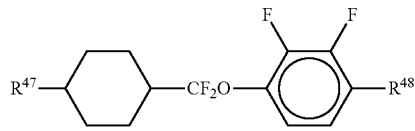

[Chem. 45]

(IVa-3a)
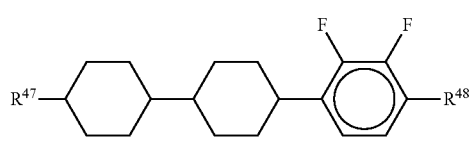

(IVa-3b)
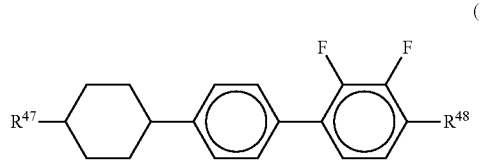

-continued (IVa-3c)
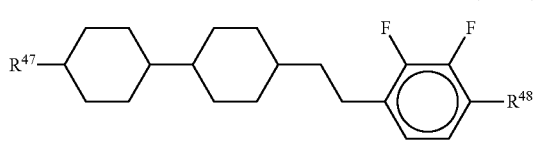

(IVa-3d)
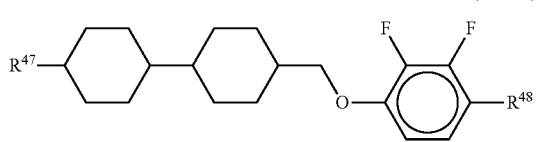

(IVa-3e)
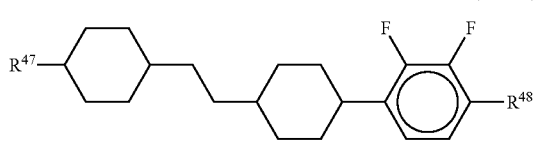

(IVa-3f)
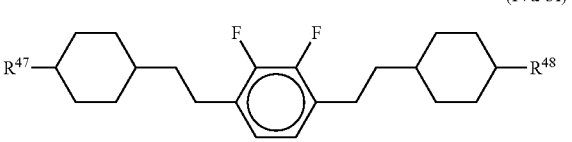

(IVa-3g)
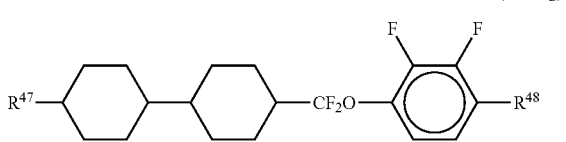

(IVa-3h)
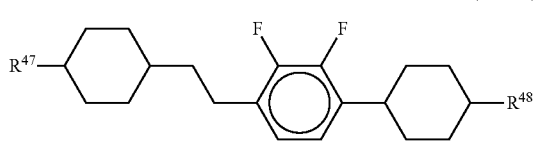

(IVa-3i)
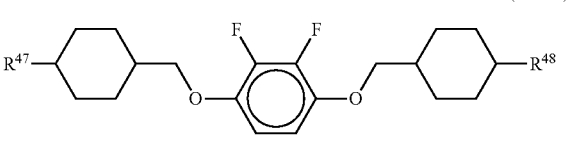

(IVa-3j)
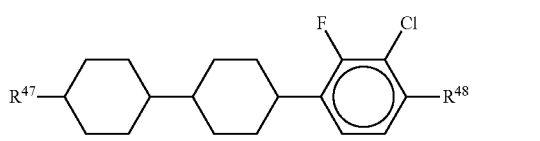

(IVa-3k)

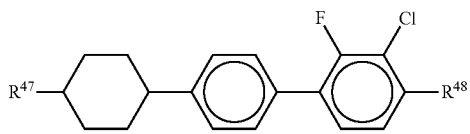

(in the formulae, $R^{47}$ and $R^{48}$ each independently represent an alkyl group having 1 to 8 carbon atoms, an alkoxyl group having 1 to 8 carbon atoms, or an alkenyl group having 2 to 8 carbon atoms.) More preferably, each of $R^{47}$ and $R^{48}$ is independently an alkyl group having 1 to 8 carbon atoms or an alkoxyl group having 1 to 8 carbon atoms.

In the compound represented by General Formula (IVb), specifically, a structure represented by the following general formula (IVb-1) is preferably exhibited.

[Chem. 46]

(IVb-1)

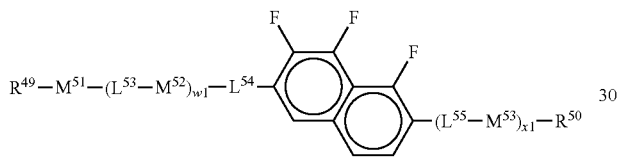

(In the formula, $R^{49}$ and $R^{50}$ each independently represent an alkyl group having 1 to 8 carbon atoms, an alkoxyl group having 1 to 8 carbon atoms, or an alkenyl group having 2 to 8 carbon atoms, $L^{52}$, $L^{53}$, and $L^{54}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{51}$, $M^{52}$, and $M^{53}$ represent a 1,4-phenylene group or a trans-1,4-cyclohexylene group, and w1 and x1 independently represent 0, 1, or 2, provided that w1+x1 represents 2 or less.)

More specifically, structures represented by the following general formulae (IVb-2a) to (IVb-3f) are preferable:

[Chem. 47]

(IVb-2a)

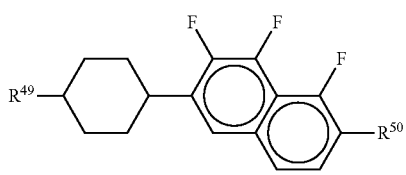

(IVb-2b)

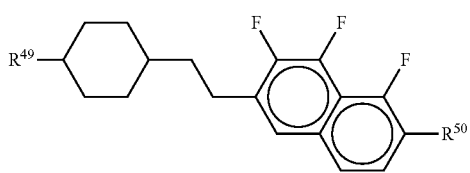

(IVb-2c)

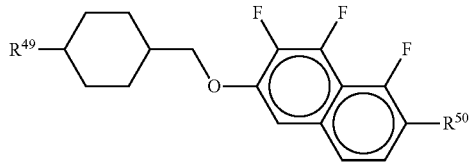

(IVb-2d)

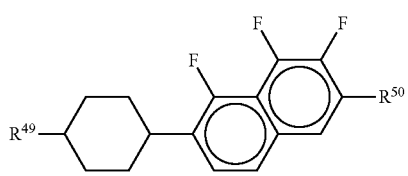

(IVb-2e)

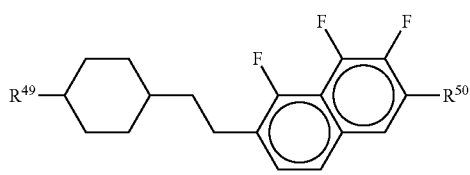

[Chem. 48]

(IVb-3a)

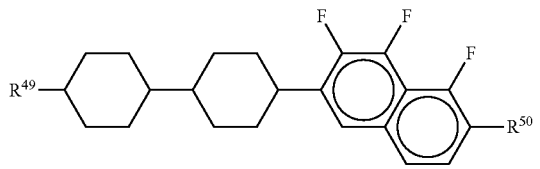

(IVb-3b)

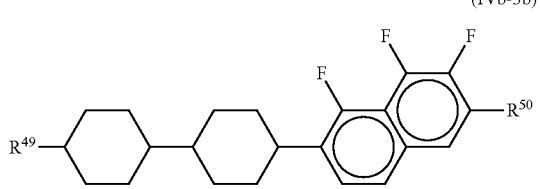

(IVb-3c)

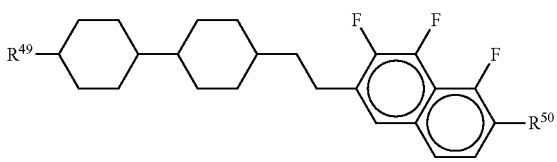

(IVb-3d)

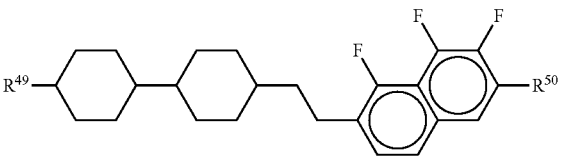

(IVb-3e)

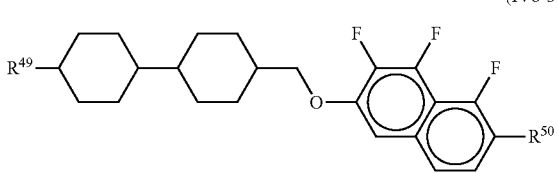

-continued (IVb-3f)

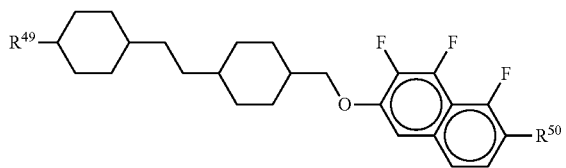

(in the formulae, $R^{49}$ and $R^{50}$ each independently represent an alkyl group having 1 to 8 carbon atoms, an alkoxyl group having 1 to 8 carbon atoms, or an alkenyl group having 2 to 8 carbon atoms.)

In the compound represented by General Formula (IVc), specifically, structures represented by the following general formulae (IVc-1a) and (IVc-1b) are preferably exhibited.

[Chem. 49]

(IVc-1a)

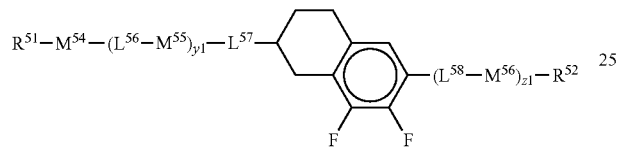

(IVc-1b)

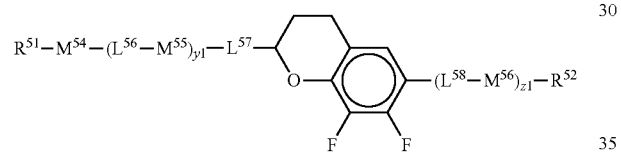

(In the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms, $L^{56}$, $L^{57}$, and $L^{58}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{54}$, $M^{55}$ and $M^{56}$ represent a 1,4-phenylene group or a trans-1,4-cyclohexylene group, and y1 and z1 independently represent 0, 1, or 2, provided that y1+z1 represents 2 or less.)

More specifically, the following general formulae (IVc-2a) to (IVc-2g):

[Chem. 50]

(IVc-2a)

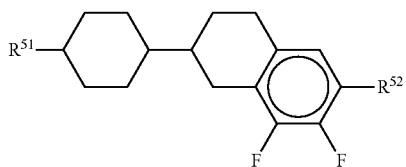

(IVc-2b)

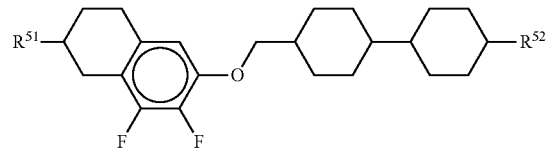

(IVc-2c)

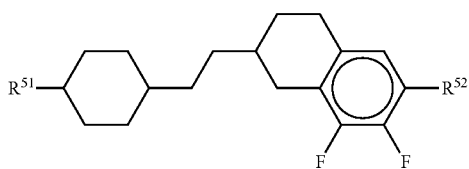

(IVc-2d)

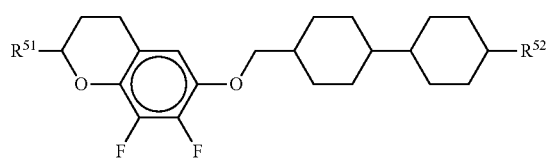

(IVc-2e)

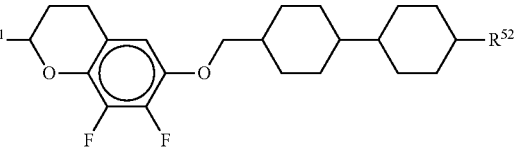

(IVc-2f)

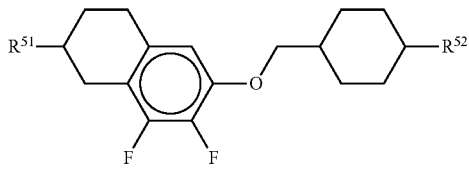

(IVc-2g)

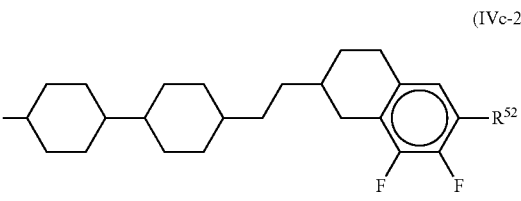

(in the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms.)

The polymerizable compound-containing liquid crystal composition according to the present invention contains at least one kind of compound selected from the group consisting of compounds represented by the general formulae (IIIa), (IIIb), and (IIIc), which are used as the third component, or at least one kind of compound selected from the group consisting of compounds represented by the general formulae (IVa), (IVb), and (IVc) but contains preferably two to ten kinds of compounds, and particularly preferably two to eight kinds of compounds. The lower limit of the content ratio thereof is preferably 5 mass %, and more preferably 10 mass %, and further preferably 20 mass %, and the upper limit thereof is preferably 80 mass %, preferably 70 mass %, preferably 60 mass %, and preferably 50 mass %.

As the compound of General Formula (IV), compounds represented by the following general formulae (Np-1) and (Np-2) are also preferable:

[Chem. 51]

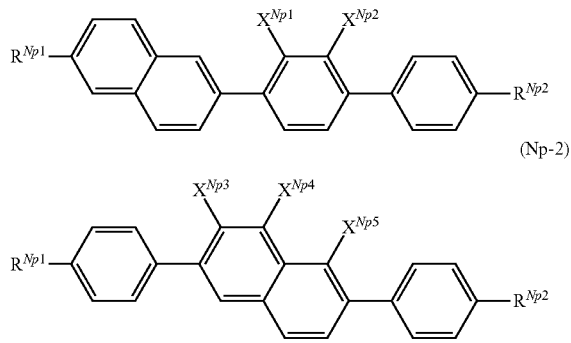

(in the formulae, $R^{Np1}$ and $R^{Np2}$ each independently represent an alkyl group having 1 to 5 carbon atoms or an alkenyl group having 2 to 5 carbon atoms, one —$CH_2$— or two or more non-adjacent —$CH_2$— present in these groups may be each independently substituted with —O— or —S—, one hydrogen atom or two or more hydrogen atoms present in these groups may be each independently substituted with a fluorine atom, and $X^{Np1}$, $X^{Np2}$, $X^{Np3}$, $X^{Np4}$, and $X^{Np5}$ each independently represent a hydrogen atom or a fluorine atom.)

When each of the compounds represented by the following general formulae (Np-1) and (Np-2) is added to the liquid crystal composition containing the polymerizable compound used at the time of fabricating a liquid crystal display element of PSA mode or PSVA mode, the polymerization speed of the contained polymerizable compound becomes sufficiently fast, and thus the residual amount of the polymerizable compound after polymerization is eliminated, or is sufficiently suppressed. Therefore, for example, these compounds can be used as a polymerization reaction rate adjuster used for adapting a polymerization reaction rate to specifications of a WUV irradiation lamp for polymerizing the polymerizable compound.

It is preferable that the liquid crystal compound according to the present invention contains any one or more of compounds represented by the following general formula (M) in addition to the above first component, second component and third component, and a fourth component to be described later.

[Chem. 52]

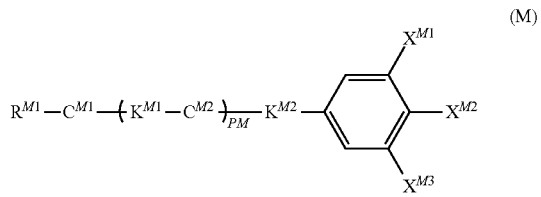

(In the formula, $R^{M1}$ represents an alkyl group having 1 to 8 carbon atoms, and one —$CH_2$— or two or more non-adjacent —$CH_2$— present in this alkyl group each independently may be substituted with —CH=CH—, —C≡C—, —O—, —CO—, —COO— or —OCO—, PM represents 0, 1, 2, 3, or 4, $C^{M1}$ and $C^{M2}$ each independently represents a group selected from the group consisting of (d) a 1,4-cyclohexylene group (one —$CH_2$— or two or more non-adjacent —$CH_2$— present in this group may be substituted with —O— or —S—) and (e) a 1,4-phenylene group (one —CH= or two or more non-adjacent —CH= present in this group may be substituted with —N=), and the group (d) and group (e) each independently may be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM is 2, 3, or 4, and a plurality of $K^{M1}$ exist, they may be the same as or different from each other, and when PM is 2, 3, or 4, and a plurality of $C^{M2}$ exist, they may be the same as or different from each other, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group or a 2,2,2-trifluoroethyl group. Provided that, the compound represented by the general formula (i) and the compound represented by the general formula (ii) are excluded.)

Although the kind of compounds that can be combined is not particularly limited, the plurality of compounds represented by the general formula (M) can be used in combination thereof depending on the desired performance such as solubility at low temperature, transition temperature, electrical reliability, or birefringence. In an embodiment of the present invention, regarding the kind of compounds to be used, for example, there is one kind. In another embodiment of the present invention, there are two kinds. In still another embodiment of the present invention, there are three kinds. In still another embodiment of the present invention, there are four kinds. In still another embodiment of the present invention, there are five kinds. In still another embodiment of the present invention, there are six kinds. Instill another embodiment of the present invention, there are seven or more kinds.

Meanwhile, in an embodiment of the present invention, the content ratio of the compound represented by the general formula (M) to the total mass of the liquid crystal composition of the present invention is 1 mass % to 95 mass %. In another embodiment of the present invention, the content ratio thereof is 1 mass % to 85 mass %. In still another embodiment of the present invention, the content ratio thereof is 1 mass % to 75 mass %. In still another embodiment of the present invention, the content ratio thereof is 1 mass % to 65 mass %. In still another embodiment of the present invention, the content ratio thereof is 1 mass % to 55 mass %. In still another embodiment of the present invention, the content ratio thereof is 1 mass % to 45 mass %. In still another embodiment of the present invention, the content ratio thereof is 1 mass % to 35 mass %. In still another embodiment of the present invention, the content ratio thereof is 1 mass % to 25 mass %.

$R^{M1}$ is preferably a linear alkyl group having 1 to 5 carbon atoms, a linear alkoxy group having 1 to 4 carbon atoms, or an alkenyl group having 4 to 5 carbon atoms when a ring structure bonded thereto is a phenyl group (aromatic), and $R^{M1}$ is preferably a linear alkyl group having 1 to 5 carbon atoms, a linear alkoxy group having 1 to 4 carbon atoms, or a linear alkenyl group having 2 to 5 carbon atoms when a ring structure bonded thereto is a saturated ring structure such as cyclohexane, pyran, or dioxane.

It is preferable that the compound represented by the general formula (M) does not have a chlorine atom in its molecule when the chemical stability of the liquid crystal composition is required. Further, the compound having a chlorine atom is contained in the liquid crystal composition in an amount of preferably 5% or less, preferably 3% or less, preferably 1% or less, preferably 0.5% or less, and preferably the compound having a chlorine atom is not contained substantially in the liquid crystal composition. The fact that the compound is not substantially contained means that only the compound having a chlorine atom unintendly such as the compounds produced as impurities at the time of compound production is mixed in the liquid crystal composition.

It is preferable that the compound represented by the general formula (M), for example, is a compound selected from the group consisting of compounds represented by General Formula (VIII).

[Chem. 53]

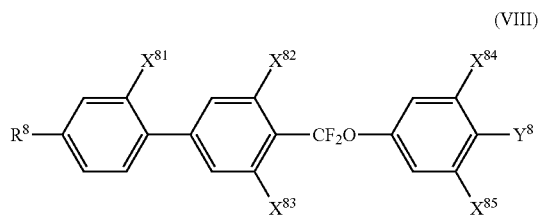

(VIII)

(In the formula, R8 represents an alkyl group having 1 to 5 carbon atoms, an alkenyl group having 2 to 5 carbon atoms, or an alkoxy group having 1 to 4 carbon atoms, $X^{81}$ to $X^{85}$ each independently represent a hydrogen atom or a fluorine atom, and $Y^8$ represents a fluorine atom or —$OCF_3$.)

Although the kind of compounds that can be combined is not particularly limited, the plurality of compounds represented by the general formula (VIII) can be used in combination thereof depending on the desired performance such as solubility at low temperature, transition temperature, electrical reliability, or birefringence. In an embodiment of the present invention, regarding the kind of compounds to be used, for example, there is one kind. In another embodiment of the present invention, there are two kinds. In still another embodiment of the present invention, there are three or more kinds.

Meanwhile, in an embodiment of the present invention, for example, the content ratio of the compound represented by the general formula (VIII) to the total mass of the liquid crystal composition of the present invention is 2 mass % to 40 mass %. In another embodiment of the present invention, for example, the content ratio thereof is 4 mass % to 40 mass %. In still another embodiment of the present invention, for example, the content ratio thereof is 5 mass % to 40 mass %. In still another embodiment of the present invention, for example, the content ratio thereof is 6 mass % to 40 mass %. In still another embodiment of the present invention, for example, the content ratio thereof is 7 mass % to 40 mass %. In still another embodiment of the present invention, for example, the content ratio thereof is 8 mass % to 40 mass %. In still another embodiment of the present invention, for example, the content ratio thereof is 9 mass % to 40 mass %. In still another embodiment of the present invention, for example, the content ratio thereof is 10 mass % to 40 mass %. In still another embodiment of the present invention, for example, the content ratio thereof is 11 mass % to 40 mass %. In still another embodiment of the present invention, for example, the content ratio thereof is 12 mass % to 40 mass %. In still another embodiment of the present invention, for example, the content ratio thereof is 14 mass % to 40 mass %. In still another embodiment of the present invention, for example, the content ratio thereof is 15 mass % to 40 mass %. In still another embodiment of the present invention, for example, the content ratio thereof is 21 mass % to 40 mass %. In still another embodiment of the present invention, for example, the content ratio thereof is 23 mass % to 40 mass %.

Further, in an embodiment of the present invention, the content ratio of the compound to the total mass of the liquid crystal composition of the present invention is 2 mass % to 40 mass %. In another embodiment of the present invention, the content ratio thereof is 2 mass % to 30 mass %. In still another embodiment of the present invention, the content ratio thereof is 2 mass % to 25 mass %. In still another embodiment of the present invention, the content ratio thereof is 2 mass % to 21 mass %. In still another embodiment of the present invention, the content ratio thereof is 2 mass % to 16 mass %. In still another embodiment of the present invention, the content ratio thereof is 2 mass % to 12 mass %. In still another embodiment of the present invention, the content ratio thereof is 2 mass % to 8 mass %. In still another embodiment of the present invention, the content ratio thereof is 2 mass % to 5 mass %.

As the compound represented by the general formula (VIII), specifically, compounds represented by Formulae (26.1) to (26.4) are preferable, compounds represented by Formulae (26.1) to (26.2) are more preferable, and a compound represented by Formula (26.2) is further preferable.

[Chem. 54]

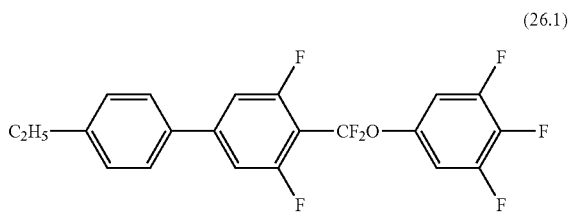

(26.1)

[Chem. 55]

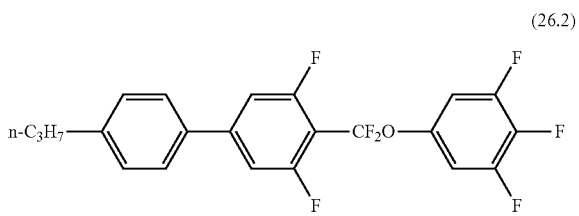

(26.2)

[Chem. 56]

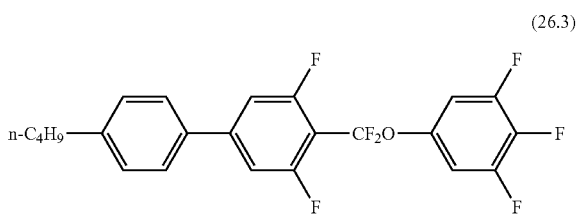

(26.3)

-continued

[Chem. 57]

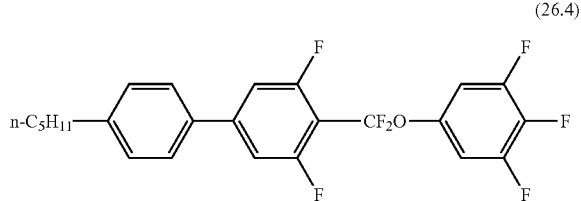
(26.4)

It is preferable that the compound represented by the general formula (M) is a compound represented by General Formula (X-6).

[Chem. 58]

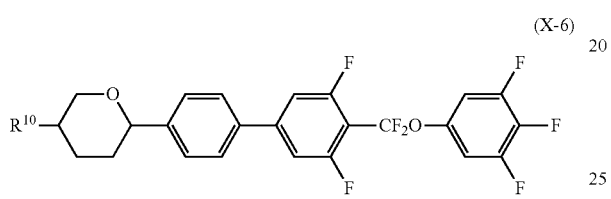
(X-6)

(In the formula, $R^{10}$ represents an alkyl group having 1 to 5 carbon atoms, an alkenyl group having 2 to 5 carbon atoms, or an alkoxy group having 1 to 4 carbon atoms.)

Although the kind of compounds that can be combined is not particularly limited, it is preferable that one kind or two or more kinds of the compounds represented by General Formula (X-6) are combined in consideration of solubility at low temperature, transition temperature, electrical reliability, or birefringence.

When, among the compounds, only one kind thereof is used, the lower limit of the content of the compound to the total mass is preferably 1%, more preferably 2%, and further preferably 3%, and the upper limit of the content of the compound to the total mass is preferably 15%, more preferably 12%, further preferably 10%, particularly preferably 8%, and most preferably 7%.

When, among the compounds, two kinds thereof are used, the lower limit of the total content of the two kinds of the compounds to the total mass is preferably 4%, more preferably 5%, and further preferably 6%, and the upper limit of the total content of the two kinds of the compounds to the total mass is preferably 25%, more preferably 20%, further preferably 18%, and further preferably 16%.

For example, in an embodiment of the present invention, the content ratio of the compound represented by the general formula (X-6) to the total mass of the liquid crystal composition of the present invention is 3 mass % to 30 mass %. In another embodiment of the present invention, the content ratio thereof is 3 mass % to 25 mass %. In still another embodiment of the present invention, the content ratio thereof is 3 mass % to 10 mass %. In still another embodiment of the present invention, the content ratio thereof is 3 mass % to 7 mass %. In still another embodiment of the present invention, the content ratio thereof is 5 mass % to 10 mass %. In still another embodiment of the present invention, the content ratio thereof is 6 mass % to 16 mass %. In still another embodiment of the present invention, the content ratio thereof is 14 mass % to 20 mass %.

Further, for example, in an embodiment of the present invention, the content ratio of the compound to the total mass of the liquid crystal composition of the present invention is 1 mass % to 30 mass %. In another embodiment of the present invention, the content ratio thereof is 1 mass % to 20 mass %. In still another embodiment of the present invention, the content ratio thereof is 1 mass % to 13 mass %. In still another embodiment of the present invention, the content ratio thereof is 1 mass % to 10 mass %. In still another embodiment of the present invention, the content ratio thereof is 1 mass % to 7 mass %. In still another embodiment of the present invention, the content ratio thereof is 1 mass % to 3 mass %.

Meanwhile, as the compound represented by the general formula (X-6) used in the liquid crystal composition of the present invention, specifically, compounds represented by Formulae (44.1) to (44.4) are preferable. Among these compounds represented by Formulae (44.1) to (44.4), compounds represented by Formulae (44.1) and/or (44.2) are preferably contained.

[Chem. 59]

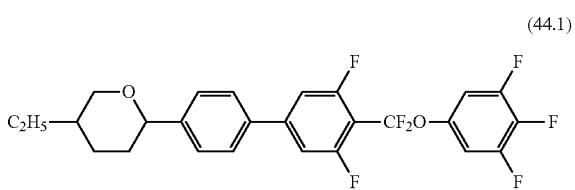
(44.1)

[Chem. 60]

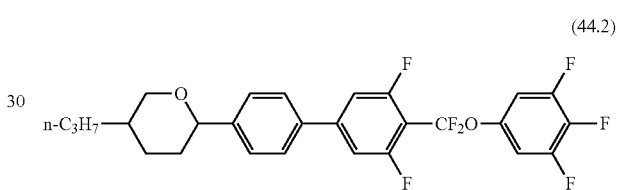
(44.2)

[Chem. 61]

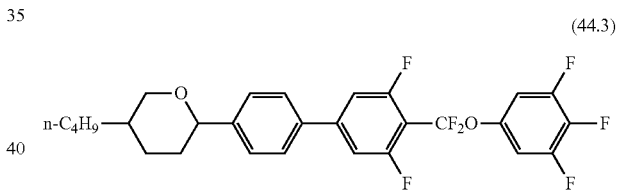
(44.3)

[Chem. 62]

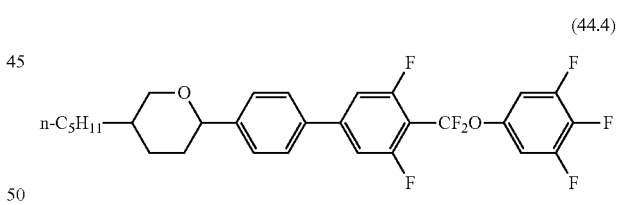
(44.4)

Further, it is preferable that the compound represented by the general formula (M) is a compound represented by General Formula (IX-1-1).

[Chem. 63]

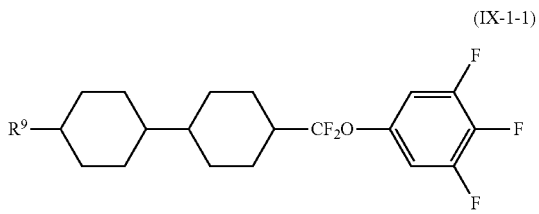
(IX-1-1)

(In the formula, $R^9$ represents an alkyl group having 1 to 5 carbon atoms, an alkenyl group having 2 to 5 carbon atoms, or an alkoxy group having 1 to 4 carbon atoms.)

Although the kind of compounds that can be combined is not particularly limited, the plurality of compounds represented by the general formula (IX-1-1) can be used in combination thereof depending on the desired performance such as solubility at low temperature, transition temperature, electrical reliability, or birefringence. In an embodiment of the present invention, for example, regarding the kind of compounds to be used, for example, there is one kind. In another embodiment of the present invention, there are two kinds.

In an embodiment of the present invention, the content ratio of the compound represented by the general formula (IX-1-1) to the total mass is 1 mass % to 40 mass %. In another embodiment of the present invention, the content ratio thereof is 1 mass % to 35 mass %. In still another embodiment of the present invention, the content ratio thereof is 1 mass % to 30 mass %. In still another embodiment of the present invention, the content ratio thereof is 1 mass % to 25 mass %. In still another embodiment of the present invention, the content ratio thereof is 1 mass % to 10 mass %. In still another embodiment of the present invention, the content ratio thereof is 1 mass % to 7 mass %. In still another embodiment of the present invention, the content ratio thereof is 1 mass % to 5 mass %.

Further, as the compound represented by the general formula (IX-1-1), compounds represented by Formulae (28.1) to (28.5) are preferable. It is preferable that the liquid crystal composition contains any one kind or two kinds of the compounds represented by the formulae (28.3) and (28.5).

[Chem. 64]

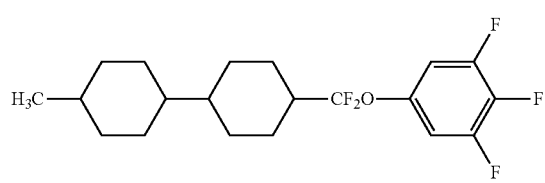

(28.1)

[Chem. 65]

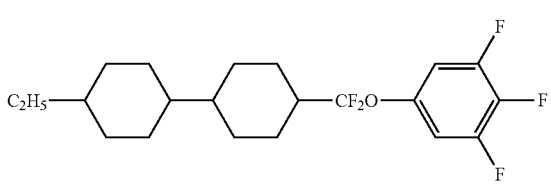

(28.2)

[Chem. 66]

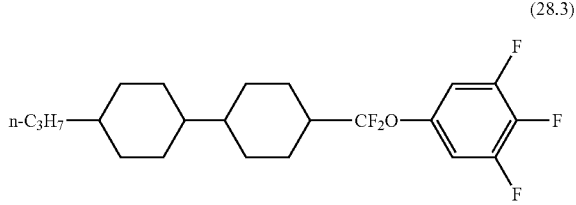

(28.3)

-continued

[Chem. 67]

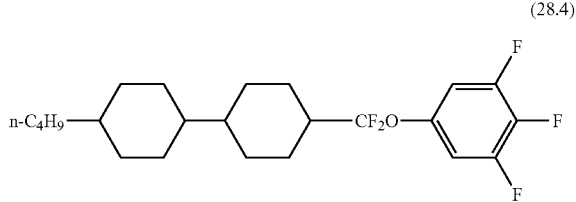

(28.4)

[Chem. 68]

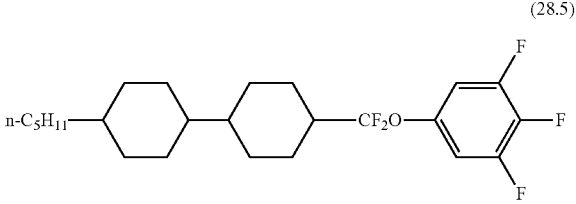

(28.5)

Further, it is preferable that the compound represented by the general formula (M) used in the liquid crystal composition of the present invention is a compound represented by General Formula (XI-1).

[Chem. 69]

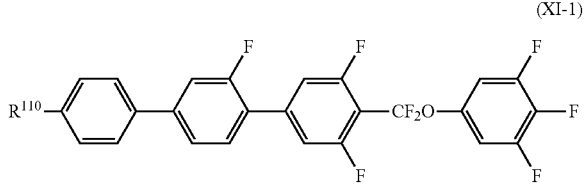

(XI-1)

(In the formula, $R^{110}$ represents an alkyl group having 1 to 5 carbon atoms, an alkenyl group having 2 to 5 carbon atoms, or an alkoxy group having 1 to 4 carbon atoms.)

Although the kind of compounds that can be combined is not particularly limited, the plurality of compounds represented by the general formula (XI-1) can be used in suitable combination thereof with respect to each embodiment in consideration of solubility at low temperature, transition temperature, electrical reliability, or birefringence. For example, in an embodiment of the present invention, one kind of compound is combined. In another embodiment of the present invention, two kinds of compounds are combined. In still another embodiment of the present invention, three or more kinds of compounds are combined.

In consideration of solubility at low temperature, transition temperature, electrical reliability, or the like, the content ratio of the compound represented by the general formula (XI-1) to the total mass of the liquid crystal composition of the present invention is preferably 1 mass % to 20 mass %, more preferably 3 mass % to 20 mass %, further preferably 4 mass % to 20 mass %, further preferably 6 mass % to 15 mass %, and particularly preferably 9 mass % to 12 mass %.

Meanwhile, as the compound represented by the general formula (XI-1) used in the liquid crystal composition of the present invention, specifically, compounds represented by Formulae (45.1) to (45.4) are preferable. Among these compounds represented by Formulae (45.1) to (45.4), compounds represented by Formulae (45.2) to (45.4) are preferably contained, and a compound represented by Formula (45.2) is more preferably contained.

[Chem. 70]

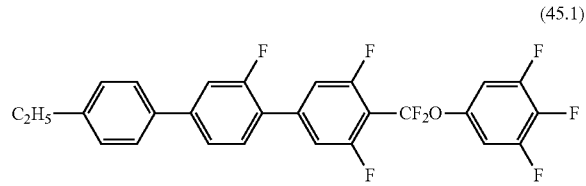
(45.1)

[Chem. 71]

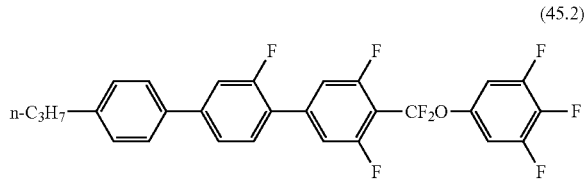
(45.2)

[Chem. 72]

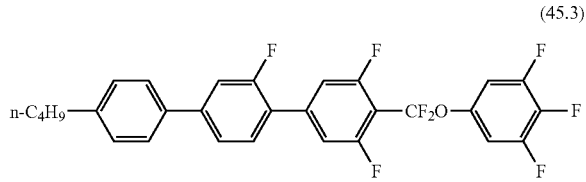
(45.3)

[Chem. 73]

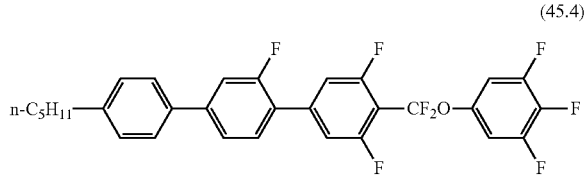
(45.4)

In the present invention, in the polymerizable compound represented by the general formula (I), compound represented by the general formula (II), compounds represented by the general formulae (IIIa) to (IIIc) and compounds represented by the general formulae (Iva) to (IVc) contained in the polymerizable compound-containing liquid crystal composition, each of the compounds does not have partial structures in which hetero atoms are directly bonded to each other, such as —O—O—, —O—S—, and —S—S—.

In a preferred embodiment, the polymerizable compound-containing liquid crystal compound according to the present invention preferably contains 0.01 mass % to 2 mass % of the compound selected from the general formula (I), 5 mass % to 70 mass % of the compound selected from the general formula (II), and 5 mass % to 70 mass % of the compound selected from the group consisting of compounds represented by the general formulae (IIIa), (IIIb) and (IIIc) or the compound selected from the group consisting of compounds represented by the general formulae (IVa), (IVb) and (IVc).

In a preferred embodiment, the polymerizable compound-containing liquid crystal compound according to the present invention preferably contains 0.01 mass % to 2 mass % of the compound selected from the general formula (I), 5 mass % to 70 mass % of the compound selected from the general formula (II), and 5 mass % to 70 mass % of the compound selected from the group consisting of compounds represented by the general formula (M).

The refractive index anisotropy (Δn) of the liquid crystal composition of the present invention at 20° C. is 0.08 to 0.25, but more preferably 0.09 to 0.15, and particularly preferably 0.09 to 0.13. More specifically, in the case of corresponding to thin cell gap, the refractive index anisotropy (Δn) thereof is preferably 0.10 to 0.13, and, in the case of corresponding to thick cell gap, the refractive index anisotropy (Δn) thereof is preferably 0.08 to 0.10.

The liquid crystal composition of the present invention may have a positive or negative dielectric anisotropy $\Delta\in$ depending on the display mode of a liquid crystal display element. When the liquid crystal composition has a negative dielectric anisotropy $\Delta\in$, this composition can be used in liquid crystal display elements of MVA mode, PSVA mode, n-IPS mode, n-FFS mode, and the like. In these liquid crystal display elements, the dielectric anisotropy $\Delta\in$ is preferably −1 or less, and more preferably −2 or less. When the liquid crystal composition has a positive dielectric anisotropy $\Delta\in$, this composition can be used in liquid crystal display elements of TN mode, IPS mode, FFS mode, and the like. In these liquid crystal display elements, the dielectric anisotropy $\Delta\in$ is preferably +3 or more, and more preferably +5 or more.

The liquid crystal composition of the present invention has a wide liquid crystal phase temperature range (absolute value of difference between liquid crystal phase lower limit temperature and liquid crystal phase upper limit temperature), but the liquid crystal phase temperature range is preferably 100° C. or wider, and more preferably 120° C. or wider. Further, the liquid crystal phase upper limit temperature is preferably 70° C. or higher, and more preferably 80° C. or higher. Moreover, liquid crystal phase lower limit temperature is preferably −20° C. or lower, and more preferably −30° C. or lower.

The viscosity (η) of the liquid crystal composition of the present invention at 20° C. is 5 mPa·s to 30 mPa·s, but more preferably 10 mPa·s to 25 mPa·s, and particularly preferably 10 mPa·s to 22 mPa·s.

The rotational viscosity ($\gamma_1$) of the liquid crystal composition of the present invention at 20° C. is 60 mPa·s to 150 mPa·s, but more preferably 60 mPa·s to 110 mPa·s, and particularly preferably 60 mPa·s to 100 mPa·s.

The nematic phase-isotropic liquid phase transition temperature ($T_{ni}$) of the liquid crystal composition of the present invention is 60° C. to 120° C., but more preferably 70° C. to 100° C., and particularly preferably 70° C. to 85° C.

The elastic constant ($K_{33}$) of the liquid crystal composition of the present invention is 12.5 or more, but preferably 13.0 or more, more preferably 13.5 or more, and particularly preferably 14.0 or more.

The liquid crystal composition of the present invention may contain general nematic liquid crystal, smectic liquid crystal, cholesteric liquid crystal, or the like in addition to the above-described compounds.

When the polymerizable compound-containing liquid crystal composition according to the present invention is used as a p-type liquid crystal composition, it is preferable that the composition essentially contains the compound represented by the general formula (I) and at least one compound selected from the group consisting of the compounds represented by the general formulae (IIIa) to (IIIc), and, if necessary, contains the compound represented by the general formula (II) or the compounds represented by the general formulae (IVa) to (IVv). Further, when the polymerizable compound-containing liquid crystal composition according to the present invention is used as an n-type liquid crystal composition, it is preferable that the composition essentially contains the compound represented by the general formula (I) and at least one compound selected from the group consisting of the compounds represented by the general formulae (IVa) to (IVc), and, if necessary, contains the compound represented by the general formula (II) or the compounds represented by the general formulae (IIIa) to (IIIc).

In the polymerizable compound-containing liquid crystal composition according to the present invention, polymerization proceeds even when a polymerization initiator does not exist, but the composition may contain a polymerization initiator in order to accelerate the polymerization. Examples of the polymerization initiator include benzoin ethers, benzophenones, acetophenones, benzyl ketals, and acylphosphine oxides.

A stabilizer may be added to the liquid crystal composition of the present invention in order to improve storage stability. Examples of the stabilizer that can be used include hydroquinones, hydroquinone mono alkyl ethers, tertiary butyl catechols, pyrogallols, thiophenols, nitro compounds, β-naphthylamines, β-naphthols, and nitroso compounds. When the stabilizer is used, the additive amount of the stabilizer is preferably 0.005 mass % to 1 mass %, further preferably 0.02 mass % to 0.5 mass %, and particularly preferably 0.03 mass % to 0.1 mass % with respect to the liquid crystal composition.

The liquid crystal composition of the present invention may further contain a compound represented by General Formula (Q).

[Chem. 74]

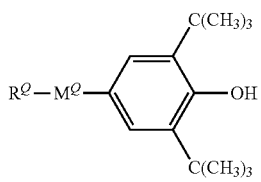

(Q)

In the formula, $R^Q$ represents a linear alkyl group having 1 to 22 carbon atoms or a branched alkyl group having 1 to 22 carbon atoms, and one $CH_2$ group or two or more non-adjacent $CH_2$ groups present in the group may be substituted with —O—, —CH=CH—, —CO—, —OCO—, —COO—, —C≡C—, —CF$_2$O—, or —OCF$_2$—.

$M^Q$ represents a trans-1,4-cyclohexylene group, a 1,4-phenylene group, or a single bond.

As the compound represented by the general formula (Q), specifically, compounds represented by the following general formulae (Q-a) to (Q-e) are preferable.

[Chem. 75]

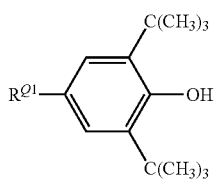

(Q-a)

[Chem. 76]

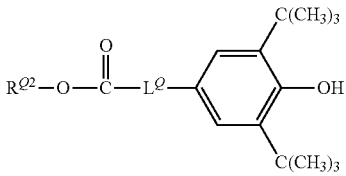

(Q-b)

[Chem. 77]

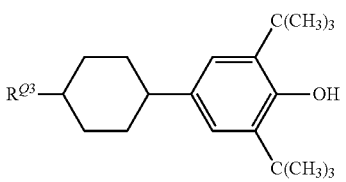

(Q-c)

[Chem. 78]

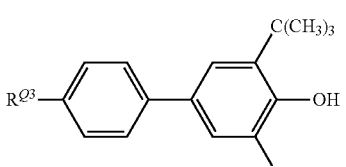

(Q-d)

[Chem. 79]

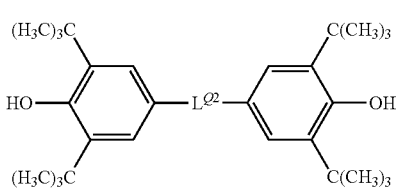

(Q-e)

In the formulae, $R^{Q1}$ is preferably a linear alkyl group having 1 to 10 carbon atoms or a branched alkyl group having 1 to 10 carbon atoms.

$R^{Q2}$ is preferably a linear alkyl group having 1 to 20 carbon atoms or a branched alkyl group having 1 to 20 carbon atoms.

$R^{Q3}$ is preferably a linear alkyl group having 1 to 8 carbon atoms, a branched alkyl group having 1 to 8 carbon atoms, a linear alkoxy group having 1 to 8 carbon atoms, or a branched alkoxy group having 1 to 8 carbon atoms.

$L^Q$ is preferably a linear alkylene group having 1 to 8 carbon atoms, or a branched alkylene group having 1 to 8 carbon atoms.

$L^{Q2}$ is preferably a linear alkylene group having 2 to 12 carbon atoms, or a branched alkylene group having 2 to 12 carbon atoms.

Among the compounds represented by the general formulae (Q-a) to (Q-e), the compounds represented by the general formulae (Q-c), (Q-d), and (Q-e) are further preferable.

The liquid crystal composition of the present invention contains one kind or two or more kinds of the compound represented by the general formula (Q), but contains preferably one to five kinds thereof, further preferably one to three kinds thereof, and particularly preferably one kind thereof. Further, the content thereof is preferably 0.001 mass % to 1 mass %, further preferably 0.001 mass % to 0.1 mass %, and particularly preferably 0.001 mass % to 0.05 mass %.

The liquid crystal composition of the present invention is given liquid crystal alignment ability by polymerization of the polymerizable compound in the liquid crystal composition, and is used in a liquid crystal display element controlling light transmittance using the birefringence of the liquid crystal composition. The liquid crystal composition is useful for, as the liquid crystal display element, AM-LCD (active matrix liquid crystal display element), TN (nematic liquid crystal display element), STN-LCD (super twisted nematic liquid crystal display element), and OCB-LCD and IPS-LCD (in-plane switching liquid crystal display elements), but is particularly useful for AM-LCD. This liquid crystal composition can be used in a transmissive or reflective liquid crystal display element.

Two substrates of a liquid crystal cell used in a liquid crystal display element can be made of glass or a transparent material having flexibility, such as plastic, and one of the two substrates may be made of an opaque material such as silicon. A transparent substrate having a transparent electrode layer, for example, can be obtained by sputtering indium tin oxide (ITO) onto a transparent substrate such as a glass plate.

A color filter, for example, can be formed by a pigment dispersion method, a printing method, an electrodeposition method, or a dyeing method. The method of forming a color filter by the pigment dispersion method is described as an example as follows. A curable coloring composition for a color filter is applied onto the transparent substrate, patterned, and then heated or irradiated with light, thereby curing the coloring composition. This process is carried out with respect to each of red, green, blue and/or other colors, so as to form a pixel unit for a color filter. In addition, a pixel electrode provided with an active element, such as a TFT, a thin film diode, a metal insulator, or a metal resistivity element, may be provided on the substrate.

In the method of sandwiching a polymer-stabilization liquid crystal composition between two substrates, a general vacuum injection method, an ODF method, or the like can be used. First, the substrates are made to face each other such that transparent electrode layers face inward. At this time, the distance between the substrates may be adjusted through a spacer. In this case, the thickness of the obtained light-modulating layer is adjusted to be preferably 1 μm to 100 μm, and further preferably 1.5 μm to 10 μm. When a polarization plate is used, it is preferable to adjust the product of the refractive index anisotropy Δn and cell thickness d of the liquid crystal to obtain the maximum contrast. Further, when two polarization plates exist, a view angle or contrast can be adjusted to be good by adjusting the polarization axis of each of the polarization plates. Here, it is also possible to use a retardation film for widening the viewing angle. Examples of the spacer include glass particles, plastic particles, alumina particles, and photoresist materials. Thereafter, the space between the substrates maintaining the predetermined distance can be sealed with a sealant such as a thermosetting or photosensitive composition in a suitable manner according to the injection method.

As the method of polymerizing a polymerizable compound, since the rapid progress of polymerization is desired, a method of polymerizing the polymerizable compound by applying active energy rays such as ultraviolet rays or electron beams is preferable. When ultraviolet rays are used, a polarized light source may be used, or a non-polarized light source may also be used. Further, when the polymerization is performed in a state in which the liquid crystal composition is sandwiched between the two substrates, at least the substrate of the irradiated surface side must have appropriate transparency to active energy rays. Further, a method of polymerizing the polymerizable compound may also be used which includes polymerizing only the specific portion using a mask at the time of light irradiation, changing a condition of an electric field, a magnetic field, temperature or the like to change the alignment state of the non-polymerized portion, and applying active energy rays. Particularly, at the time of ultraviolet exposure, it is preferable to perform the ultraviolet exposure while applying an alternating electric field to the polymerizable compound-containing liquid crystal composition. As the alternating electric field to be applied, an alternating electric field having a frequency of 10 Hz to 10 kHz is preferable, and an alternating electric field having a frequency of 50 Hz to 10 kHz is more preferable. A voltage is selected depending on the desired pretilt angle of the liquid crystal display element. That is, it is possible to control the pretilt angle of the liquid crystal display element by the voltage to be applied. In the liquid crystal display element of MVA mode, it is preferable that the pretilt angle is controlled to 80° to 89° from the viewpoint of alignment stability and contrast.

The polymerizable compound-containing liquid crystal composition according to the present invention, which is a polymerizable compound-containing liquid crystal composition containing a polymerizable compound, is used in a liquid crystal display element including a liquid crystal layer formed between a pair of substrates, a transparent electrode, and a polarization plate. Here, it is preferable to impart liquid crystal alignment ability by polymerizing the polymerizable compound in the liquid crystal layer containing the polymerizable compound-containing liquid crystal composition in the space formed between the pair of substrates.

It is preferable that the temperature at the time of irradiation is in a temperature range in which the liquid crystal state of the liquid crystal composition of the present invention is maintained. It is preferable that polymerization is performed at a temperature adjacent room temperature, that is, typically, at a temperature of 15° C. to 35° C. As a lamp for generating ultraviolet rays, a metal halide lamp, a high-pressure mercury lamp, an ultrahigh-pressure mercury lamp or the like can be used. As the wavelength of ultraviolet rays to be applied, if necessary, it is preferable that ultraviolet rays is cut and used. The intensity of ultraviolet rays to be applied is preferably 0.1 mW/cm$^2$ to 100 W/cm$^2$, and more preferably 2 mW/cm$^2$ to 50 W/cm$^2$. The energy amount of ultraviolet rays to be applied can be appropriately adjusted, but is preferably 10 mJ/cm$^2$ to 500 J/cm$^2$, and more preferably 100 mJ/cm$^2$ to 200 J/cm$^2$. At the time of ultraviolet irradiation, the intensity of ultraviolet rays may be changed. The ultraviolet irradiation time is appropriately selected depending on the intensity of ultraviolet rays to be applied, but is preferably 10 seconds to 3600 seconds.

EXAMPLES

Hereinafter, the present invention will be described in detail with reference to the following examples, but the present invention is not limited thereto. Further, "%" in the compositions of the following examples and the comparative examples means "% by mass."

The physical properties of the liquid crystal composition are expressed as follows.

TN-I (° C.): nematic phase-isotropic liquid phase transition temperature (upper limit temperature of liquid crystal phase)

Δ∈: dielectric anisotropy

Δn: refractive index anisotropy (Method of Measuring Amount of Monomer Remained after UV Curing)

A liquid crystal composition is injected to a liquid crystal cell and irradiation of ultraviolet rays is performed to polymerize a polymerizable compound. Subsequently, the liquid crystal cell is decomposed, and an acetonitrile solution of an elution component containing a liquid crystal material, a polymerized product, and an unpolymerized polymerizable compound is obtained. The peak area of each component is measured using high speed liquid chromatography (column: reverse-phase nonpolar column, developing solvent: acetonitrile or acetonitrile/water, detector: UV detector). The amount of the remained polymerizable compound was determined based on the ratio of the peak area of the liquid crystal material serving as an index and the peak area of the non-polymerizing polymerizable compound. The residual amount of the monomer was determined based on the value and the amount of the polymerizable compound initially added. Further, the detection limit of the residual amount of the polymerizable compound was 500 ppm.

Example 1

A liquid crystal composition LC-1 containing a compound selected from General Formula (II), a compound selected from General Formulae (IVa), (IVb), and (IVc) was prepared. The constituting compounds and the content ratios thereof are as follows.

[Chem. 80]

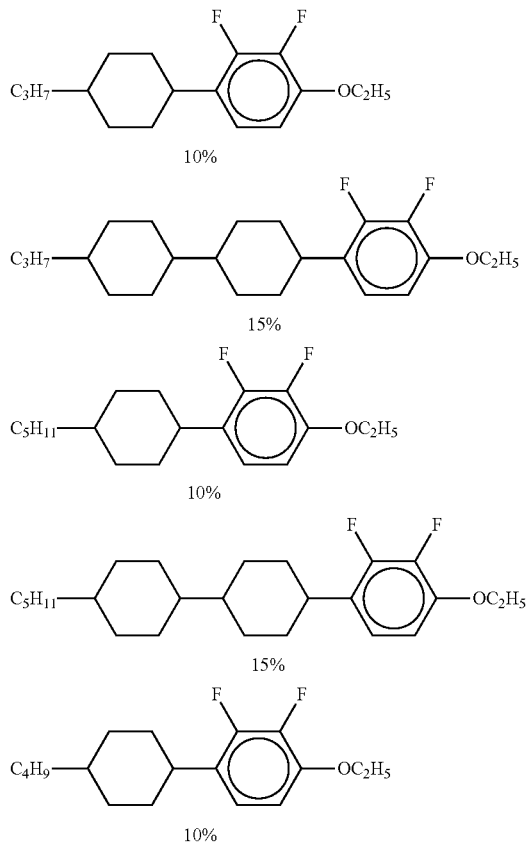

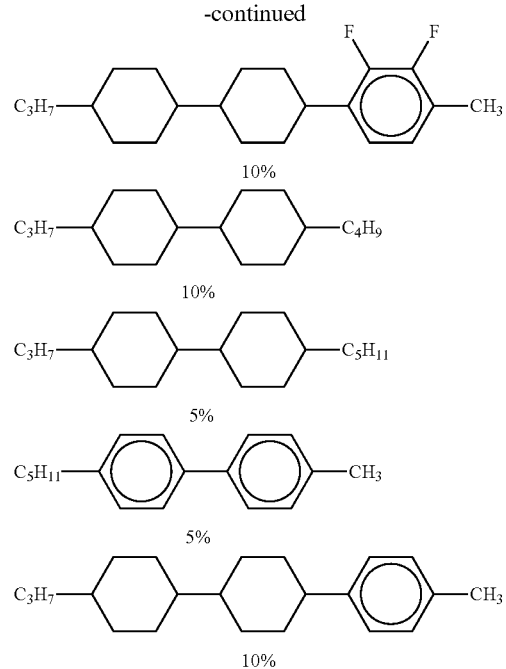

The physical properties of the liquid crystal composition LC-1 were as follows: Tni=80° C., $\Delta\varepsilon=-3.5$, and $\Delta n=0.087$.

A polymerizable compound-containing liquid crystal composition CLC-1 was prepared by adding and uniformly dissolving 0.3% of the polymerizable compound represented by Formula (I-38) in 99.7% of the liquid crystal composition LC-1.

[Chem. 81]

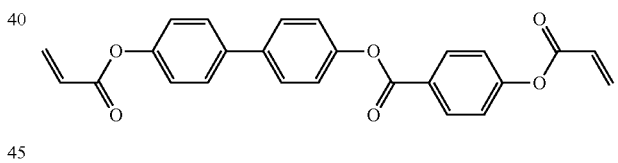

(I-38)

The physical properties of CLC-1 were not changed compared to the physical properties of above-described LC-1. Accordingly, it was revealed that the polymerizable compound represented by the formula (I-38) did not degrade liquid crystalline properties of the liquid crystal composition to which it is added. Further, it was revealed that the polymerizable compound represented by the formula (I-38) had excellent compatibility with another liquid crystal compound because when the CLC-1 was stored in a cold place (−20° C.) for 1 week, deposition or the like did not occur.

By using a vacuum injection method, the CLC-1 was injected to a cell with ITO on which a polyimide alignment film in which homeotropic alignment was induced was coated with a cell gap of 3.5 µm. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.8°, whereas the pretilt angle thereof after ultraviolet irradiation was 86.5°. That is, the pretilt angle of liquid crystal molecules was fixed in a state where the liquid molecules were inclined from the initial state. From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.30 from the initial state was obtained.

Further, the content of an unpolymerized polymerizable compound which is represented by Formula (I-38) and contained in the display element was analyzed with liquid chromatography analysis, but the content thereof was not detected. Due to this, it was verified that the polymerizable compound represented by Formula (I-38) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 86.4°, which was not substantially changed, and the fixing force of the pretilt was sufficiently maintained even under stress.

Comparative Example 1

A polymerizable compound-containing liquid crystal composition CLC-A was prepared by adding and uniformly dissolving 0.3% of the polymerizable compound represented by Formula (A) of JP-A-2012-87165 in 99.7% of the liquid crystal composition LC-1.

[Chem. 82]

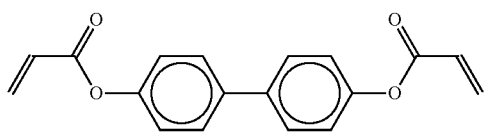

(A)

By using a vacuum injection method, the CLC-A was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.8°, whereas the pretilt angle thereof after ultraviolet irradiation was 87.4°. That is, the pretilt angle of liquid crystal molecules was fixed in a state where the liquid molecules were inclined from the initial state. However, as the result of analyzing the content of an unpolymerized polymerizable compound which is represented by the formula (A) and contained in the display element with liquid chromatography analysis, the content thereof was 1200 ppm, and thus the polymerization of the polymerizable compound (A) was not completely progressed. Further, it was revealed that the polymerizable compound represented by the formula (A) had poor compatibility with another liquid crystal compound because when the CLC-A was stored in a cold place (−20° C.) for 1 week, deposition occurred.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.1°, and the fixing force of the pretilt angle was not sufficiently maintained under stress.

It was revealed that the polymerizable compound represented by the formula (I-38) has high polymerization reactivity, good compatibility with liquid crystal and excellent pretilt fixing force under stress, compared to the polymerizable compound represented by the formula (A).

Example 2

A polymerizable compound-containing liquid crystal composition CLC-2 was prepared by adding and uniformly dissolving 0.3% of the polymerizable compound represented by the formula (I-28) in 99.7% of the liquid crystal composition LC-1.

[Chem. 83]

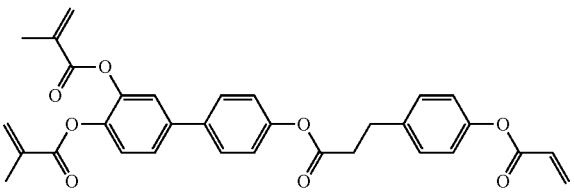

(I-28)

The physical properties of CLC-2 were not changed compared to the physical properties of above-described LC-1. Accordingly, it was revealed that the polymerizable compound represented by the formula (I-28) did not degrade liquid crystalline properties of the liquid crystal composition to which it is added. Further, it was revealed that the polymerizable compound represented by the formula (I-28) had excellent compatibility with another liquid crystal compound because when the CLC-2 was stored in a cold place (−20° C.) for 1 week, deposition or the like did not occur.

By using a vacuum injection method, the CLC-2 was injected to a cell with ITO on which a polyimide alignment film in which homeotropic alignment was induced was coated with a cell gap of 3.5 μm. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.7°, whereas the pretilt angle thereof after ultraviolet irradiation was 85.9°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.8° from the initial state was obtained.

Further, the content of an unpolymerized polymerizable compound which is represented by Formula (I-28) and contained in the display element was analyzed with liquid chromatography analysis, but the content thereof was not detected. Due to this, it was verified that the polymerizable compound represented by Formula (I-28) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was understood that the pretilt angle after 24 hours was 85.7°, which was not substantially changed, and the fixing force of the pretilt was sufficiently maintained even under stress.

Comparative Example 2

A polymerizable compound-containing liquid crystal composition CLC-B was prepared by adding and uniformly dissolving 0.3% of the polymerizable compound represented by Formula (I-11-a) of JP-A-2012-87165 in 99.7% of the liquid crystal composition LC-1.

[Chem. 84]

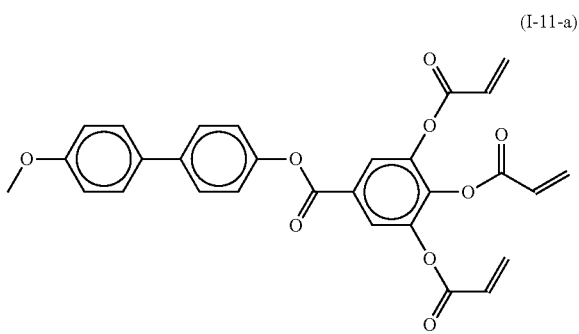

(I-11-a)

It was revealed that the polymerizable compound represented by the formula (I-11-a), similarly to Example 1, did not degrade liquid crystalline properties of the liquid crystal composition to which it is added. Further, it was revealed that the polymerizable compound represented by the formula (I-11-a) had excellent compatibility with another liquid crystal compound because when the CLC-B was stored in a cold place (−20° C.) for 1 week, deposition or the like did not occur.

By using a vacuum injection method, the CLC-B was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.7°, whereas the pretilt angle thereof after ultraviolet irradiation was 86.1°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.6° from the initial state was obtained.

Further, the content of an unpolymerized polymerizable compound which is represented by Formula (I-11-a) and contained in the display element was analyzed with liquid chromatography analysis, but the content thereof was below the detection limit. Due to this, it was verified that the polymerizable compound represented by Formula (I-11-a) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.1°, and the fixing force of the pretilt was not sufficiently maintained under stress.

Example 3

A polymerizable compound-containing liquid crystal composition CLC-3 was prepared by adding and uniformly dissolving 0.3% of the polymerizable compound represented by Formula (I-39) in 99.7% of the liquid crystal composition LC-1.

[Chem. 85]

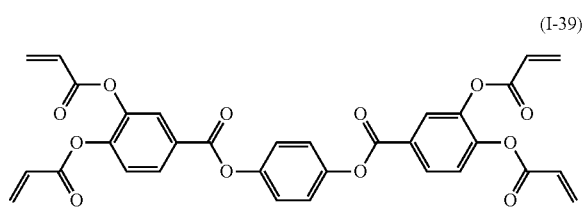

(I-39)

The physical properties of CLC-3 were not changed compared to the physical properties of above-described LC-1. Accordingly, it was revealed that the polymerizable compound represented by the formula (I-39) did not degrade liquid crystalline properties of the liquid crystal composition to which it is added. Further, it was revealed that the polymerizable compound represented by the formula (I-39) had excellent compatibility with another liquid crystal compound because when the CLC-3 was stored in a cold place (−20° C.) for 1 week, deposition or the like did not occur.

By using a vacuum injection method, the CLC-3 was injected to a cell with ITO on which a polyimide alignment film in which homeotropic alignment was induced was coated with a cell gap of 3.5 μm. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.5°, whereas the pretilt angle thereof after ultraviolet irradiation was 84.9°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 3.6° from the initial state was obtained.

Further, the content of an unpolymerized polymerizable compound which is represented by the formula (I-39) and contained in the display element was analyzed with liquid chromatography analysis, but the content thereof was not detected. Due to this, it was verified that the polymerizable compound represented by the formula (I-39) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.2°, which was not substantially changed, and the fixing force of the pretilt was sufficiently maintained even under stress.

Comparative Example 3

A polymerizable compound-containing liquid crystal composition CLC-C was prepared by adding and uniformly dissolving 0.3% of the polymerizable compound represented by Formula (I-33-a) of JP-A-2012-87165 in 99.7% of the liquid crystal composition LC-1.

[Chem. 86]

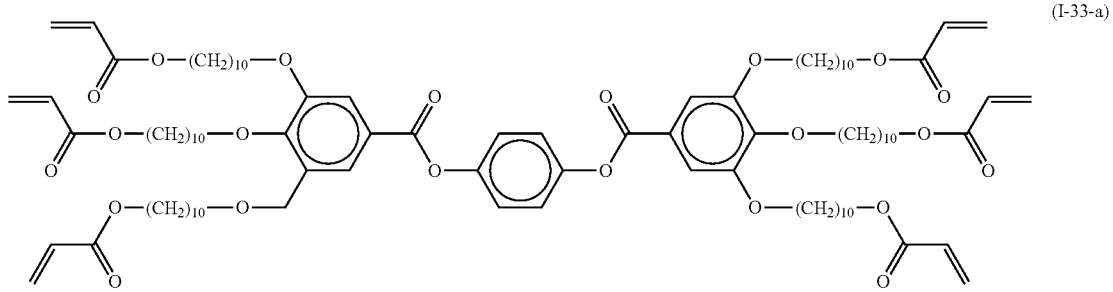

(I-33-a)

It was revealed that the polymerizable compound represented by the formula (I-33-a), similarly to Example 1, did not degrade liquid crystalline properties of the liquid crystal composition to which it is added. Further, it was revealed that the polymerizable compound represented by the formula (I-33-a) had excellent compatibility with another liquid crystal compound because when the CLC-C was stored in a cold place (−20° C.) for 1 week, deposition or the like did not occur.

By using a vacuum injection method, the CLC-C was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.8°, whereas the pretilt angle thereof after ultraviolet irradiation was 86.2°. That is, the pretilt angle of liquid crystal molecules was fixed in a state where the liquid molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.6° from the initial state was obtained.

Further, the content of an unpolymerized polymerizable compound which is represented by Formula (I-33-a) and contained in the display element was analyzed with liquid chromatography analysis, but the content thereof was below the detection limit. Due to this, it was verified that the polymerizable compound represented by Formula (I-33-a) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 84.8°, and the fixing force of the pretilt was not sufficiently maintained under stress.

Example 4

A polymerizable compound-containing liquid crystal composition CLC-4 was prepared by adding and uniformly dissolving 0.3% of the polymerizable compound represented by Formula (I-40) in 99.7% of the liquid crystal composition LC-1.

[Chem. 87]

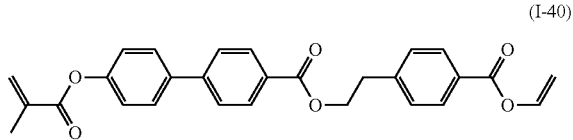

(I-40)

The physical properties of CLC-4 were not changed compared to the physical properties of above-described LC-1. Accordingly, it was revealed that the polymerizable compound represented by the formula (I-40) did not degrade liquid crystalline properties of the liquid crystal composition to which it is added. Further, it was revealed that the polymerizable compound represented by the formula (I-40) had excellent compatibility with another liquid crystal compound because when the CLC-4 was stored in a cold place (−20° C.) for 1 week, deposition or the like did not occur.

By using a vacuum injection method, the CLC-4 was injected to a cell with ITO on which a polyimide alignment film in which homeotropic alignment was induced was coated with a cell gap of 3.5 μm. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 88.5°, whereas the pretilt angle thereof after ultraviolet irradiation was 85.9°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.6° from the initial state was obtained.

Further, the content of an unpolymerized polymerizable compound which is represented by the formula (I-40) and contained in the display element was analyzed with liquid chromatography analysis, but the content thereof was not detected. Due to this, it was verified that the polymerizable compound represented by the formula (I-40) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.6°, which was not substantially changed, and the fixing force of the pretilt was sufficiently maintained even under stress.

Comparative Example 4

A polymerizable compound-containing liquid crystal composition CLC-D was prepared by adding and uniformly dissolving 0.3% of the polymerizable compound represented by Formula (I-11-b) in 99.7% of the liquid crystal composition LC-1.

[Chem. 88]

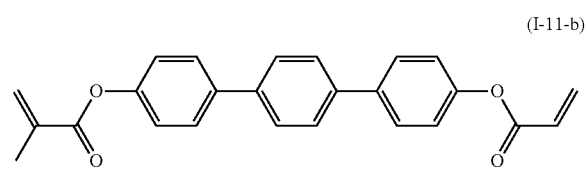

(I-11-b)

By using a vacuum injection method, the CLC-D was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 88.5°, whereas the pretilt angle thereof after ultraviolet irradiation was 86.3°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.3° from the initial state was obtained.

Further, the content of an unpolymerized polymerizable compound which is represented by the formula (I-11-b) and contained in the display element was analyzed with liquid chromatography analysis, but the content thereof was below the detection limit. Due to this, it was verified that the polymerizable compound represented by the formula (I-11-b) was able to be polymerized without using a polymerization initiator and the amount of an unpolymerized product remained after the polymerization was below the detection limit.

However, it was revealed that the polymerizable compound represented by the formula (I-11-b) had poor compatibility with another liquid crystal compound because when the CLC-D was stored in a cold place (−20° C.) for 1 week, deposition occurred.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 87.5°, and the fixing force of the pretilt was not sufficiently maintained under stress.

Example 5

A polymerizable compound-containing liquid crystal composition CLC-5 was prepared by adding and uniformly dissolving 0.3% of the polymerizable compound represented by Formula (I-33) in 99.7% of the liquid crystal composition LC-1.

[Chem. 89]

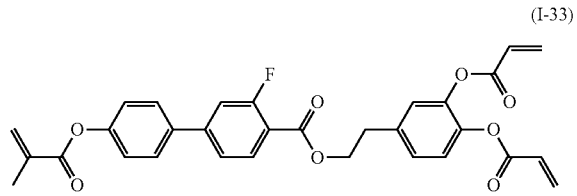

(I-33)

The physical properties of CLC-5 were not changed compared to the physical properties of above-described LC-1. Accordingly, it was revealed that the polymerizable compound represented by the formula (I-33) did not degrade liquid crystalline properties of the liquid crystal composition to which it is added. Further, it was revealed that the polymerizable compound represented by the formula (I-33) had excellent compatibility with another liquid crystal compound because when the CLC-5 was stored in a cold place (−20° C.) for 1 week, deposition or the like did not occur.

By using a vacuum injection method, the CLC-5 was injected to a cell with ITO on which a polyimide alignment film in which homeotropic alignment was induced was coated with a cell gap of 3.5 μm. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiated of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 89.0°, whereas the pretilt angle thereof after ultraviolet irradiation was 85.5°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 3.5° from the initial state was obtained.

Further, the content of an unpolymerized polymerizable compound which is represented by the formula (I-33) and contained in the display element was analyzed with liquid chromatography analysis, but the content thereof was not detected. Due to this, it was verified that the polymerizable compound represented by the formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.6°, which was not substantially changed, and the fixing force of the pretilt was sufficiently maintained even under stress.

Example 6

A liquid crystal composition LC-2 having the following constituents was prepared as an example containing a compound selected from General Formula (II), a compound selected from General Formulae (IVa), (IVb), and (IVc).

[Chem. 90]

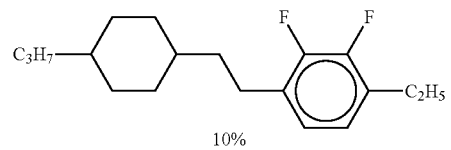

10%

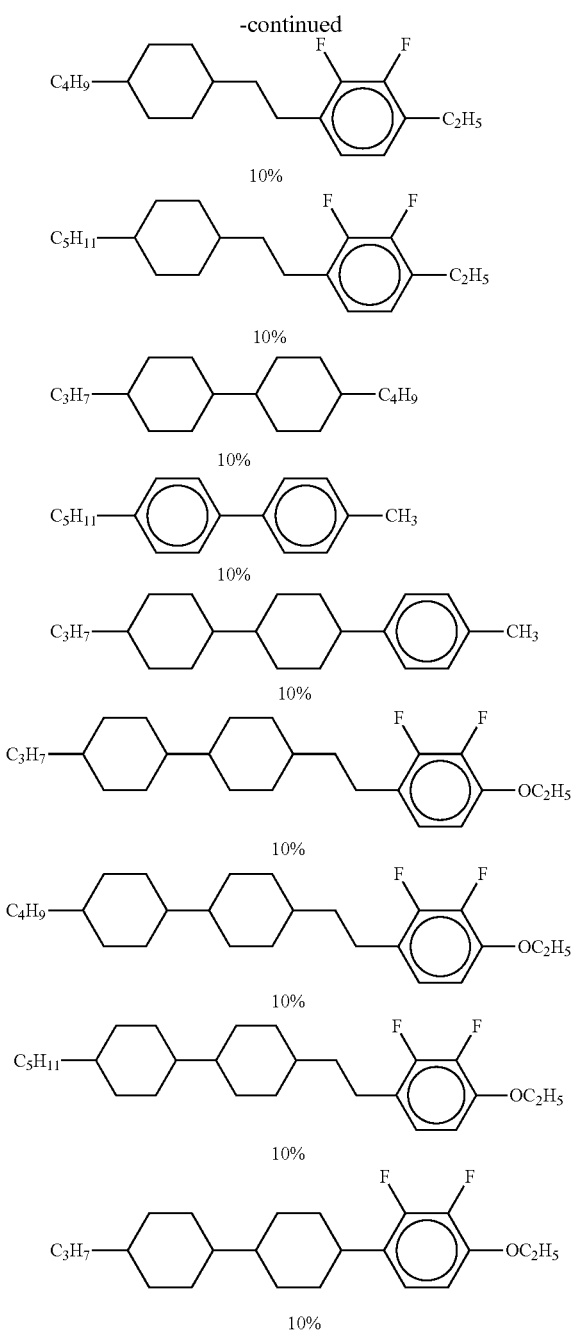

The physical properties of the liquid crystal composition LC-2 were as follows: Tni=85° C., Δ∈=−3.4, and Δn=0.094.

A polymerizable compound-containing liquid crystal composition CLC-6 was prepared by adding and uniformly dissolving 0.3% of the polymerizable compound represented by Formula (I-33) in 99.7% of the liquid crystal composition LC-2. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-6 was stored in a cold place (−20° C.) for 1 week, deposition or the like did not occur.

By using a vacuum injection method, the CLC-6 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.7°, whereas the pretilt angle thereof after ultraviolet irradiation was 86.2°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.5° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 86.2°, which was not substantially changed, and the fixing force of the pretilt was sufficiently maintained even under stress.

Example 7

A liquid crystal composition LC-3 having the following constituents was prepared as an example containing a compound selected from General Formula (II), a compound selected from General Formulae (IVa), (IVb), and (IVc).

[Chem. 91]

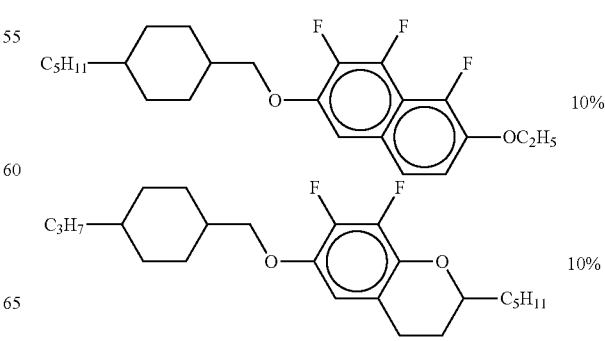

-continued

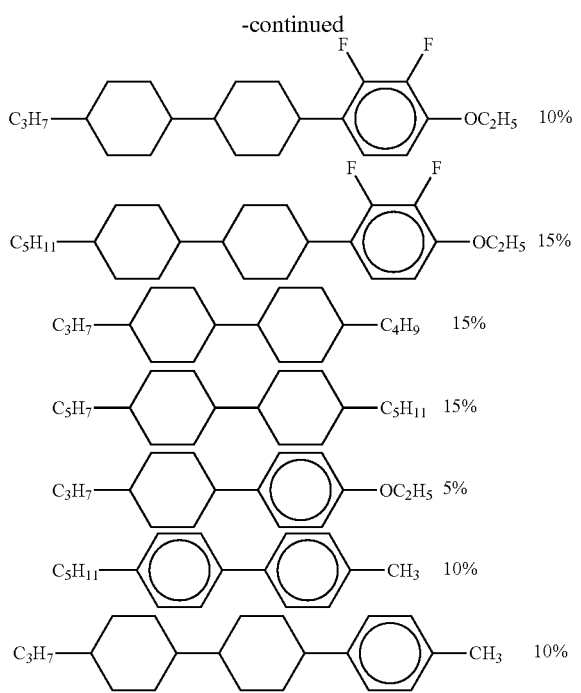

The physical properties of the liquid crystal composition LC-3 were as follows: Tni=72° C., Δ∈=−3.3, and Δn=0.086.

A polymerizable compound-containing liquid crystal composition CLC-7 was prepared by adding and uniformly dissolving 0.3% of the polymerizable compound represented by Formula (I-33) in 99.7% of the liquid crystal composition LC-3. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-7 was stored in a cold place (−20° C.) for 1 week, deposition or the like did not occur.

By using a vacuum injection method, the CLC-7 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 88.9°, whereas the pretilt angle thereof after ultraviolet irradiation was 85.5°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 3.4° from the initial state was obtained.

Further, the content of an unpolymerized polymerizable compound which is represented by the Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.4°, which was not substantially changed, and the fixing force of the pretilt was sufficiently maintained even under stress.

Example 8

A liquid crystal composition LC-4 having the following constituents was prepared as an example containing a compound selected from General Formula (II), a compound selected from General Formulae (IVa), (IVb), and (IVc).

[Chem. 92]

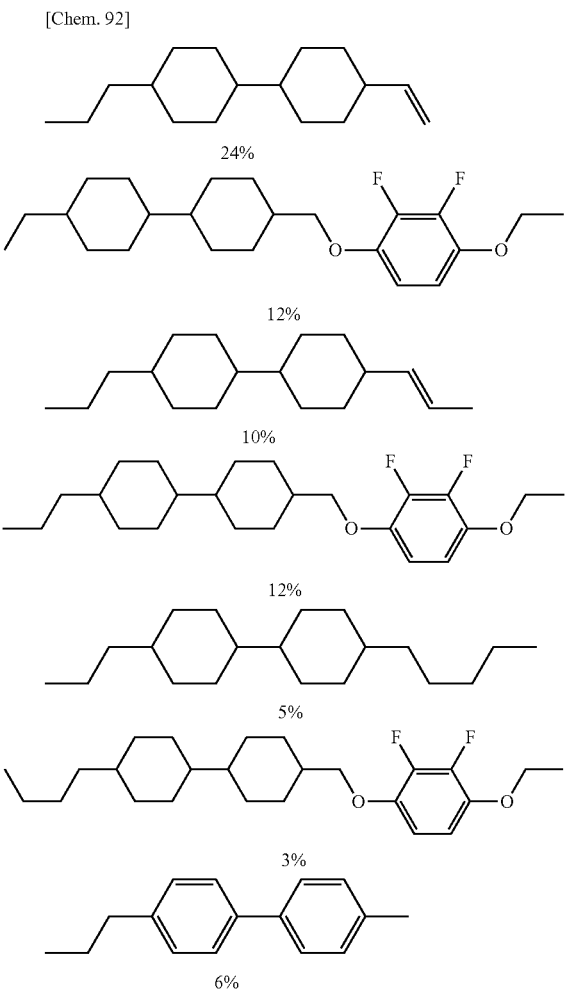

-continued

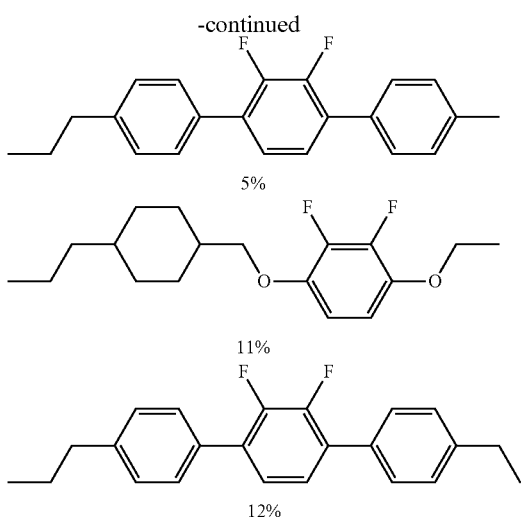

5%

11%

12%

The physical properties of the liquid crystal composition LC-4 were as follows: Tni=81° C., Δ∈=−3.0, and Δn=0.086.

A polymerizable compound-containing liquid crystal composition CLC-8 was prepared by adding and uniformly dissolving 0.3% of the polymerizable compound represented by Formula (I-33) in 99.7% of the liquid crystal composition LC-4. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-8 was stored in a cold place (−20° C.) for 1 week, deposition or the like did not occur.

By using a vacuum injection method, the CLC-8 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.9°, whereas the pretilt angle thereof after ultraviolet irradiation was 86.1°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.8° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 86.0°, which was not substantially changed, and the fixing force of the pretilt was sufficiently maintained even under stress.

Example 9

A liquid crystal composition LC-5 having the following constituents was prepared as an example containing a compound selected from General Formula (II), a compound selected from General Formulae (IVa), (IVb), and (IVc).

[Chem. 93]

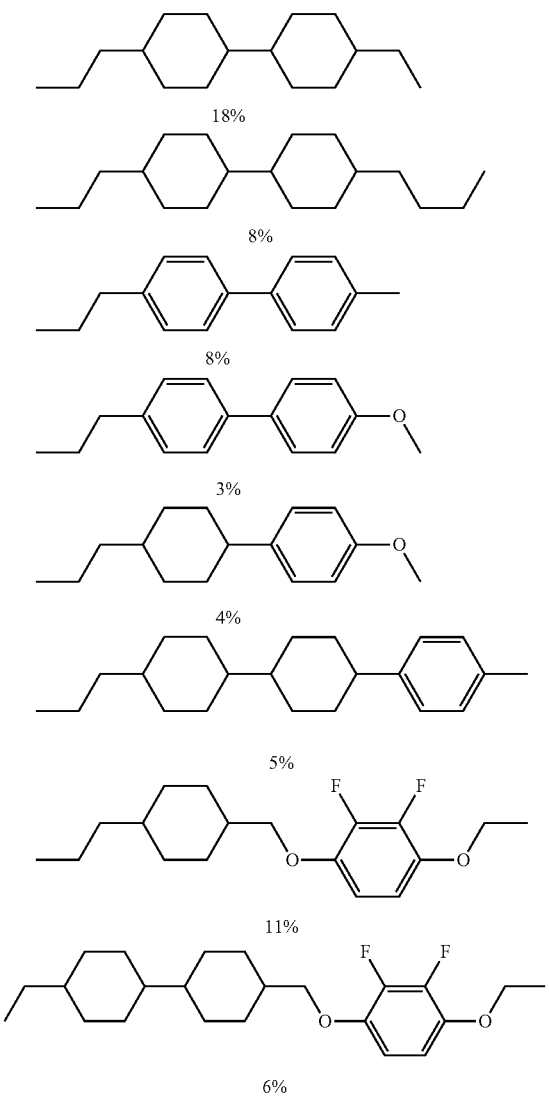

18%

8%

8%

3%

4%

5%

11%

6%

-continued

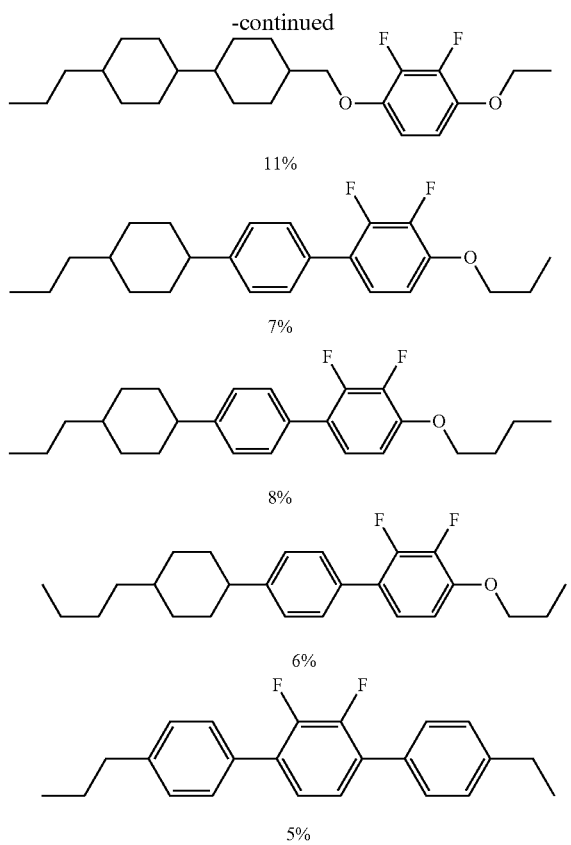

11%

7%

8%

6%

5%

The physical properties of the liquid crystal composition LC-5 were as follows: Tni=76° C., Δ∈=−3.2, and Δn=0.109.

A polymerizable compound-containing liquid crystal composition CLC-9 was prepared by adding and uniformly dissolving 0.3% of the polymerizable compound represented by Formula (I-33) in 99.7% of the liquid crystal composition LC-5. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-9 was stored in a cold place (−20° C.) for 1 week, deposition or the like did not occur.

By using a vacuum injection method, the CLC-9 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 88.5°, whereas the pretilt angle thereof after ultraviolet irradiation was 85.7°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 2.8° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 85.6°, which was not substantially changed, and the fixing force of the pretilt was sufficiently maintained even under stress.

Example 10

A liquid crystal composition LC-6 having the following constituents was prepared as an example containing a compound selected from General Formula (II), a compound selected from General Formulae (IVa), (IVb), and (IVc).

[Chem. 94]

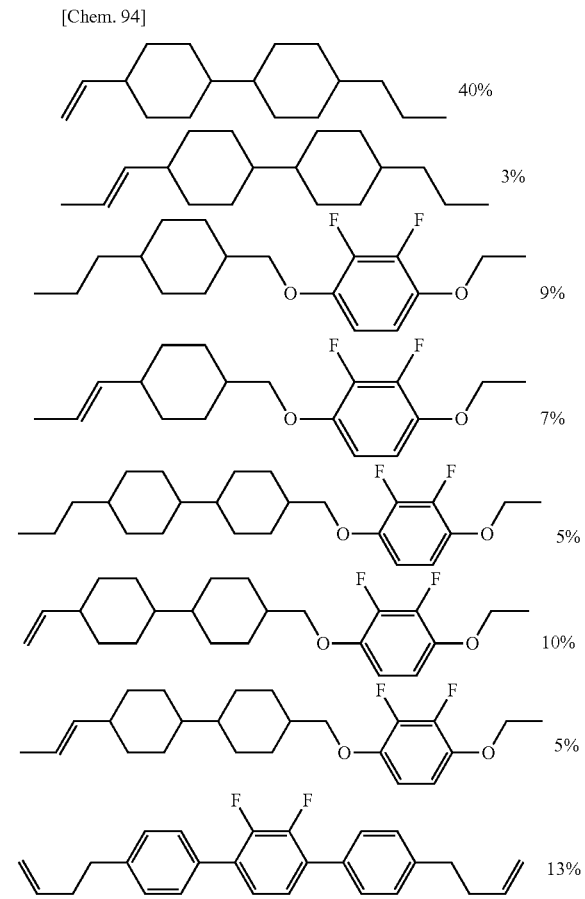

40%

3%

9%

7%

5%

10%

5%

13%

-continued

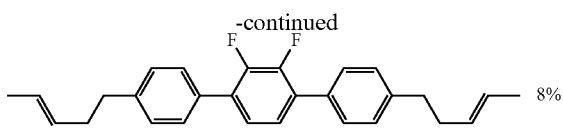

8%

The physical properties of the liquid crystal composition LC-6 were as follows: Tni=80° C., $\Delta\varepsilon$=−3.2, and $\Delta$n=0.110.

A polymerizable compound-containing liquid crystal composition CLC-10 was prepared by adding and uniformly dissolving 0.3% of the polymerizable compound represented by Formula (I-33) in 99.7% of the liquid crystal composition LC-6. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-10 was stored in a cold place (−20° C.) for 1 week, deposition or the like did not occur.

By using a vacuum injection method, the CLC-10 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 89.1°, whereas the pretilt angle thereof after ultraviolet irradiation was 87.6°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 1.5° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 87.5°, which was not substantially changed, and the fixing force of the pretilt was sufficiently maintained even under stress.

Example 11

A liquid crystal composition LC-7 having the following constituents was prepared as an example containing a compound selected from General Formula (II), a compound selected from General Formulae (IVa), (IVb), and (IVc).

[Chem. 95]

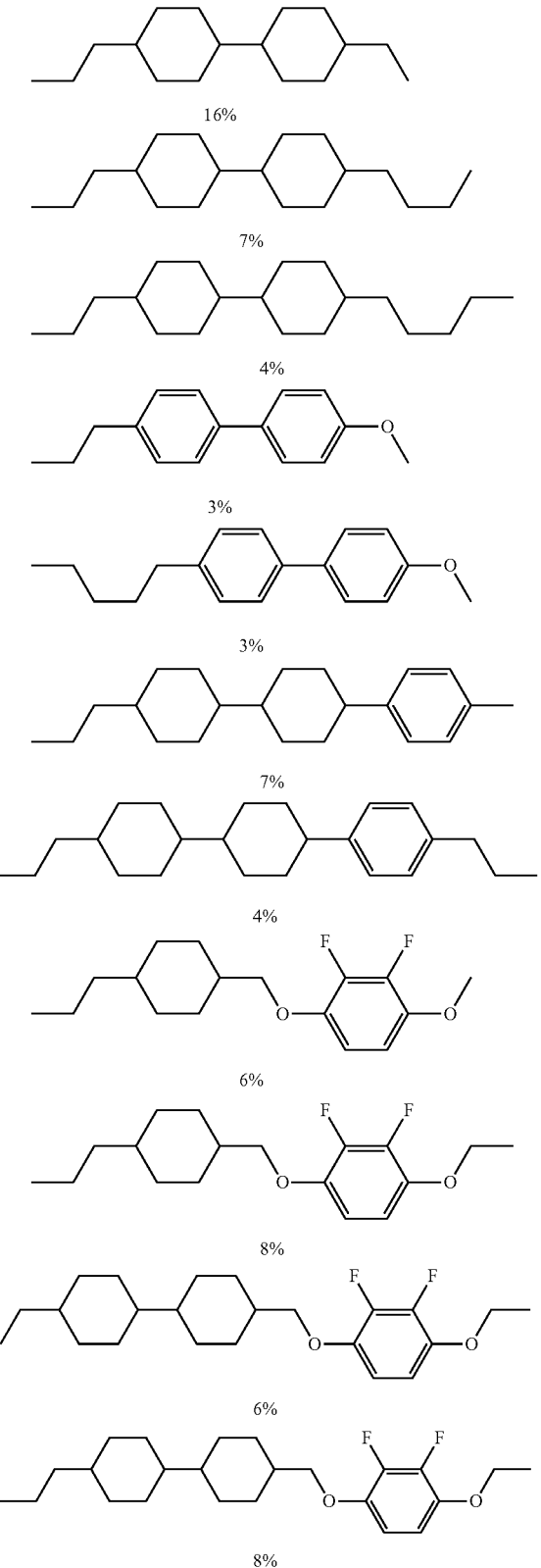

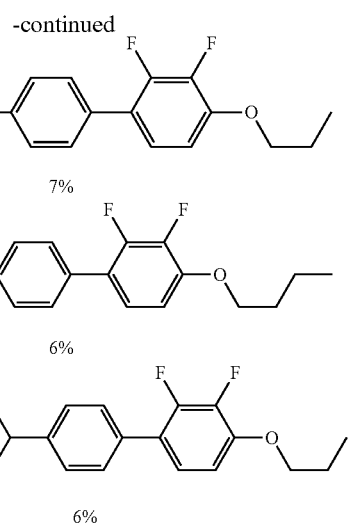

7%

6%

6%

The physical properties of the liquid crystal composition LC-7 were as follows: Tni=76° C., Δ∈=−2.9, and Δn=0.102.

A polymerizable compound-containing liquid crystal composition CLC-11 was prepared by adding and uniformly dissolving 0.3% of the polymerizable compound represented by Formula (I-33) in 99.7% of the liquid crystal composition LC-7. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-11 was stored in a cold place (−20° C.) for 1 week, deposition or the like did not occur.

By using a vacuum injection method, the CLC-11 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 88.9°, whereas the pretilt angle thereof after ultraviolet irradiation was 87.2°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 1.7° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 87.3°, which was not substantially changed, and the fixing force of the pretilt was sufficiently maintained even under stress.

Example 12

A liquid crystal composition LC-8 having the following constituents was prepared as an example containing a compound selected from General Formula (II), a compound selected from General Formulae (IVa), (IVb), and (IVc).

[Chem. 96]

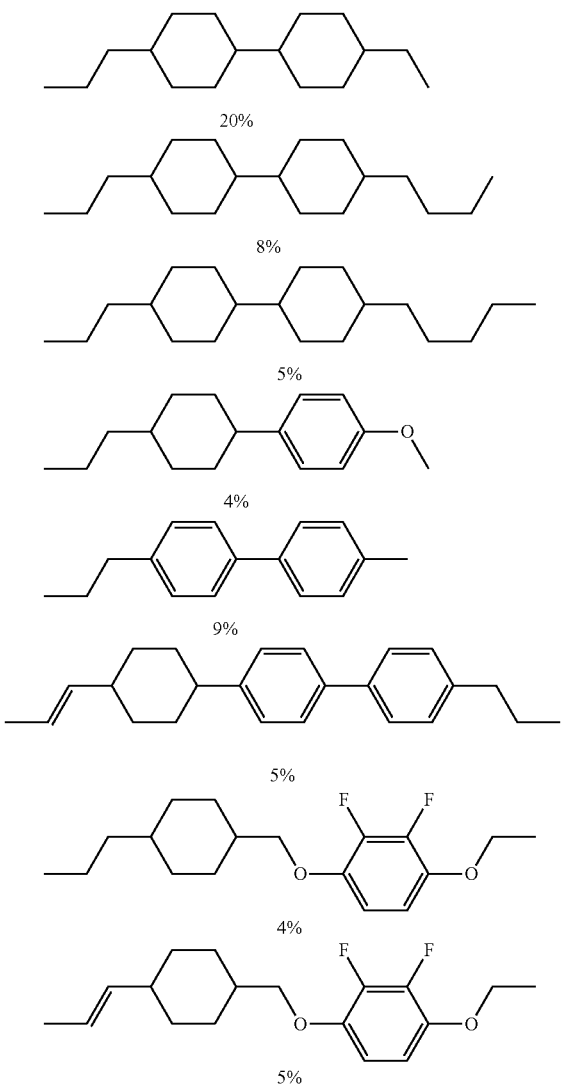

20%

8%

5%

4%

9%

5%

4%

5%

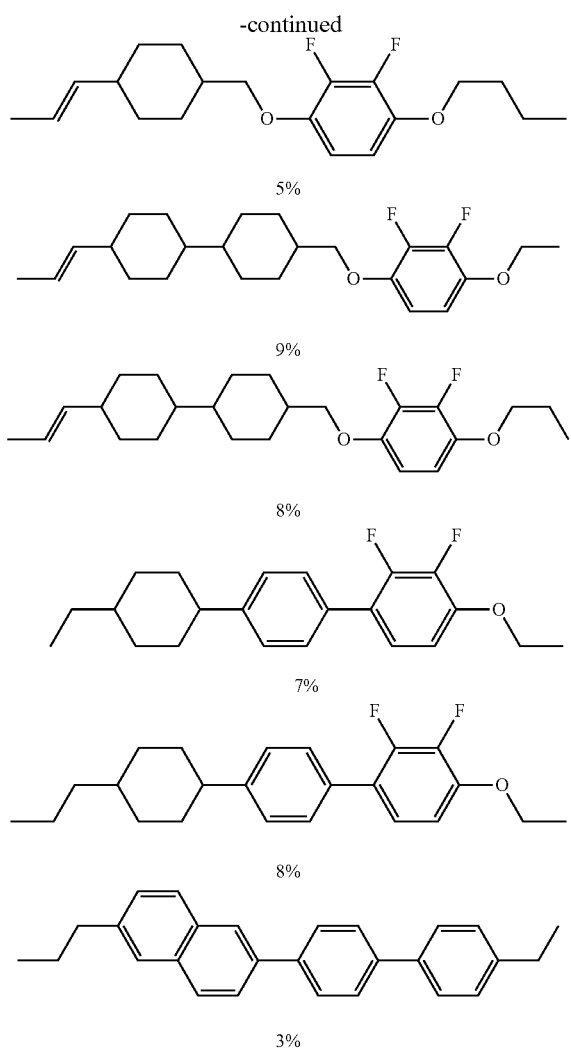

5%

9%

8%

7%

8%

3%

The physical properties of the liquid crystal composition LC-8 were as follows: Tni=75° C., $\Delta\varepsilon$=−3.0, and $\Delta$n=0.109.

A polymerizable compound-containing liquid crystal composition CLC-12 was prepared by adding and uniformly dissolving 0.3% of the polymerizable compound represented by Formula (I-33) in 99.7% of the liquid crystal composition LC-8. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-12 was stored in a cold place (−20° C.) for 1 week, deposition or the like did not occur.

By using a vacuum injection method, the CLC-12 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 89.2°, whereas the pretilt angle thereof after ultraviolet irradiation was 87.8°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 1.4° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 87.6°, which was not substantially changed, and the fixing force of the pretilt angle was sufficiently maintained even under stress.

Example 13

A liquid crystal composition LC-9 having the following constituents was prepared as an example containing a compound selected from General Formula (II), a compound selected from General Formulae (IVa), (IVb), and (IVc).

[Chem. 97]

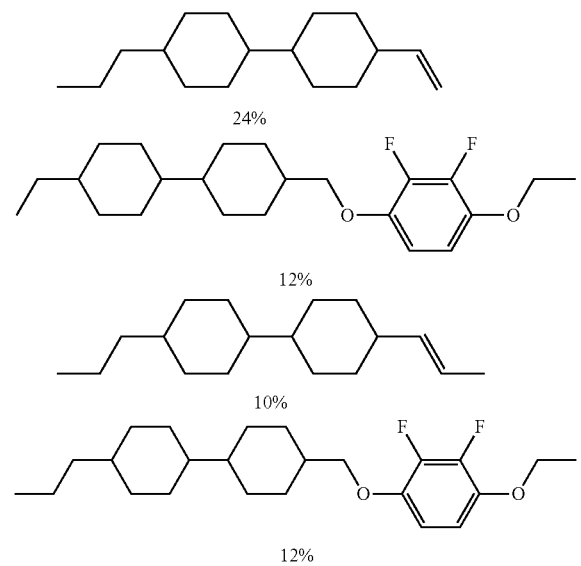

24%

12%

10%

12%

-continued

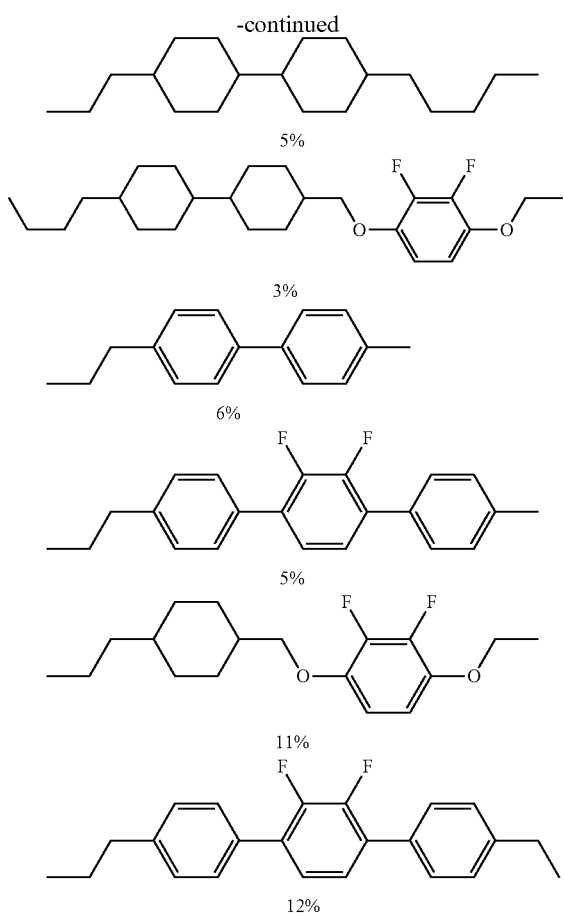

The physical properties of the liquid crystal composition LC-9 were as follows: Tni=76° C., Δ∈=−3.2, and Δn=0.108.

A polymerizable compound-containing liquid crystal composition CLC-13 was prepared by adding and uniformly dissolving 0.3% of the polymerizable compound represented by Formula (I-33) in 99.7% of the liquid crystal composition LC-9. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-13 was stored in a cold place (−20° C.) for 1 week, deposition or the like did not occur.

By using a vacuum injection method, the CLC-13 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 89.1°, whereas the pretilt angle thereof after ultraviolet irradiation was 88.1°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 1.0° from the initial state was obtained.

Further, the content of an unpolymerized polymerizable compound which is represented by Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 88.0°, which was not substantially changed, and the fixing force of the pretilt was sufficiently maintained even under stress.

Example 14

A liquid crystal composition LC-10 having the following constituents was prepared as an example containing a compound selected from General Formula (II), a compound selected from General Formulae (IVa), (IVb), and (IVc).

[Chem. 98]

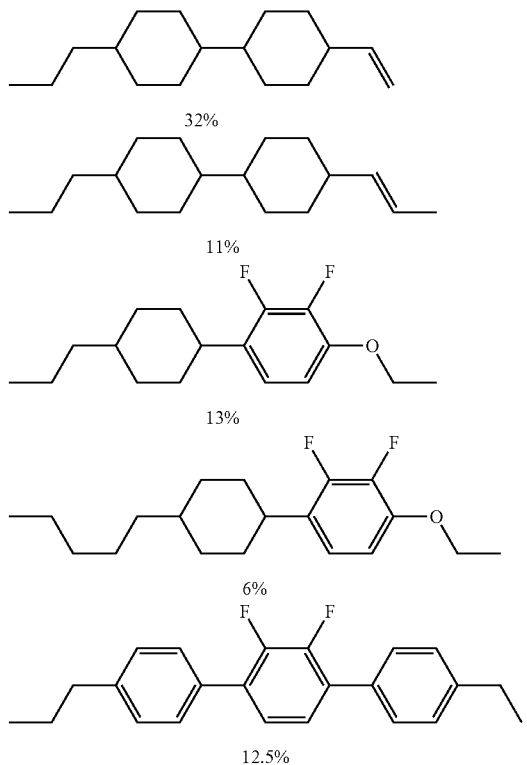

-continued

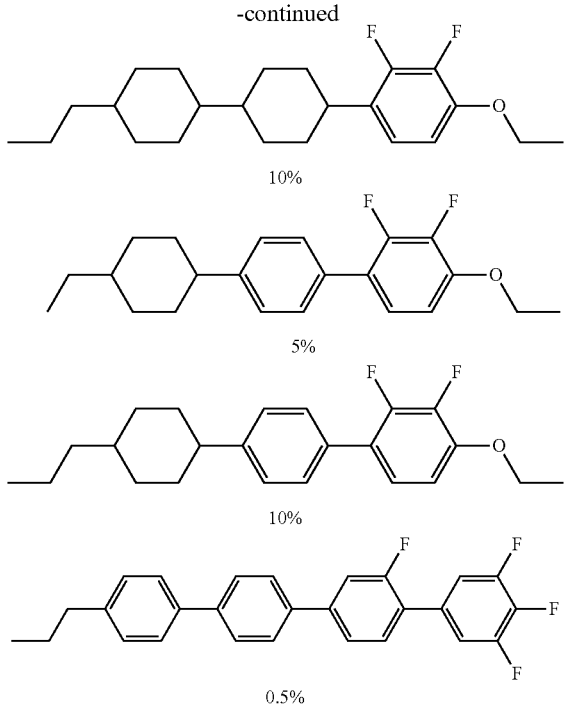

10%

5%

10%

0.5%

The physical compound-containing properties of the liquid crystal composition LC-10 were as follows: Tni=75° C., Δ∈=−2.7, and Δn=0.108.

A polymerizable compound-containing liquid crystal composition CLC-14 was prepared by adding and uniformly dissolving 0.3% of the polymerizable compound represented by Formula (I-33) in 99.7% of the liquid crystal composition LC-10. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-14 was stored in a cold place (−20° C.) for 1 week, deposition or the like did not occur.

By using a vacuum injection method, the CLC-14 was injected to a cell with ITO on which a polyimide alignment film in which homeotropic alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 89.2°, whereas the pretilt angle thereof after ultraviolet irradiation was 88.3°. That is, the pretilt angle of liquid crystal molecules was fixed in a state where the liquid crystal molecules were inclined from the initial state.

From the results of the above-described pretilt angle, it was revealed that the alignment regulating force with respect to the liquid crystal composition was generated by polymerization of the polymerizable compound and a vertical aligning liquid crystal display element in which the pretilt angle was fixed in a state of a liquid crystal molecule being inclined by 0.9° from the initial state was obtained.

Further, the content of an unpolymerized polymerizable compound which is represented by the Formula (I-33) and contained in the display element was analyzed with liquid chromatography analysis, but the content thereof was not detected. Due to this, it was verified that the polymerizable compound represented by Formula (I-33) was able to be polymerized without using a polymerization initiator and the amount of an unpolymerized product remained after the polymerization was below the detection limit.

Moreover, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 88.2°, which was not substantially changed, and the fixing force of the pretilt was sufficiently maintained even under stress.

Example 15

A liquid crystal composition LC-11 having the following constituents was prepared as an example containing a compound selected from General Formula (II), a compound selected from General Formulae (IIIa), (IIIb), and (IIIc).

[Chem. 99]

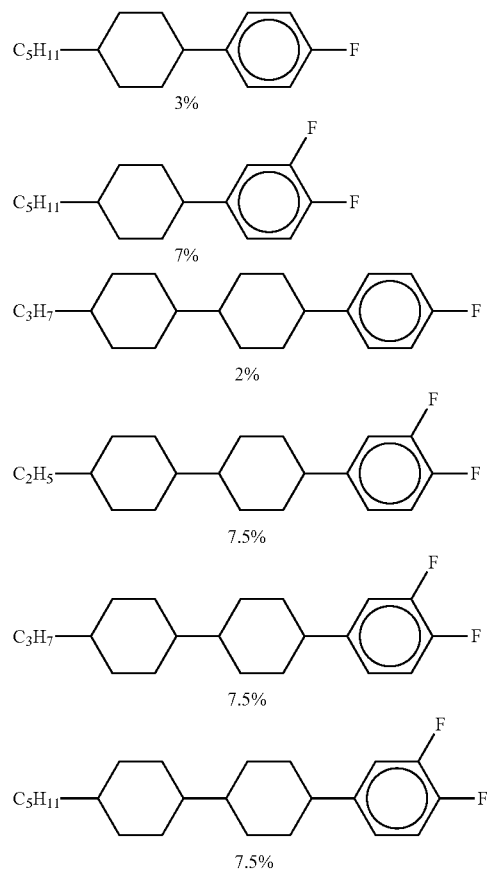

3%

7%

2%

7.5%

7.5%

7.5%

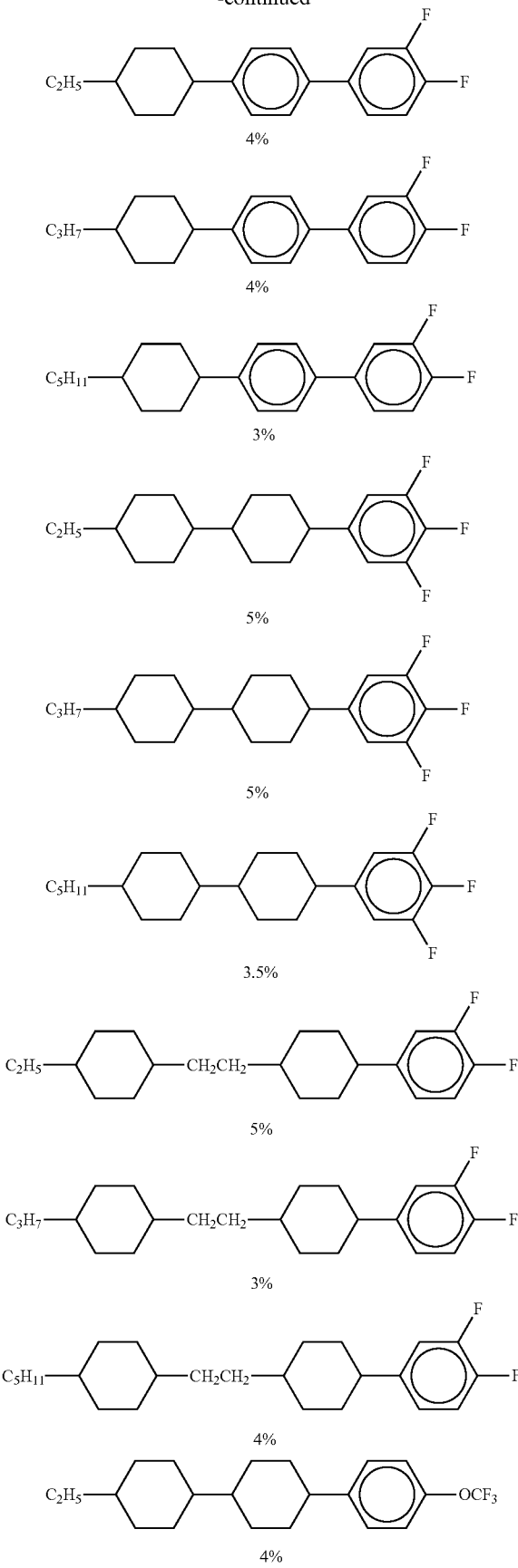

The physical properties of the liquid crystal composition LC-11 were as follows: Tni=85° C., Δ∈=5.5, and Δn=0.090.

A polymerizable compound-containing liquid crystal composition CLC-15 was prepared by adding and uniformly dissolving 0.3% of the polymerizable compound represented by Formula (I-33) in 99.7% of the liquid crystal composition LC-11. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-15 was stored in a cold place (−20° C.) for 1 week, deposition or the like did not occur.

By using a vacuum injection method, the CLC-15 was injected to a cell with ITO on which a polyimide alignment film in which parallel alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 0.5°, whereas the pretilt angle thereof after ultraviolet irradiation was 3.1°, and thus a pretilt was imparted. That is, the pretilt angle of liquid crystal molecules was fixed in a state where the liquid crystal molecules were inclined from the initial state. The content of an unpolymerized polymerizable compound which is represented by Formula (I-33) and contained in the display element was analyzed with liquid chromatography analysis, but the content thereof was below the detection limit. Due to this, it was verified that the polymerizable compound represented by Formula (I-33) was able to be polymerized without using a polymerization initiator and the amount of an unpolymerized product remained after the polymerization was below the detection limit.

Further, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 3.2°, which was not substantially changed, and the fixing force of the pretilt was sufficiently maintained even under stress.

Example 16

A liquid crystal composition LC-12 having the following constituents was prepared as an example containing a compound selected from General Formula (II), a compound selected from General Formulae (IIIa), (IIIb), and (IIIc).

[Chem. 100]

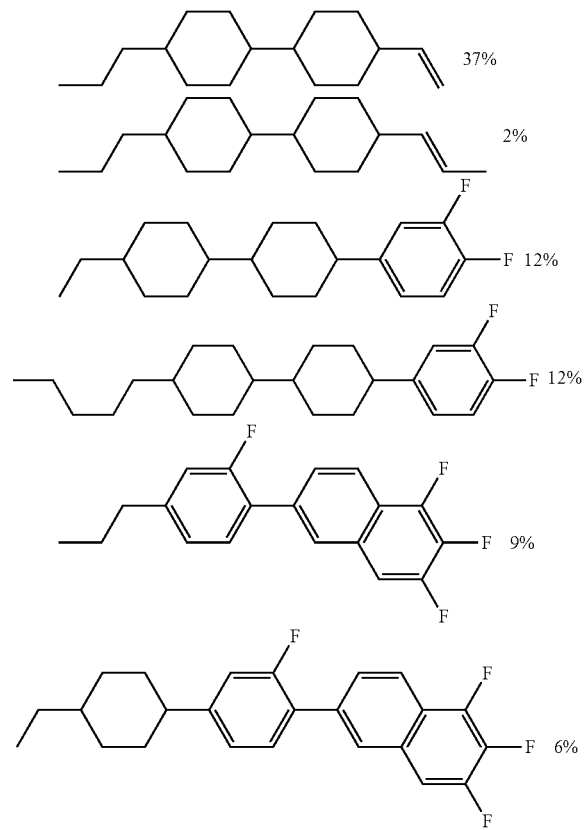

-continued

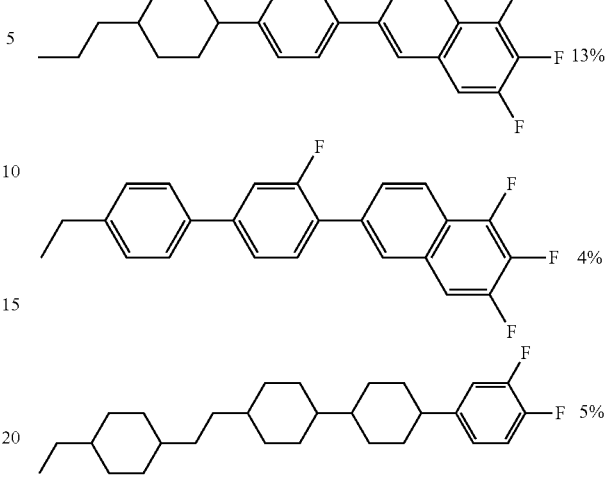

The physical properties of the liquid crystal composition LC-12 were as follows: Tni=76° C., Δ∈=7.0, and Δn=0.105.

A polymerizable compound-containing liquid crystal composition CLC-16 was prepared by adding and uniformly dissolving 0.3% of the polymerizable compound represented by Formula (I-33) in 99.7% of the liquid crystal composition LC-12. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-16 was stored in a cold place (−20° C.) for 1 week, deposition or the like did not occur.

By using a vacuum injection method, the CLC-16 was injected to a cell with ITO on which a polyimide alignment film in which parallel alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 0.5°, whereas the pretilt angle thereof after ultraviolet irradiation was 3.0°, and thus a pretilt was imparted. That is, the pretilt angle of liquid crystal molecules was fixed in a state where the liquid crystal molecules were inclined from the initial state. The content of an unpolymerized polymerizable compound which is represented by Formula (I-33) and contained in the display element was analyzed with liquid chromatography analysis, but the content thereof was below the detection limit. Due to this, it was verified that the polymerizable compound represented by Formula (I-33) was able to be polymerized without using a polymerization initiator and the amount of an unpolymerized product remained after the polymerization was below the detection limit.

Further, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 3.1°, which was not substantially changed, and the fixing force of the pretilt angle was sufficiently maintained even under stress.

Example 17

A liquid crystal composition LC-13 having the following constituents was prepared as an example containing a compound selected from General Formula (II), a compound selected from General Formulae (IIIa), (IIIb), and (IIIc).

[Chem. 101]

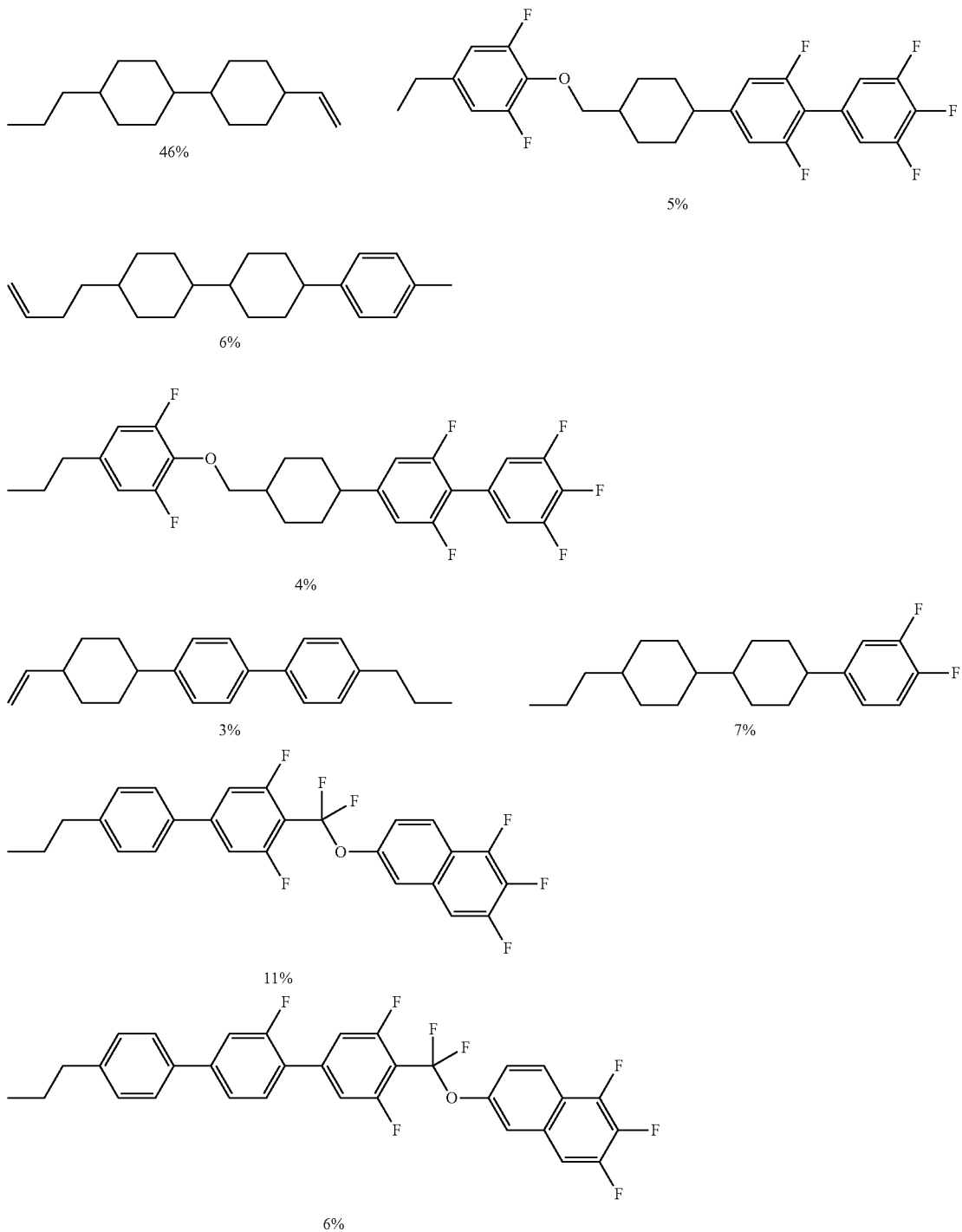

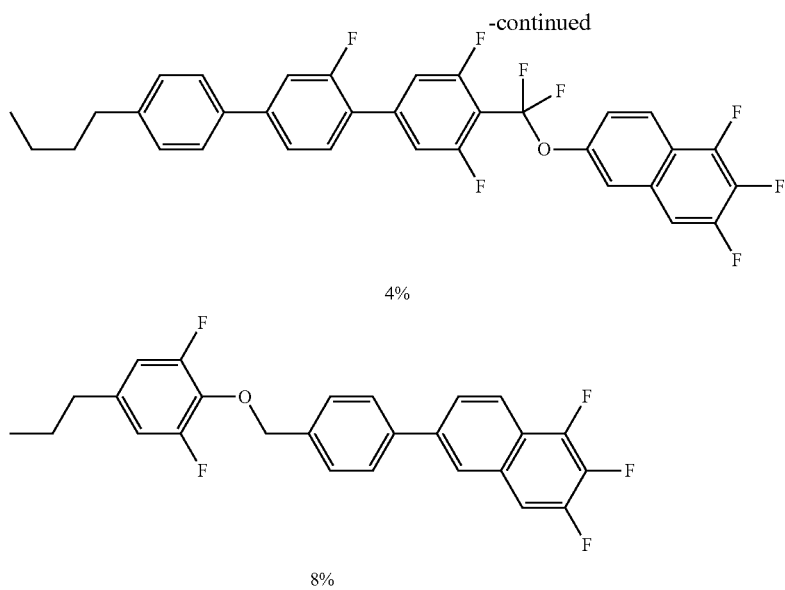

4%

8%

The physical properties of the liquid crystal composition LC-13 were as follows: Tni=79° C., Δ∈=11.8, and Δn=0.109.

A polymerizable compound-containing liquid crystal composition CLC-17 was prepared by adding and uniformly dissolving 0.3% of the polymerizable compound represented by Formula (I-33) in 99.7% of the liquid crystal composition LC-13. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-17 was stored in a cold place (−20° C.) for 1 week, deposition or the like did not occur.

By using a vacuum injection method, the CLC-17 was injected to a cell with ITO on which a polyimide alignment film in which parallel alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm², thereby obtaining a vertical aligning liquid crystal display element in which the polymerizable compound in the polymerizable compound-containing liquid crystal composition is polymerized. The pretilt angle of the display element before ultraviolet irradiation was 0.5°, whereas the pretilt angle thereof after ultraviolet irradiation was 3.9°, and thus a pretilt was imparted. That is, the pretilt angle of liquid crystal molecules was fixed in a state where the liquid crystal molecules were inclined from the initial state. The content of an unpolymerized polymerizable compound which is represented by Formula (I-33) and contained in the display element was analyzed with liquid chromatography analysis, but the content thereof was below the detection limit. Due to this, it was verified that the polymerizable compound represented by Formula (I-33) was able to be polymerized without using a polymerization initiator and the amount of an unpolymerized product remained after the polymerization was below the detection limit.

Further, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 4.0°, which was not substantially changed, and the fixing force of the pretilt was sufficiently maintained even under stress.

Example 18

A liquid crystal composition LC-14 having the following constituents was prepared as an example containing a compound selected from General Formula (II), a compound selected from General Formulae (IIIa), (IIIb), and (IIIc).

[Chem. 102]

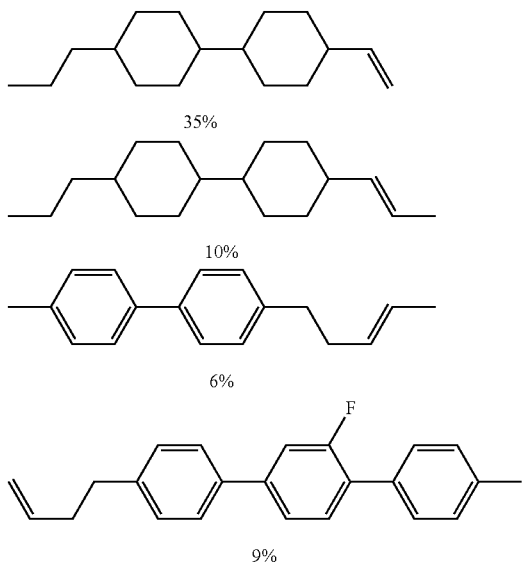

35%

10%

6%

9%

-continued

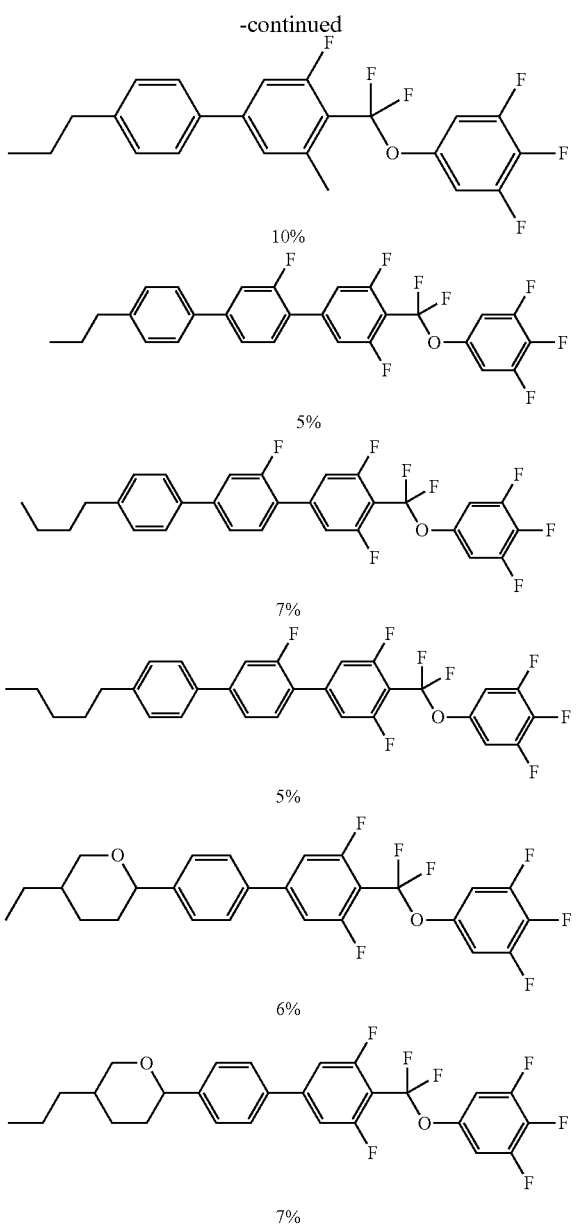

10%

5%

7%

5%

6%

7%

The physical properties of the liquid crystal composition LC-14 were as follows: Tni=76° C., Δ∈=11.3, and Δn=0.123.

A polymerizable compound-containing liquid crystal composition CLC-18 was prepared by adding and uniformly dissolving 0.3% of the polymerizable compound represented by Formula (I-33) in 99.7% of the liquid crystal composition LC-14. It was revealed that the polymerizable compound represented by Formula (I-33), similarly to Example 5, did not degrade liquid crystalline properties, and had excellent compatibility. Further, it was revealed that the polymerizable compound represented by Formula (I-33) had excellent compatibility with another liquid crystal compound because when the CLC-18 was stored in a cold place (−20° C.) for 1 week, deposition or the like did not occur.

By using a vacuum injection method, the CLC-18 was injected to a cell with ITO on which a polyimide alignment film in which parallel alignment was induced was coated with a cell gap of 3.5 μm. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 5.0 V with a frequency of 1 kHz was applied. Irradiation of ultraviolet rays was performed for 600 seconds while adjusting the irradiation intensity such that the irradiation intensity on the surface of the cell became 15 mW/cm$^2$, thereby obtaining a vertical aligning liquid crystal display element in which the polymerizable compound in the polymerizable compound-containing liquid crystal composition is polymerized. The pretilt angle of the display element before ultraviolet irradiation was 0.6°, whereas the pretilt angle thereof after ultraviolet irradiation was 3.2°, and thus a pretilt was imparted. That is, the pretilt angle of liquid crystal molecules was fixed in a state where the liquid crystal molecules were inclined from the initial state. The content of an unpolymerized polymerizable compound which is represented by Formula (I-33) and contained in the display element was analyzed with liquid chromatography analysis, but the content thereof was below the detection limit. Due to this, it was verified that the polymerizable compound represented by Formula (I-33) was able to be polymerized without using a polymerization initiator and the amount of an unpolymerized product remained after the polymerization was below the detection limit.

Further, the obtained vertical aligning liquid crystal display element was put into an oven at 50° C. while applying a rectangular wave having a frequency of 1 kHz to the display element with a voltage of 5.0 V, so as to carry out a stress test. From the result of the stress test, it was revealed that the pretilt angle after 24 hours was 3.3°, which was not substantially changed, and the fixing force of the pretilt was sufficiently maintained even under stress.

The invention claimed is:

1. A polymerizable compound-containing liquid crystal composition, comprising:
    0.01 mass % to 2 mass % of at least one kind of compound represented by General Formula (I):

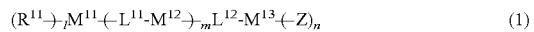

(in the general formula (I), Z represents —S$^1$—R$^{12}$, S$^1$ is at least one linking group selected from the group consisting of an alkylene group having 1 to 5 carbon atoms and a single bond, and one —CH$_2$— or non-adjacent two or more —CH$_2$— in the alkylene group may be substituted with —O—, —COO—, —OCO—, or —OCOO—, R$^{11}$ and R$^{12}$ each independently represent any one of the following formulae (R-I) and (R-III) to (R-IX):

-continued (R-IV)

(R-V)

(R-VI)

(R-VII)

(R-VIII)

(R-IX)

HS—* in the formulae (R-I) and (R-III) to (R-IX), $R^{21}$, $R^{31}$, $R^{41}$, $R^{51}$ and $R^{61}$ each independently are a hydrogen atom, an alkyl group having 1 to 5 carbon atoms, or a halogenated alkyl group having 1 to 5 carbon atoms, W is a single bond, —O— or a methylene group, T is a single bond or —COO—, and p, t, and q each independently are 0, 1, or 2, $L^{11}$ s a single bond, —OCH$_2$—, —CH$_2$O—, —C$_2$H$_4$—, —COO—, —OCO—, —OCOOCH$_2$—, —CH$_2$OCOO—, —OCH$_2$CH$_2$O—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH=CH—, —CF=CF—, —CF=CH—, —CH=CF—, —CF$_2$O—, —OCF$_2$—, —CF$_2$CH$_2$—, —CH$_2$CF$_2$—, —CF$_2$CF$_2$—, or —C≡C— (in the formulae, $R^a$s each independently represent a hydrogen atom or an alkyl group having 1 to 4 carbon atoms, and z represents an integer of 2 or 4), $L^{12}$ is —OCH$_2$—, —CH$_2$O—, —C$_2$H$_4$—, —COO—, —OCO—, —OCOOCH$_2$—, —CH$_2$OCOO—, —OCH$_2$CH$_2$O—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH=CH—, —CF=CF—, —CF=CH—, —CH=CF—, —CF$_2$O—, —OCF$_2$—, —CF$_2$CH$_2$—, —CH$_2$CF$_2$—, —CF$_2$CF$_2$—, or —C≡C— (in the formulae, $R^a$s each independently represent a hydrogen atom or an alkyl group having 1 to 4 carbon atoms, and z represents an integer of 2 or 4), $M^{12}$ represents a 1,4-phenylene group, a naphthalene-2,6-diyl group, or an indan-2,5-diyl group, but $M^{12}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, $M^{13}$ is each independently any one of the following formulae (i) to (ix):

(i)

(ii)

(iii)

(iv)

(v)

(vi)

(vii)

(viii)

(ix)

l is 1 or 2, m represents an integer of 1 to 3, n represents an integer of 1 to 3, when m represents 2 and 3, two or three $L^{11}$ and $M^{12}$ may be the same as or different from each other, provided that, at least one $L^{11}$ represents a single bond, further, in the case of l=1, $M^{11}$ represents a 1,4-phenylene group, or an indan-2,5-diyl group, but $M^{11}$ each independently may be unsubstituted or may be substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group, and in the case of l=2, $M^{11}$ is any one of the above formulae (iv) to (vi));

5 mass % to 80 mass % of at least one kind of compound represented by General Formula (II):

$$R^{21}\text{-}M^{21}\text{-}L^{21}\text{-}M^{22}\text{-}(L^{22}\text{-}M^{23})_o\text{-}R^{22} \qquad (II)$$

(in the general formula (II), $R^{21}$ and $R^{22}$ each independently represent an alkyl group having 1 to 10 carbon atoms or an alkenyl group having 2 to 10 carbon atoms, one —$CH_2$— or two or more non-adjacent —$CH_2$— present in these groups may be substituted with —O— or —S—, at least one hydrogen atom present in these groups may be substituted with a fluorine atom or a chlorine atom, $M^{21}$, $M^{22}$, and $M^{23}$ each independently represent a group selected from the group consisting of:

(a) a trans-1,4-cyclohexylene group (one —$CH_2$— or two or more non-adjacent —$CH_2$—present in this group may be substituted with —O— or —S—), (b) a 1,4-phenylene group (one —CH= or two or more non-adjacent —CH= present in this group may be substituted with —N=), a 2-fluoro-1,4-phenylene group, a 3-fluoro-1,4-phenylene group, and a 3,5-difluoro-1,4-phenylene group, and (c) a 1,4-cyclohexenylene group, a 1,4-bicyclo[2.2.2] octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, and $L^{21}$ and $L^{22}$ each independently represent a single bond, —$CH_2CH_2$—, —$(CH_2)_4$—, —$OCH_2$—, —$CH_2O$—, —$OCF_2$—, —$CF_2O$—, —CH=CH—, —CH=N—N=CH—, or —C≡C—, when a plurality of $L^{22}$ exist, they may be the same as or different from each other, and when a plurality of $M^{23}$ exist, they may be the same as or different from each other); and 5 mass % to 80 mass % of at least one compound selected from the group consisting of compounds represented by General formulae (IIIa), (IIIb), (IIIc), (IVa), (IVb), and (IVc):

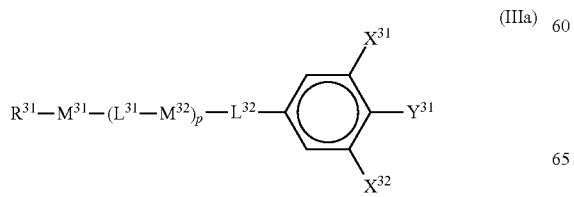
(IIIa)

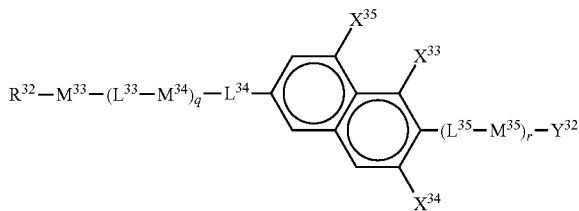
(IIIb)

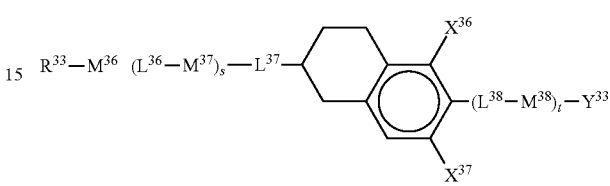
(IIIc)

(in the general formulae (IIIa), (IIIb), and (IIIc), $R^{31}$, $R^{32}$, and $R^{33}$ each independently represent an alkyl group having 1 to 10 carbon atoms or an alkenyl group having 2 to 10 carbon atoms, one —$CH_2$— or two or more non-adjacent —$CH_2$— present in these groups may be substituted with —O— or —S—, at least one kind of hydrogen atom present in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the group consisting of:

(d) a trans-1,4-cyclohexylene group (one —$CH_2$— or two or more non-adjacent —$CH_2$—present in this group may be substituted with —O— or —S—), (e) a 1,4-phenylene group (one —CH= or two or more non-adjacent —CH= present in this group may be substituted with —N=), a 3-fluoro-1,4-phenylene group, and a 3,5-difluoro-1,4-phenylene group, and (f) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom included in the group (d), the group (e), or the group (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{32}$, $M^{34}$, $M^{35}$, $M^{37}$, $M^{38}$, $L^{31}$, $L^{33}$, $L^{35}$, $L^{36}$, and/or $L^{38}$ are present, they may be the same as or different from each other, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group, and p, q, r, s, and t each independently represent 0, 1, or 2, provided that each of q+r and s+t is 2 or less); and

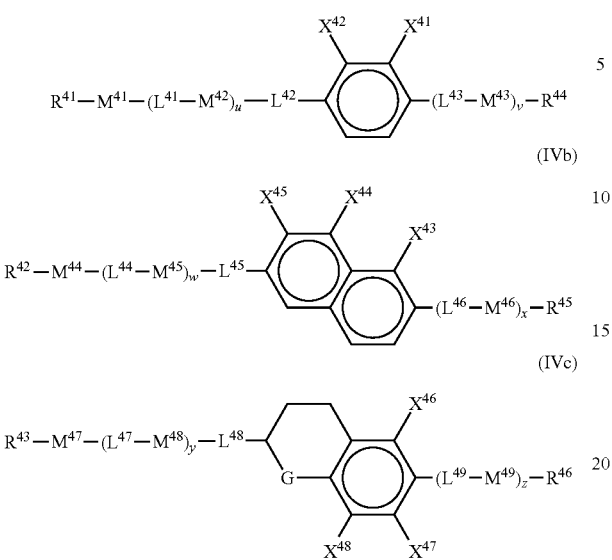

(in the general formulae (IVa), (IVb), and (IVc), $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, and one —$CH_2$— or two or more non-adjacent —$CH_2$— present in these groups may be substituted with —O— or —S—, and at least hydrogen atom present in these groups may be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from the group consisting of:

(g) a trans-1,4-cyclohexylene group (one —$CH_2$— or two or more non-adjacent —$CH_2$— present in this group may be substituted with —O— or —S—), (h) a 1,4-phenylene group (one —CH= or two or more non-adjacent —CH= present in this group may be substituted with —N=), and (i) a 1,4-cyclohexenylene group, a 1,4-bicyclo[2.2.2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and each hydrogen atom contained in the group (g), (h), or (i) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{42}$, $M^{43}$, $M^{45}$, $M^{46}$, $M^{48}$, $M^{49}$, $L^{41}$, $L^{43}$, $L^{44}$, $L^{46}$, $L^{47}$, and/or $L^{49}$ are present, they may be the same as or different from each other, $X^{41}$, $X^{42}$, $X^{43}$, $X^{44}$, $X^{45}$, $X^{46}$, $X^{47}$, and $X^{48}$ each independently represent a hydrogen atom, a trifluoromethyl group, a trifluoromethoxy group, a chlorine atom, or a fluorine atom, any one of $X^{41}$ and $X^{42}$ represents a fluorine atom, any one of $X^{43}$, $X^{44}$, and $X^{45}$ represents a fluorine atom, any one of $X^{46}$, $X^{47}$, and $X^{48}$ represents a fluorine atom, provided that $X^{46}$ and $X^{47}$ do not represent a fluorine atom at the same time and $X^{46}$ and $X^{48}$ do not represent a fluorine atom at the same time, G represents —$CH_2$— or —O—, and u, v, w, x, y, and z each independently represent 0, 1, or 2, provided that u+v, w+x, and y+z are each 2 or less).

2. The polymerizable compound-containing liquid crystal composition according to claim 1, wherein $R^{11}$ and $R^{12}$ in the general formula (I) each independently represent any one of the following formulae (R-1) to (R-3) and (R-6) to (R-15):

(R-1)

(R-2)

(R-3)

(R-6)

(R-7)

(R-8)

(R-9)

(R-10)

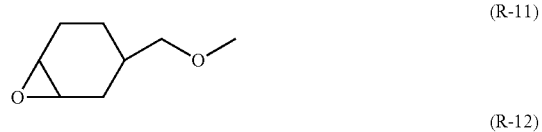
(R-11)

(R-12)

(R-13)

(R-14)

(R-15)

3. The polymerizable compound-containing liquid crystal composition according to claim 2, wherein m in the general formula (I) is 1 or more.

4. The polymerizable compound-containing liquid crystal composition according to claim 2,
wherein n in the general formula (I) is 1 or more.

5. The polymerizable compound-containing liquid crystal composition according to claim 2,
wherein, in the general formula (I), $L^{11}$ is —$OCH_2$—, —$CH_2O$—, —CO—, —$C_2H_4$—, —COO—, —OCO—, —$COOC_2H_4$—, —$OCOC_2H_4$—, —$C_2H_4OCO$—, —$C_2H_4COO$—, —CH=CH—, a single bond, —$CF_2O$—, —$(CH_2)_z$—C(=O)—O—, —$(CH_2)_z$—O—(C=O)—, —O—(C=O)—$(CH_2)_z$—, —(C=O)—O—$(CH_2)_z$—, —$OCF_2$— or —C≡C—,
$L^{12}$ is —$OCH_2CH_2O$—, —$COOC_2H_4$—, —$OCOC_2H_4$—, —$(CH_2)_z$—C(=O)—O—, —$(CH_2)_z$—O—(C=O)—, —O—(C=O)—$(CH_2)_z$—, —(C=O)—O—$(CH_2)_z$—, —$C_2H_4OCO$—, or —$C_2H_4COO$—, and
in the above formulae, z is an integer of 2 or 4.

6. The polymerizable compound-containing liquid crystal composition according to claim 2,
wherein at least one of $L^{11}$ and $L^{12}$ in the general formula (I) is at least one selected from the group consisting of —$(CH_2)_z$—C(=O)—O—, —$(CH_2)_z$—O—(C=O)—, —O—(C=O)—$(CH_2)_z$—, and —(C=O)—O—$(CH_2)_z$—.

7. The polymerizable compound-containing liquid crystal composition according to claim 2,
wherein the composition includes 0.01 mass % to 2 mass % of the compound selected from the general formula (I), 5 mass % to 70 mass % of the compound selected from the general formula (II), and 5 mass % to 70 mass % of the compound selected from the group consisting of compounds represented by the general formula (IIIa), (IIIb), or (IIIc) or the compound selected from the group consisting of compounds represented by the general formulae (IVa), (IVb), and (IVc).

8. The polymerizable compound-containing liquid crystal composition according to claim 2,
wherein the composition includes at least one compound represented by the general formulae (IVa).

9. The polymerizable compound-containing liquid crystal composition according to claim 2, which contains a polymerizable compound and is used for a liquid crystal display element including a liquid crystal layer formed between a pair of substrates, a transparent electrode, and a polarization plate,
wherein liquid crystal alignment ability is imparted by polymerizing the polymerizable compound in the liquid crystal layer in which a space formed between the pair of substrates is filled with the polymerizable compound-containing liquid crystal composition.

10. The liquid crystal display element according to claim 9,
wherein the polymerizable compound-containing liquid crystal composition has a negative dielectric anisotropy.

* * * * *